United States Patent
Lin

(10) Patent No.: US 10,891,906 B2
(45) Date of Patent: *Jan. 12, 2021

(54) COLOR DISPLAY DEVICE AND DRIVING METHODS THEREFOR

(71) Applicant: E INK CALIFORNIA, LLC., Fremont, CA (US)

(72) Inventor: Craig Lin, Oakland, CA (US)

(73) Assignee: E INK CALIFORNIA, LLC, Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/503,894

(22) Filed: Jul. 5, 2019

(65) Prior Publication Data

US 2019/0333454 A1 Oct. 31, 2019

Related U.S. Application Data

(63) Continuation of application No. 15/859,407, filed on Dec. 30, 2017, now Pat. No. 10,380,955, which is a
(Continued)

(51) Int. Cl.
*G09G 3/34* (2006.01)
*G09G 3/20* (2006.01)
(Continued)

(52) U.S. Cl.
CPC .......... *G09G 3/344* (2013.01); *G02F 1/167* (2013.01); *G09G 3/2003* (2013.01);
(Continued)

(58) Field of Classification Search
CPC ............ G02F 1/167; G02F 2001/1678; G02F 2001/1672; G02F 2001/1676; G09G 3/344
(Continued)

(56) References Cited

U.S. PATENT DOCUMENTS

| 3,756,693 A | 9/1973 | Ota |
| 3,892,568 A | 7/1975 | Ota |

(Continued)

FOREIGN PATENT DOCUMENTS

| CN | 1705907 A | 12/2005 |
| JP | 2006343458 A | 12/2006 |

(Continued)

OTHER PUBLICATIONS

Seigou Kawaguchi et al., "Synthesis of polyethylene macromonomers and their radical copolymerizations with methyl methacrylate in homogeneous and oligoethylene melts media" Designed Monomers and Polymers 2000, vol. 3, No. 3, p. 263-277 Jan. 1, 2000.
(Continued)

*Primary Examiner* — Koosha Sharifi-Tafreshi
(74) *Attorney, Agent, or Firm* — David J. Cole

(57) ABSTRACT

The invention relates to electrophoretic layers containing at least five different particles, and to driving methods for displaying at least five, and in some embodiments, six different colors at each pixel or sub-pixel. The electrophoretic layers may also contain uncharged neutral buoyancy particles, and the driving methods may include special shaking waveform sequences.

5 Claims, 45 Drawing Sheets

Related U.S. Application Data continuation-in-part of application No. 15/168,493, filed on May 31, 2016, now Pat. No. 9,922,603, which is a continuation-in-part of application No. 14/626,552, filed on Feb. 19, 2015, now Pat. No. 9,541,814, and a continuation-in-part of application No. 14/794,689, filed on Jul. 8, 2015, now Pat. No. 9,671,668, said application No. 15/859,407 is a continuation-in-part of application No. 15/088,465, filed on Apr. 1, 2016, now Pat. No. 10,032,419.

(60) Provisional application No. 62/061,077, filed on Oct. 7, 2014, provisional application No. 62/022,557, filed on Jul. 9, 2014, provisional application No. 62/169,300, filed on Jun. 1, 2015, provisional application No. 62/241,633, filed on Oct. 14, 2015, provisional application No. 62/143,631, filed on Apr. 6, 2015.

(51) Int. Cl.
  *G02F 1/167* (2019.01)
  *G02F 1/1675* (2019.01)

(52) U.S. Cl.
  CPC ... *G02F 2001/1678* (2013.01); *G09G 3/2074* (2013.01); *G09G 2310/0254* (2013.01); *G09G 2310/068* (2013.01)

(58) Field of Classification Search
  USPC .......................................... 345/107; 359/296
  See application file for complete search history.

(56) References Cited

U.S. PATENT DOCUMENTS

| | | | |
|---|---|---|---|
| 4,298,448 A | 11/1981 | Muller et al. | |
| 5,378,574 A | 1/1995 | Winnik | |
| 5,930,026 A | 7/1999 | Jacobson | |
| 5,980,719 A | 11/1999 | Cherukuri | |
| 6,017,584 A | 1/2000 | Albert | |
| 6,198,809 B1 | 3/2001 | DiSanto | |
| 6,337,761 B1 | 1/2002 | Rogers | |
| 6,373,461 B1 | 4/2002 | Hasegawa | |
| 6,486,866 B1 | 11/2002 | Kuwahara | |
| 6,517,618 B2 | 2/2003 | Foucher | |
| 6,525,866 B1 | 2/2003 | Lin | |
| 6,538,801 B2 | 3/2003 | Jacobson et al. | |
| 6,545,797 B2 | 4/2003 | Chen | |
| 6,600,534 B1 | 7/2003 | Tanaka | |
| 6,636,186 B1 * | 10/2003 | Yamaguchi | G09G 3/344 345/107 |
| 6,650,462 B2 | 11/2003 | Katase | |
| 6,664,944 B1 | 12/2003 | Albert | |
| 6,680,726 B2 | 1/2004 | Gordon, II | |
| 6,693,620 B1 | 2/2004 | Herb | |
| 6,704,133 B2 | 3/2004 | Gates | |
| 6,724,521 B2 | 4/2004 | Nakao | |
| 6,729,718 B2 | 5/2004 | Goto | |
| 6,751,007 B2 | 6/2004 | Liang | |
| 6,751,008 B2 | 6/2004 | Liang | |
| 6,753,844 B2 | 6/2004 | Machida | |
| 6,762,744 B2 | 7/2004 | Katase | |
| 6,781,745 B2 | 8/2004 | Chung | |
| 6,788,452 B2 | 9/2004 | Liang | |
| 6,829,078 B2 | 12/2004 | Liang | |
| 6,850,357 B2 | 2/2005 | Kaneko | |
| 6,864,875 B2 | 3/2005 | Drzaic | |
| 6,876,486 B2 | 4/2005 | Hiraoka | |
| 6,914,714 B2 | 7/2005 | Chen | |
| 6,930,818 B1 | 8/2005 | Liang | |
| 6,947,203 B2 | 9/2005 | Kanbe | |
| 6,967,762 B2 | 11/2005 | Machida et al. | |
| 6,972,893 B2 | 12/2005 | Chen | |
| 6,987,503 B2 | 1/2006 | Inoue | |
| 6,987,605 B2 | 1/2006 | Liang | |
| 7,009,756 B2 | 3/2006 | Kishi | |
| 7,019,889 B2 | 3/2006 | Katase | |
| 7,034,987 B2 | 4/2006 | Schlangen | |
| 7,038,655 B2 | 5/2006 | Herb | |
| 7,038,656 B2 | 5/2006 | Liang | |
| 7,038,670 B2 | 5/2006 | Liang | |
| 7,046,228 B2 | 5/2006 | Liang | |
| 7,050,218 B2 | 5/2006 | Kanbe | |
| 7,052,571 B2 | 5/2006 | Wang | |
| 7,057,798 B2 | 6/2006 | Ukigaya | |
| 7,075,502 B1 | 7/2006 | Drzaic | |
| 7,116,466 B2 | 10/2006 | Whitesides | |
| 7,167,155 B1 | 1/2007 | Albert | |
| 7,226,550 B2 | 6/2007 | Hou | |
| 7,259,744 B2 | 8/2007 | Arango | |
| 7,271,947 B2 | 9/2007 | Liang | |
| 7,283,119 B2 | 10/2007 | Kishi | |
| 7,292,386 B2 | 11/2007 | Kanbe | |
| 7,303,818 B2 | 12/2007 | Minami | |
| 7,304,987 B1 | 12/2007 | James | |
| 7,312,916 B2 | 12/2007 | Pullen | |
| 7,342,556 B2 | 3/2008 | Oue | |
| 7,345,810 B2 | 3/2008 | Chopra et al. | |
| 7,349,147 B2 | 3/2008 | Chopra | |
| 7,352,353 B2 | 4/2008 | Albert | |
| 7,382,351 B2 | 6/2008 | Kishi | |
| 7,382,521 B2 | 6/2008 | Chopra | |
| 7,385,751 B2 | 6/2008 | Chen | |
| 7,411,719 B2 | 8/2008 | Paolini, Jr. | |
| 7,417,787 B2 | 8/2008 | Chopra | |
| 7,420,549 B2 | 9/2008 | Jacobson | |
| 7,433,113 B2 | 10/2008 | Chopra | |
| 7,474,295 B2 | 1/2009 | Matsuda | |
| 7,492,505 B2 | 2/2009 | Liang | |
| 7,495,821 B2 | 2/2009 | Yamakita | |
| 7,502,162 B2 | 3/2009 | Lin | |
| 7,545,557 B2 | 6/2009 | Iftime | |
| 7,548,291 B2 | 6/2009 | Lee | |
| 7,557,981 B2 | 7/2009 | Liang | |
| 7,580,025 B2 | 8/2009 | Nakai | |
| 7,605,972 B2 | 10/2009 | Kawai | |
| 7,609,435 B2 | 10/2009 | Moriyama | |
| 7,626,185 B2 | 12/2009 | Krak | |
| 7,636,076 B2 | 12/2009 | Hung | |
| 7,652,656 B2 | 1/2010 | Chopra | |
| 7,656,576 B2 | 2/2010 | Suwabe | |
| 7,667,684 B2 | 2/2010 | Jacobson | |
| 7,675,502 B2 | 3/2010 | Chopra | |
| 7,679,599 B2 | 3/2010 | Kawai | |
| 7,684,108 B2 | 3/2010 | Wang | |
| 7,686,463 B2 | 3/2010 | Goto | |
| 7,760,419 B2 | 7/2010 | Lee | |
| 7,782,292 B2 | 8/2010 | Miyasaka | |
| 7,791,789 B2 | 9/2010 | Albert | |
| 7,800,813 B2 | 9/2010 | Wu | |
| 7,808,696 B2 | 10/2010 | Lee | |
| 7,821,702 B2 | 10/2010 | Liang | |
| 7,830,592 B1 | 11/2010 | Sprague | |
| 7,834,844 B2 | 11/2010 | Kim | |
| 7,839,564 B2 | 11/2010 | Whitesides et al. | |
| 7,848,009 B2 | 12/2010 | Machida | |
| 7,852,547 B2 | 12/2010 | Kim | |
| 7,852,548 B2 | 12/2010 | Roh | |
| 7,875,307 B2 | 1/2011 | Lin | |
| 7,907,327 B2 | 3/2011 | Jang | |
| 7,910,175 B2 | 3/2011 | Webber | |
| 7,911,681 B2 | 3/2011 | Ikegami | |
| 7,952,790 B2 | 5/2011 | Honeyman et al. | |
| 7,956,841 B2 | 6/2011 | Albert | |
| 7,982,941 B2 | 7/2011 | Lin | |
| 8,035,611 B2 | 10/2011 | Sakamoto | |
| 8,040,594 B2 | 10/2011 | Paolini, Jr. | |
| 8,054,288 B2 | 11/2011 | Sugita | |
| 8,054,526 B2 | 11/2011 | Bouchard | |
| 8,054,535 B2 | 11/2011 | Sikharulidze | |
| 8,067,305 B2 | 11/2011 | Zafiropoulo | |
| 8,068,090 B2 | 11/2011 | Machida | |

(56) References Cited

U.S. PATENT DOCUMENTS

| | | |
|---|---|---|
| 8,072,674 B2 | 12/2011 | Wang |
| 8,072,675 B2 | 12/2011 | Lin |
| 8,081,375 B2 | 12/2011 | Komatsu |
| 8,089,686 B2 | 1/2012 | Addington |
| 8,098,418 B2 | 1/2012 | Paolini, Jr. |
| 8,115,729 B2 | 2/2012 | Danner |
| 8,120,838 B2 | 2/2012 | Lin |
| 8,159,636 B2 | 4/2012 | Sun |
| 8,164,823 B2 | 4/2012 | Ikegami |
| 8,169,690 B2 | 5/2012 | Lin |
| 8,174,491 B2 | 5/2012 | Machida |
| 8,174,492 B2 | 5/2012 | Kim |
| 8,213,076 B2 | 7/2012 | Albert |
| 8,237,892 B1 | 8/2012 | Sprague |
| 8,243,013 B1 | 8/2012 | Sprague |
| 8,270,063 B2 | 9/2012 | Fontana |
| 8,319,724 B2 | 11/2012 | Wang |
| 8,355,196 B2 | 1/2013 | Yan |
| 8,363,299 B2 | 1/2013 | Paolini, Jr. |
| 8,373,727 B2 | 2/2013 | Furihata |
| 8,395,836 B2 | 3/2013 | Lin |
| 8,422,116 B2 | 4/2013 | Sprague |
| 8,441,713 B2 | 5/2013 | Kawashima |
| 8,441,714 B2 | 5/2013 | Paolini, Jr. |
| 8,441,716 B2 | 5/2013 | Paolini, Jr. |
| 8,466,852 B2 | 6/2013 | Drzaic |
| 8,477,404 B2 | 7/2013 | Moriyama |
| 8,477,405 B2 | 7/2013 | Ishii |
| 8,491,767 B2 | 7/2013 | Gibson |
| 8,503,063 B2 | 8/2013 | Sprague |
| 8,520,296 B2 | 8/2013 | Wang |
| 8,537,104 B2 | 9/2013 | Markvoort |
| 8,558,855 B2 | 10/2013 | Sprague |
| 8,565,522 B2 | 10/2013 | Swic |
| 8,570,272 B2 | 10/2013 | Hsieh |
| 8,570,639 B2 | 10/2013 | Masuzawa |
| 8,574,937 B2 | 11/2013 | Shi |
| 8,576,470 B2 | 11/2013 | Paolini, Jr. |
| 8,576,475 B2 | 11/2013 | Huang |
| 8,576,476 B2 | 11/2013 | Telfer, Jr. |
| 8,593,721 B2 | 11/2013 | Albert |
| 8,605,354 B2 | 12/2013 | Zhang |
| 8,610,998 B2 | 12/2013 | Baisch |
| 8,629,832 B2 | 1/2014 | Tanabe |
| 8,649,084 B2 | 2/2014 | Wang |
| 8,670,174 B2 | 3/2014 | Sprague |
| 8,674,978 B2 | 3/2014 | Komatsu |
| 8,681,191 B2 | 3/2014 | Yang |
| 8,687,265 B2 | 4/2014 | Ahn |
| 8,704,754 B2 | 4/2014 | Machida |
| 8,704,756 B2 | 4/2014 | Lin |
| 8,717,662 B2 | 5/2014 | Komatsu |
| 8,717,664 B2 | 5/2014 | Wang |
| 8,786,935 B2 | 7/2014 | Sprague |
| 8,791,896 B2 | 7/2014 | Kwon |
| 8,797,258 B2 | 8/2014 | Sprague |
| 8,797,634 B2 | 8/2014 | Paolini, Jr. |
| 8,797,636 B2 | 8/2014 | Yang |
| 8,797,637 B2 | 8/2014 | Fujishiro |
| 8,810,899 B2 | 8/2014 | Sprague |
| 8,830,559 B2 | 9/2014 | Honeyman |
| 8,873,129 B2 | 10/2014 | Paolini, Jr. |
| 8,902,153 B2 | 12/2014 | Bouchard |
| 8,902,491 B2 | 12/2014 | Wang |
| 8,917,439 B2 | 12/2014 | Wang |
| 8,963,903 B2 | 2/2015 | Sakamoto et al. |
| 8,964,282 B2 | 2/2015 | Wang |
| 8,976,444 B2 | 3/2015 | Zhang |
| 8,988,764 B2 | 3/2015 | Abe |
| 9,013,516 B2 | 4/2015 | Sakamoto |
| 9,013,783 B2 | 4/2015 | Sprague |
| 9,052,564 B2 | 6/2015 | Sprague |
| 9,116,412 B2 | 8/2015 | Lin |
| 9,140,952 B2 | 9/2015 | Sprague |
| 9,146,439 B2 | 9/2015 | Zhang |
| 9,164,207 B2 | 10/2015 | Honeyman |
| 9,170,467 B2 | 10/2015 | Whitesides |
| 9,170,468 B2 | 10/2015 | Lin |
| 9,176,358 B2 | 11/2015 | Fujimori |
| 9,182,646 B2 | 11/2015 | Paolini, Jr. |
| 9,195,111 B2 | 11/2015 | Anseth, Jr. |
| 9,199,441 B2 | 12/2015 | Danner |
| 9,251,736 B2 | 2/2016 | Lin |
| 9,268,191 B2 | 2/2016 | Paolini, Jr. |
| 9,285,649 B2 | 3/2016 | Du |
| 9,293,511 B2 | 3/2016 | Jacobson |
| 9,341,916 B2 | 5/2016 | Telfer et al. |
| 9,360,733 B2 | 6/2016 | Wang |
| 9,361,836 B1 | 6/2016 | Telfer, Jr. |
| 9,383,623 B2 | 7/2016 | Lin |
| 9,423,666 B2 | 8/2016 | Wang |
| 9,436,056 B2 | 9/2016 | Paolini, Jr. |
| 9,459,510 B2 | 10/2016 | Lin |
| 9,460,666 B2 | 10/2016 | Sprague |
| 9,513,527 B2 | 12/2016 | Chan |
| 9,541,814 B2 | 1/2017 | Lin |
| 9,633,610 B2 | 4/2017 | Van Delden et al. |
| 9,671,668 B2 | 6/2017 | Chan |
| 9,697,778 B2 | 7/2017 | Telfer et al. |
| 9,740,076 B2 | 8/2017 | Paolini |
| 9,759,980 B2 | 9/2017 | Du |
| 9,812,073 B2 | 11/2017 | Lin |
| 9,922,603 B2 | 3/2018 | Lin |
| 10,032,419 B2 | 7/2018 | Lin et al. |
| 10,162,242 B2 | 12/2018 | Wang |
| 10,209,556 B2 | 2/2019 | Rosenfeld |
| 2001/0035926 A1 | 11/2001 | Yamaguchi |
| 2004/0085619 A1 | 5/2004 | Wu |
| 2006/0202949 A1* | 9/2006 | Danner ............ G02F 1/167 345/107 |
| 2006/0209009 A1 | 9/2006 | Schlangen |
| 2006/0290652 A1 | 12/2006 | Zhou |
| 2007/0002008 A1 | 1/2007 | Tam |
| 2007/0080928 A1 | 4/2007 | Ishii |
| 2007/0091117 A1 | 4/2007 | Zhou |
| 2007/0103426 A1* | 5/2007 | Johnson ............ G09G 3/344 345/107 |
| 2007/0268565 A1* | 11/2007 | Chopra ............ G02F 1/167 359/296 |
| 2007/0273637 A1 | 11/2007 | Zhou |
| 2008/0042928 A1 | 2/2008 | Schlangen |
| 2008/0043318 A1 | 2/2008 | Whitesides |
| 2008/0048970 A1 | 2/2008 | Drzaic |
| 2008/0062159 A1* | 3/2008 | Roh ............ G02F 1/167 345/205 |
| 2008/0117165 A1 | 5/2008 | Machida |
| 2008/0150886 A1 | 6/2008 | Johnson |
| 2008/0174531 A1 | 7/2008 | Sah |
| 2008/0224989 A1 | 9/2008 | Zhou |
| 2008/0266243 A1 | 10/2008 | Johnson |
| 2009/0153942 A1 | 6/2009 | Daniel |
| 2009/0184897 A1 | 7/2009 | Miyamoto |
| 2009/0225398 A1 | 9/2009 | Duthaler |
| 2009/0311484 A1 | 12/2009 | McLellan |
| 2010/0020384 A1* | 1/2010 | Machida ............ G09G 3/2011 359/296 |
| 2010/0060628 A1 | 3/2010 | Lenssen et al. |
| 2010/0156780 A1 | 6/2010 | Jacobson |
| 2010/0194733 A1 | 8/2010 | Lin |
| 2011/0007381 A1* | 1/2011 | Paolini, Jr. ............ G02F 1/167 359/296 |
| 2011/0043543 A1 | 2/2011 | Chen |
| 2011/0128267 A1 | 6/2011 | Hsu |
| 2011/0175939 A1 | 7/2011 | Moriyama |
| 2011/0199671 A1 | 8/2011 | Amundson |
| 2011/0217639 A1 | 9/2011 | Sprague |
| 2011/0234557 A1 | 9/2011 | Yang |
| 2012/0154899 A1* | 6/2012 | Ahn ............ G09G 3/344 359/296 |
| 2012/0299947 A1 | 11/2012 | Tsuda |
| 2012/0326957 A1 | 12/2012 | Drzaic |
| 2013/0194250 A1 | 8/2013 | Amundson |
| 2013/0242378 A1 | 9/2013 | Paolini, Jr. |
| 2013/0278995 A1 | 10/2013 | Drzaic |

(56) References Cited

U.S. PATENT DOCUMENTS

| | | |
|---|---|---|
| 2014/0011913 A1 | 1/2014 | Du |
| 2014/0055840 A1 | 2/2014 | Zang |
| 2014/0078576 A1 | 3/2014 | Sprague |
| 2014/0085358 A1 | 3/2014 | Inoue |
| 2014/0268302 A1* | 9/2014 | Fujimori ............ G02F 1/167 359/296 |
| 2014/0354615 A1 | 12/2014 | Sakamoto |
| 2014/0362213 A1 | 12/2014 | Tseng |
| 2015/0097877 A1 | 4/2015 | Lin |
| 2015/0118390 A1 | 4/2015 | Rosenfeld |
| 2015/0241754 A1 | 8/2015 | Du |
| 2015/0268531 A1 | 9/2015 | Wang |
| 2015/0301246 A1 | 10/2015 | Zang |
| 2016/0026062 A1 | 1/2016 | Zhang |
| 2016/0048054 A1 | 2/2016 | Danner |

FOREIGN PATENT DOCUMENTS

| | | |
|---|---|---|
| JP | 2007033710 A | 2/2007 |
| JP | 2007140129 A | 6/2007 |
| JP | 2008033000 A | 2/2008 |
| JP | 2008209589 A | 9/2008 |
| JP | 2009116041 A | 5/2009 |
| JP | 2009192637 A | 8/2009 |
| JP | 2009244635 A | 10/2009 |
| JP | 2010044114 A | 2/2010 |
| JP | 2011158783 A | 8/2011 |
| KR | 20070082680 A | 8/2007 |
| KR | 20110103765 A | 9/2011 |
| TW | 200938928 A | 9/2009 |
| TW | 201122697 A | 7/2011 |
| TW | 201346413 A | 11/2013 |
| WO | 1999053373 A1 | 10/1999 |
| WO | 2013167814 | 11/2013 |

OTHER PUBLICATIONS

Sprague, R.A., "Active Matrix Displays for e-readers Using Microcup Electrophoretic.", Presentation conducted at SID 2011, 49 Int'l Symposium, Seminar and Exhibition, Los Angeles Convention Center, USA (May 18, 2011) . May 18, 2011.

Kao, W.C., "Configurable Timing Controller Design for Active Matrix Electrophoretic Display.", IEEE Transactions on Consumer Electronics, vol. 55, Issue 1, pp. 1-5 (Feb. 2009). Feb. 1, 2009.

Kao, W.C. et al., "Configurable Timing Controller Design for Active Matrix Electrophoretic Display with 16 Gray Levels.", ICCE 2009 Digest of Technical Papers, 10.2-2, (Jan. 2009). Jan. 14, 2009.

Kao, W.C. et al., "Integrating Flexible Electrophoretic Display and One-Time Password Generator in Smart Cards.", ICCE Digest of Technical Papers, p. 4-3, (Jan. 2008). Jan. 13, 2008.

Federal Institute of Industrial Property, PCT/US2016/025504, International Search Report and Written Opinion, Russian Federation, dated Aug. 18, 2016, dated Aug. 18, 2016.

Korean Intellectual Property Office; PCT/US2016/035174; International Search Report and Written Opinion; dated Aug. 31, 2016, dated Aug. 31, 2016.

Korean Intellectual Property Office; PCT/US2015/039563; International Search Report and Written Opinion; dated Oct. 26, 2015, dated Oct. 26, 2015.

Korean Intellectual Porperty Office, PCT/US2015/016573, The International Search Report and the Written Opinion, dated May 19, 2015 dated May 19, 2015.

European Patent Office, EP Application No. 15751411.8, Extended European Search Report, dated Jun. 6, 2018, dated Jun. 6, 2018.

European Patent Office, EP Appl. No. 16777083.3, Extended European Search Report, dated Aug. 1, 2018, dated Aug. 1, 2018.

European Patent Office, EP Appl. No. 16804285.1, Extended European Search Report, dated Oct. 12, 2018, dated Oct. 12, 2018.

European Patent Office, EP Appl. No. 15819494.4, Extended European Search Report, dated Nov. 8, 2018, dated Nov. 8, 2018.

\* cited by examiner

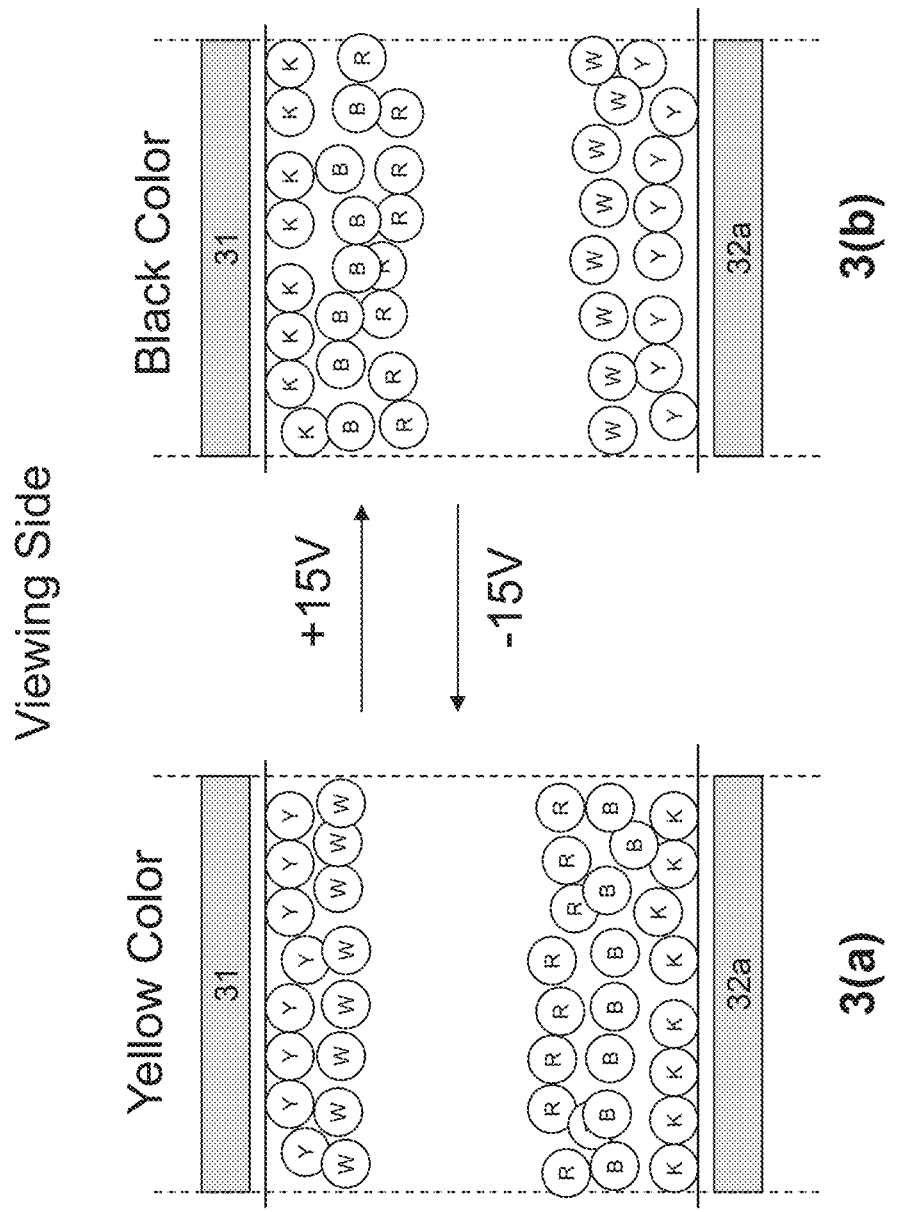

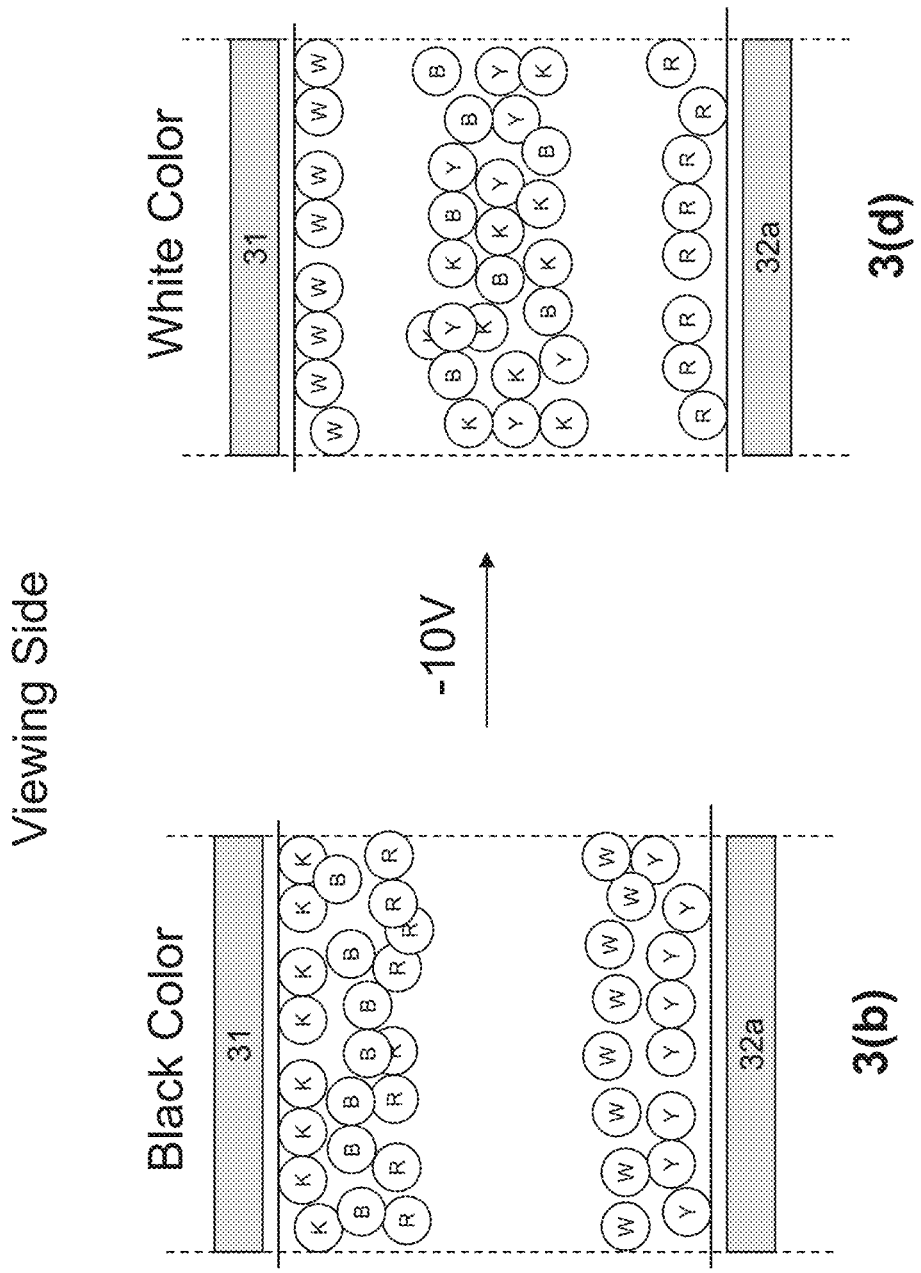

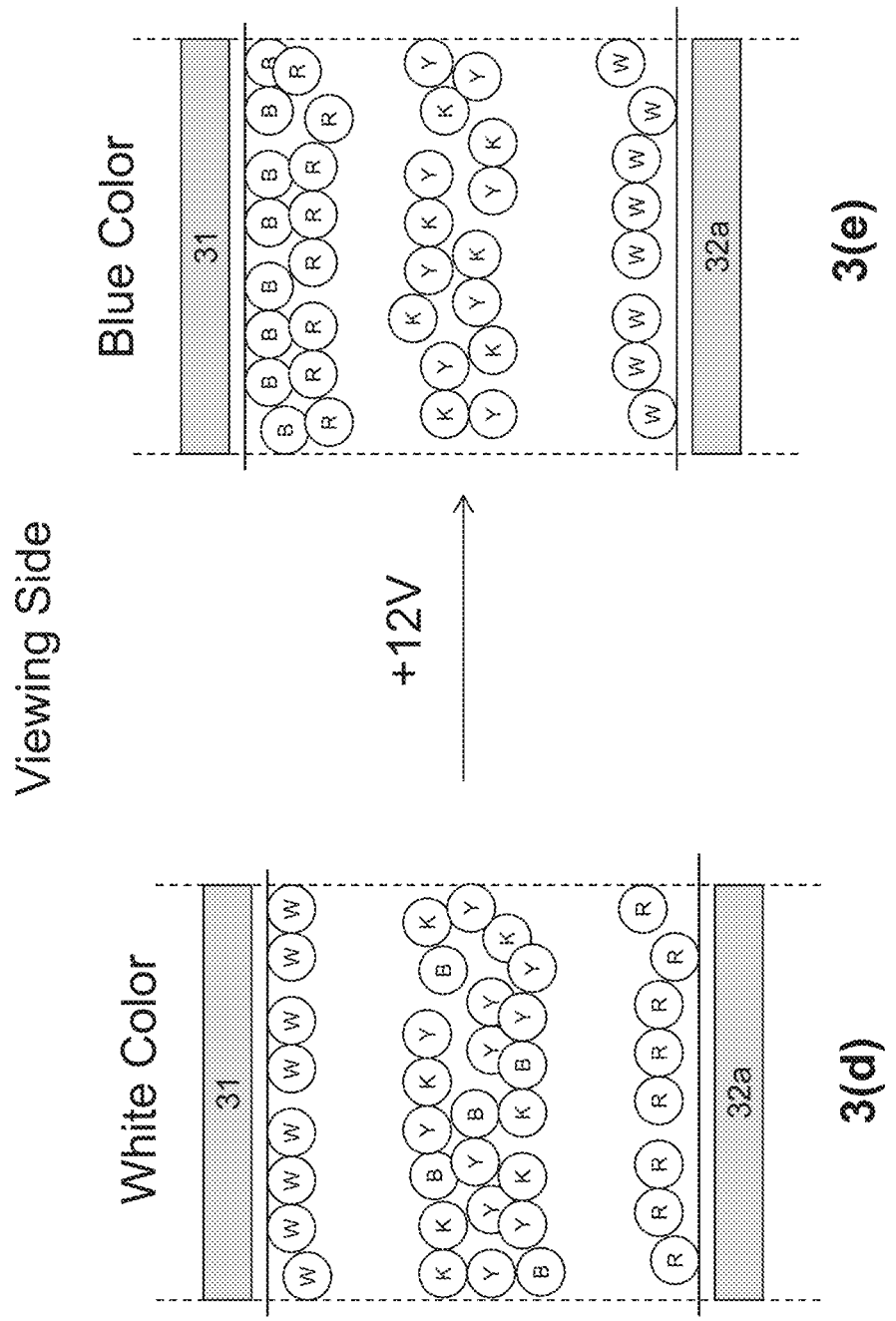

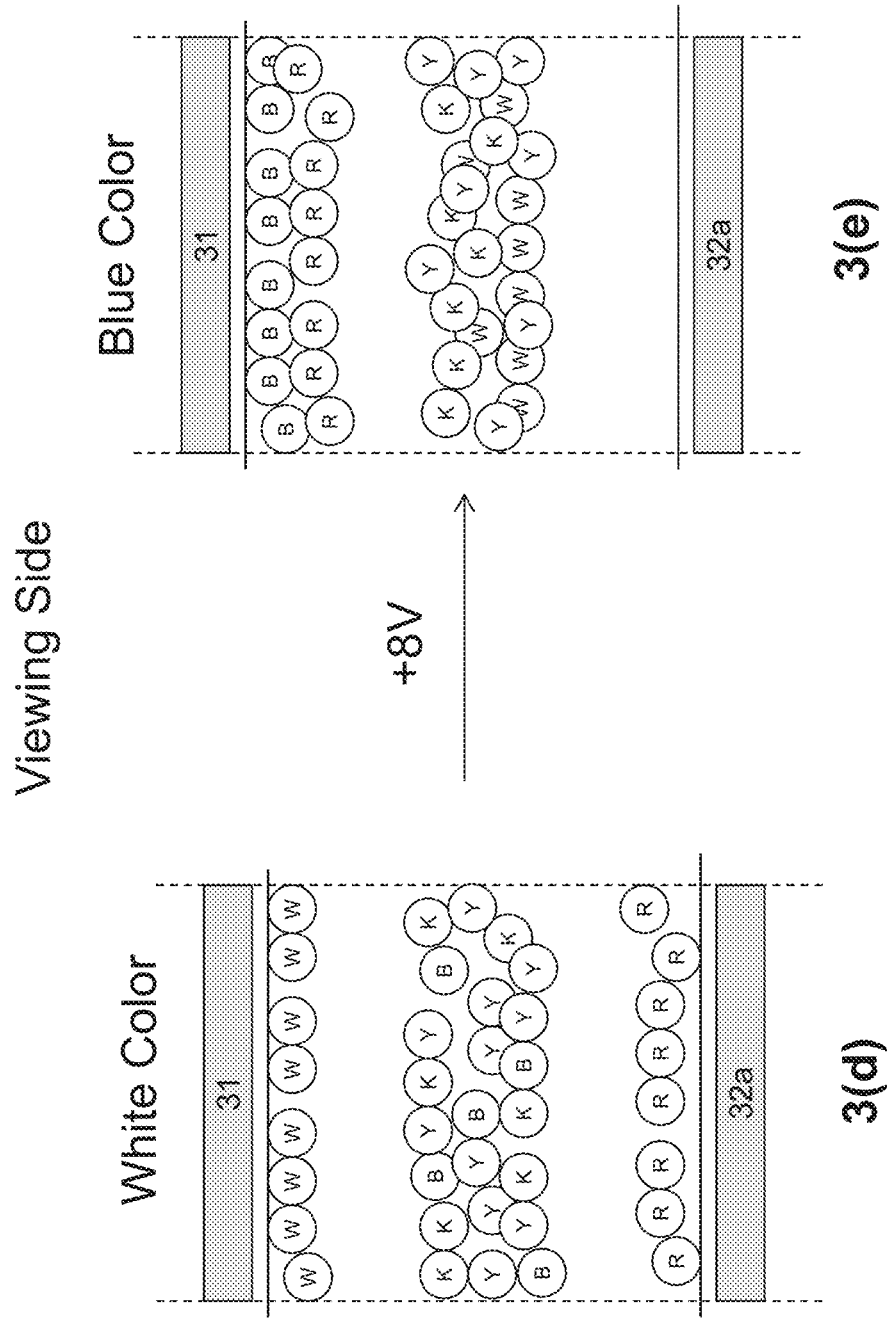

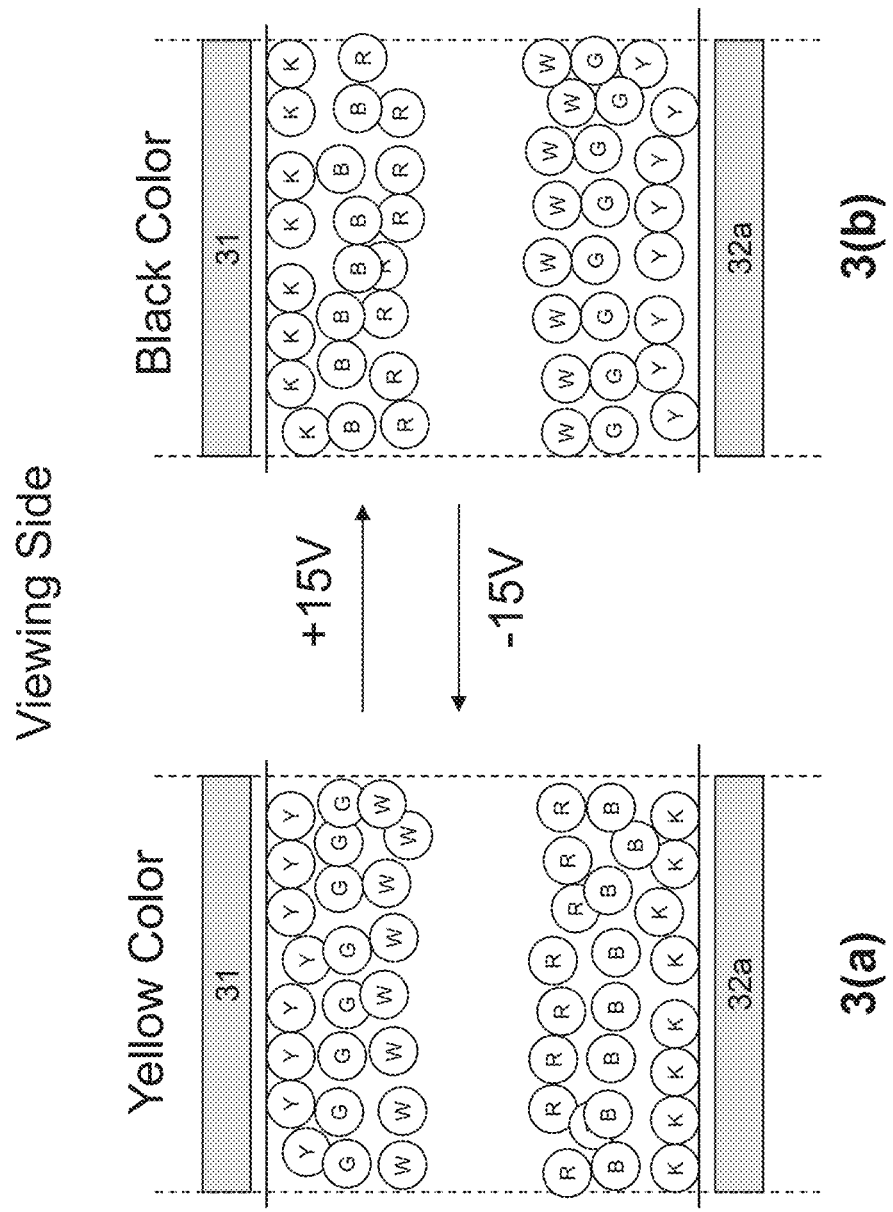

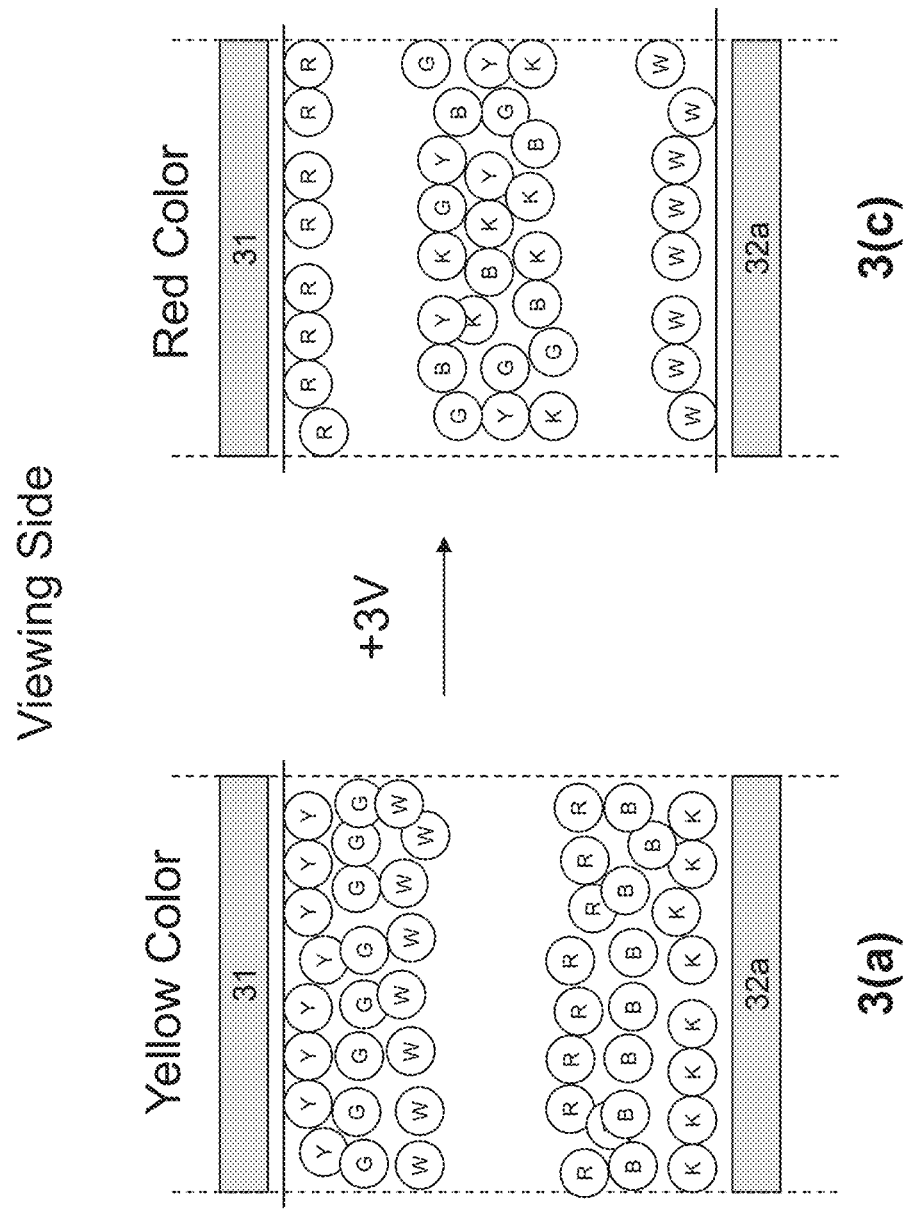

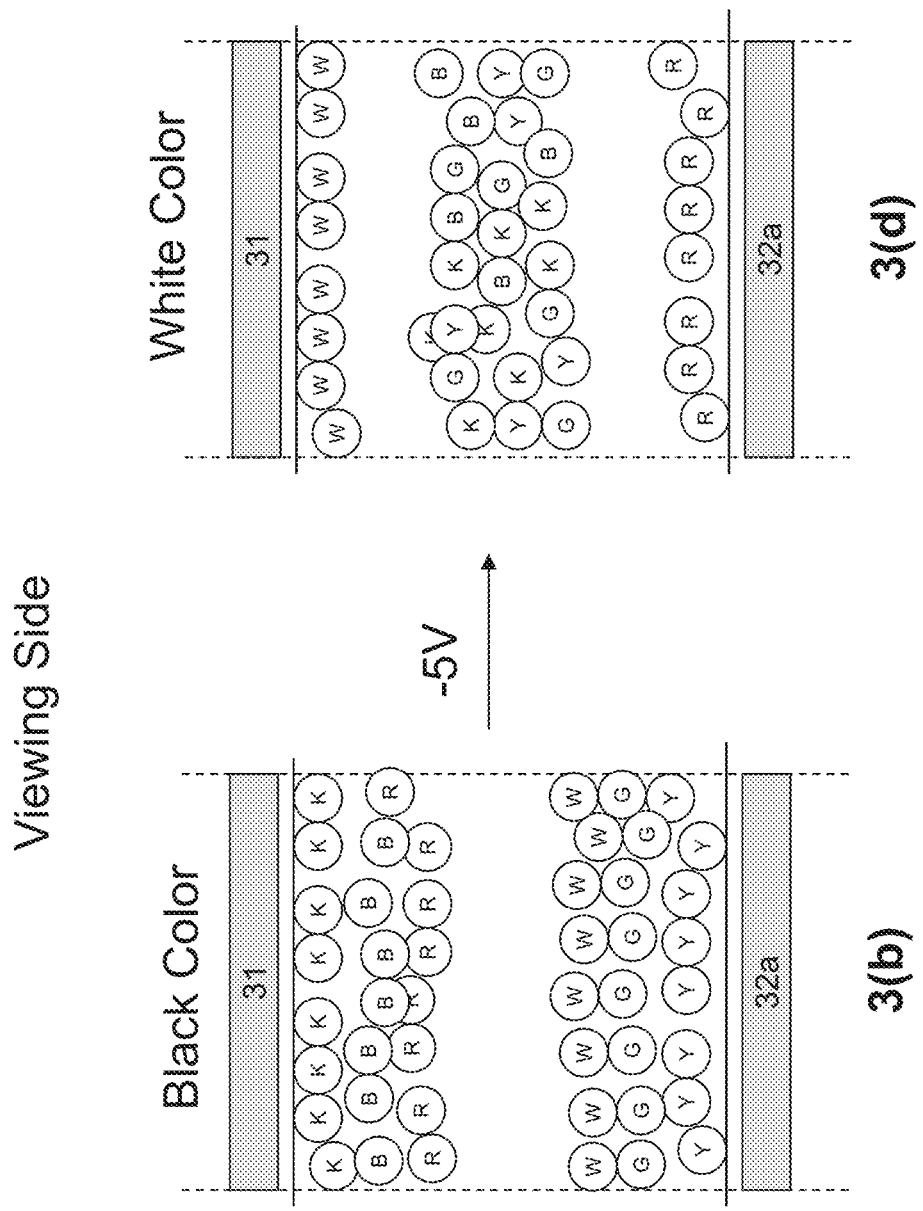

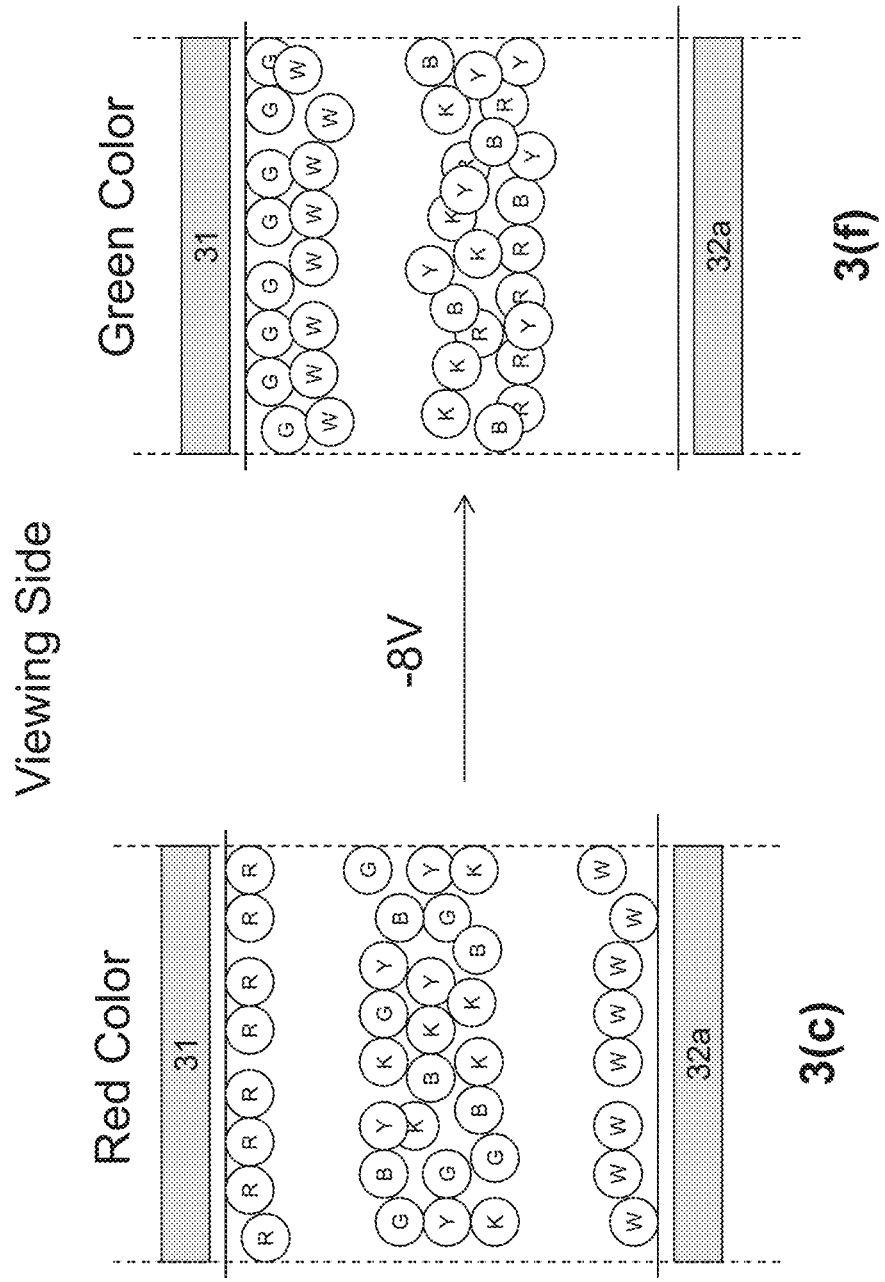

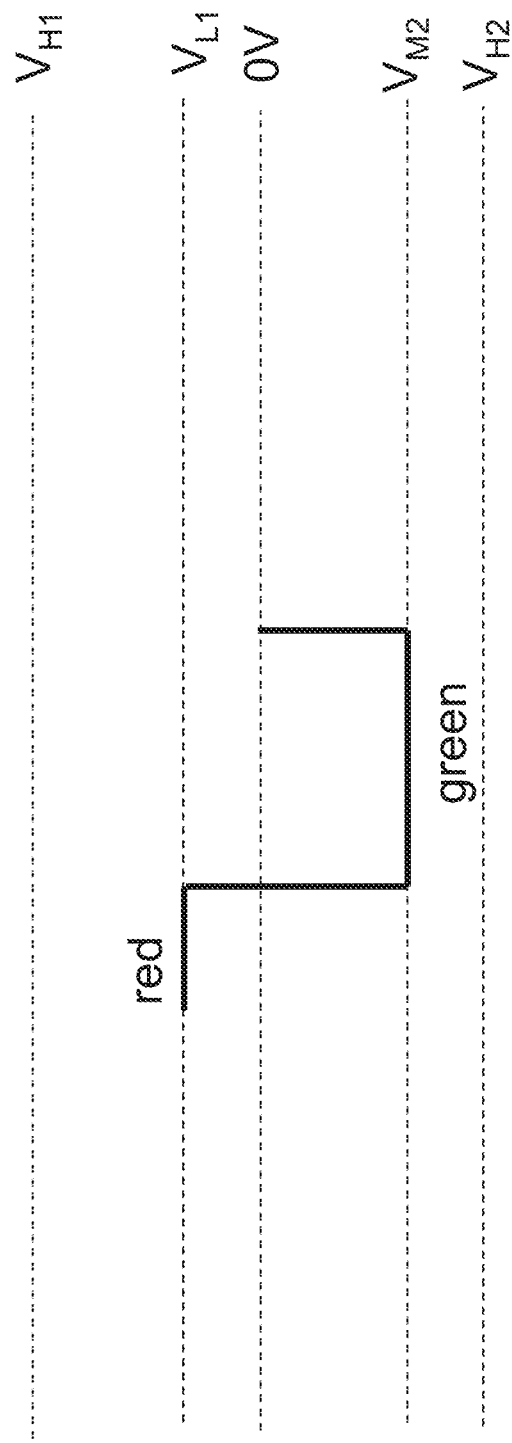

COLOR DISPLAY DEVICE AND DRIVING METHODS THEREFOR

REFERENCE TO RELATED APPLICATIONS

This application is a continuation of application Ser. No. 15/859,407, filed Dec. 30, 2017 (Publication No. 2018/0122306, now U.S. Pat. No. 10,380,955, issued Aug. 13, 2019). Application Ser. No. 15/859,407 is itself a continuation-in-part of application Ser. No. 15/168,493, filed May 31, 2016 (Publication No. 2016/0275874, now U.S. Pat. No. 9,922,603, issued Mar. 20, 2018), which itself is a continuation-in-part of application Ser. No. 14/626,552, filed Feb. 19, 2015 (Publication No. 2015/0234250, now U.S. Pat. No. 9,541,814, issued Jan. 10, 2017) and of application Ser. No. 14/794,689, filed Jul. 8, 2015 (Publication No. 2016/0011484, now U.S. Pat. No. 9,671,668, issued Jun. 6, 2017). Application Ser. No. 15/859,407 is also a continuation-in-part of application Ser. No. 15/088,465, filed Apr. 1, 2016 (Publication No. 2016/0293111, now U.S. Pat. No. 10,032,419, issued Jul. 24, 2018). Application Ser. No. 14/626,552 claims benefit of provisional Application Ser. No. 62/061,077, filed Oct. 7, 2014, while application Ser. No. 14/794,689 claims benefit of provisional Application Ser. No. 62/022,557, filed Jul. 9, 2014. Application Ser. No. 15/168,493 also claims benefit of provisional Application Ser. No. 62/169,300, filed Jun. 1, 2015 and of provisional Application Ser. No. 62/241,633, filed Oct. 14, 2015. Application Ser. No. 15/088,465 claims benefit of provisional Application Ser. No. 62/143,631, filed Apr. 6, 2015.

The entire contents of the aforementioned applications, and of all other U.S. patents and published and applications mentioned below, are herein incorporated by reference.

BACKGROUND OF INVENTION

This invention relates to color display devices in which each pixel can display at least five, and in some cases at least six, high quality color states, and to methods for driving such color display devices.

In order to achieve a color display, color filters are often used. The most common approach is to add color filters on top of black/white sub-pixels of a pixelated display to display red, green and blue colors. When a red color is desired, the green and blue sub-pixels are turned to the black state so that the only color displayed is red. When a blue color is desired, the green and red sub-pixels are turned to the black state so that the only color displayed is blue. When a green color is desired, the red and blue sub-pixels are turned to the black state so that the only color displayed is green. When the black state is desired, all three-sub-pixels are turned to the black state. When the white state is desired, the three sub-pixels are turned to red, green and blue, respectively, and as a result, a white state is seen by the viewer.

The biggest disadvantage of using such a technique for a reflective display is that since each of the sub-pixels has a reflectance of about one third of the desired white state, the white state is fairly dim. To compensate for this, a fourth sub-pixel may be added which can display only the black and white states, so that the white level is doubled at the expense of the red, green or blue color level (where each sub-pixel is only one fourth of the area of the pixel). Brighter colors can be achieved by adding light from the white pixel, but this is achieved at the expense of color gamut to cause the colors to be very light and unsaturated. A similar result can be achieved by reducing the color saturation of the three sub-pixels. Even with this approach, the white level is normally substantially less than half of that of a black and white display, rendering it an unacceptable choice for display devices, such as e-readers or displays that need well readable black-white brightness and contrast.

In view of these disadvantages of color filter based displays, efforts have been made to develop color displays in which three or more colors can be displayed at each pixel. See, in addition to the aforementioned US 2015/0234250 and US 2016/0011484, U.S. Pat. No. 8,717,664, US 2015/0103394, US 2015/0097877, U.S. Pat. No. 9,170,468, US 2015/0198858, US 2016/0140909 and US 2014/0340430. For convenience, such displays may hereinafter be referred to as "multi-color pixel" of "MCP" displays; when it is desired to specify how many colors are displayed at each pixel, reference may be made to "5-CP" and "6-CP" displays.

SUMMARY OF INVENTION

Accordingly, this invention provides a display layer having a first, viewing surface and a second surface on the opposed side of the display layer from the first surface, the display layer further comprising an electrophoretic medium comprising a fluid and first, second, third, fourth and fifth types of particles dispersed in the fluid, the first, second, third, fourth and fifth types of particles having respectively first, second, third, fourth and fifth optical characteristics differing from one another, the first, third and fourth types of particles having charges of one polarity and the second and fifth types of particles having charges of the opposite polarity, the first type of particles having a greater zeta potential or electrophoretic mobility than the third type of particles, the third type of particles having a greater zeta potential or electrophoretic mobility than the fourth type of particles, and the second type of particles having a greater zeta potential or electrophoretic mobility than the fifth type of particles.

The display layer of the present invention may also comprise a sixth type of particles having a sixth optical characteristic differing from the first, second, third, fourth and fifth optical characteristics, the sixth type of particles bearing a charge of the same polarity as the second and fifth particles but having a zeta potential or electrophoretic mobility intermediate those of the second and the fifth types of particles.

In one embodiment, the electrophoretic medium used in the display layer of the present invention may further comprise substantially uncharged neutral buoyancy particles. The term "substantially uncharged" refers to the particles which are either uncharged or carry a charge which is less than 5% of the average charge carried by the higher charged particles. In one embodiment, the neutral buoyancy particles are non-charged. The term "neutral buoyancy" refers to particles which do not rise or fall with gravity. In other words, the particles would float in the fluid between the two electrodes. In one embodiment, the density of the neutral buoyancy particles may be the same as the density of the solvent or solvent mixture in which they are dispersed.

The concentration of the substantially uncharged neutral buoyancy particles in the display fluid is preferably in the range of about 0.01 to about 10% by volume, more preferably in the range of about 0.02 to about 1% by volume. The term "about" refers to a range which is ±10% of the indicated value.

This invention also provides a method of driving a display layer having a first, viewing surface and a second surface on the opposed side of the display layer from the first surface, the display layer being provided with means for applying an electric field between the first and second surfaces, the display layer further comprising an electrophoretic medium comprising a fluid and first, second, third, fourth and fifth types of particles dispersed in the fluid, the first, second, third, fourth and fifth types of particles having respectively first, second, third, fourth and fifth optical characteristics differing from one another, the first, third and fourth type of particles having charges of one polarity and the second and fifth types of particles having charges of the opposite polarity, the method comprising, in any order:

(i) applying a first electric field having a high magnitude and a polarity driving the first type of particles towards the viewing surface, thereby causing the display layer to display the first optical characteristic at the viewing surface;

(ii) applying a second electric field having a high magnitude and a polarity driving the second type of particles towards the viewing surface, thereby causing the display layer to display the second optical characteristic at the viewing surface;

(iii) when the second optical characteristic is displayed at the viewing surface, applying a third electric field having a low magnitude and a polarity driving the fourth type of particles towards the viewing surface, thereby causing the display layer to display the fourth optical characteristic at the viewing surface;

(iv) when the first optical characteristic is displayed at the viewing surface, applying a fourth electric field having a low magnitude and a polarity driving the fifth type of particles towards the viewing surface, thereby causing the display layer to display the fifth optical characteristic at the viewing surface; and (v) when the fifth optical characteristic is displayed at the viewing surface applying a fifth electric field having a magnitude intermediate the first and third electric fields and a polarity driving the third type of particles towards the viewing surface, thereby causing the display layer to display the third optical characteristic at the viewing surface.

In this method, the electrophoretic layer may further comprise a sixth type of particles having a sixth optical characteristic differing from the first, second, third, fourth and fifth optical characteristics, the sixth type of particles bearing a charge of the same polarity as the second and fifth particles, and the method may further comprise:

(vi) when the fourth optical characteristic is displayed at the viewing surface applying a sixth electric field having a magnitude intermediate the second and fourth electric fields and a polarity driving the sixth type of particles towards the viewing surface, thereby causing the display layer to display the sixth optical characteristic at the viewing surface.

In either the five or six particle method of the present invention, step (iii) may be effected by first applying a high electric field having a polarity which drives the fourth particles towards the second surface and thereafter applying the third electric field. A shaking waveform may be applied prior to application of the high electric field, and the high electric field may be applied for a second period prior to the shaking waveform. The application of the high electric field and the application of the third electric field may repeated at least twice, at least four times or at least eight times. Following the application of the third electric field, no electric field may be applied for a period. Alternatively or in addition, no electric field may be applied for a period between the application of the high electric field and the application of the third electric field.

In either the five or six particle method of the present invention, step (iv) may be effected by first applying a high electric field having a polarity which drives the fifth particles towards the second surface and thereafter applying the fourth electric field. A shaking waveform may be applied prior to application of the high electric field, and the high electric field may be applied for a second period prior to the shaking waveform. The application of the high electric field and the application of the fourth electric field may be repeated at least twice, at least four times or at least eight times. Following the application of the fourth electric field, no electric field may be applied for a period. Alternatively or in addition, no electric field may be applied for a period between the application of the high electric field and the application of the fourth electric field.

In either the five or six particle method of the present invention, step (v) may be effected by first applying a low electric field having a magnitude less than that of the fifth electric field and a polarity which drives the third particles towards the second surface, and thereafter applying the fifth electric field. A high electric field having a magnitude greater than that of, but the same polarity as, the fifth electric field may be applied prior to application of the low electric field. A shaking waveform may be applied prior to the high electric field. The high electric field may be applied for a second period prior to the shaking waveform. Alternatively, in either the five or six particle method of the present invention, step (v) may be effected by first applying a low electric field having a magnitude less than that of the fifth electric field and a polarity which drives the third particles towards the second surface and thereafter applying multiple periods of the fifth electric field alternating with periods of zero electric field. A high electric field having a magnitude greater than that of, but the same polarity as, the fifth electric field may be applied prior to application of the low electric field. A shaking waveform may be applied prior to the high electric field. The high electric field may be applied for a second period prior to the shaking waveform.

In a six particle method of the present invention, step (vi) may effected by first applying a low electric field having a magnitude less than that of the sixth electric field and a polarity which drives the sixth particles towards the second surface and thereafter applying the sixth electric field. A high electric field having a magnitude greater than that of, but the same polarity as, the sixth electric field may be applied prior to application of the low electric field. A shaking waveform may applied prior to the high electric field. The high electric field may be applied for a second period prior to the shaking waveform. Alternatively, in a six particle method of the present invention, step (vi) may effected by first applying a low electric field having a magnitude less than that of the sixth electric field and a polarity which drives the sixth particles towards the second surface and thereafter applying multiple periods of the sixth electric field alternating with periods of zero electric field. A high electric field having a magnitude greater than that of, but the same polarity as, the sixth electric field may be applied prior to application of the low electric field. A shaking waveform may be applied prior to the high electric field. The high electric field may be applied for a second period prior to the shaking waveform.

As described below with reference to FIG. 2, the shaking waveform may consist simply of repeating a pair of opposite driving pulses for many cycles. However, it has been found advantageous to use a three-part shaking waveform as follows:

(i) apply a first electric field of one polarity (and typically of the same magnitude as the highest electric field used in driving the display layer) for a period sufficient to cause the optical characteristic of one of the first and second particles at the viewing surface;

(ii) thereafter, apply a second electric field having a polarity opposite to that of the first electric field (and typically of the same magnitude as the first electric field) for a period insufficient to cause the optical characteristic of the other of the first and second particles to be displayed at the viewing surface; and (iii) thereafter, applying a shaking waveform (i.e., repeating a pair of opposite driving pulses for at least several cycles.

This three-part shaking waveform may be applied to both the five and six charged particle display layers of the present invention. After the shaking waveform, the optical characteristics of the various charged particles may be displayed in the manners previously described. Thus, the three-part shaking waveform may be followed by:

(iv) applying a third electric field having a polarity driving the first type of particles towards the viewing surface, thereby causing the display layer to display the first optical characteristic at the viewing surface; or (v) applying a fourth electric field having a polarity driving the second type of particles towards the viewing surface, thereby causing the display layer to display the second optical characteristic at the viewing surface.

Following these steps to display the first and/or second optical characteristic, the method of the present invention may further comprise:

(vi) when the second optical characteristic is displayed at the viewing surface after step (v), applying a fifth electric field having a magnitude lower than the fourth electric field and a polarity driving the fourth type of particles towards the viewing surface, thereby causing the display layer to display the fourth optical characteristic at the viewing surface; or (vii) when the first optical characteristic is displayed at the viewing surface after step (iv), applying a sixth electric field having a magnitude lower than the third electric field and a polarity driving the fifth type of particles towards the viewing surface, thereby causing the display layer to display the fifth optical characteristic at the viewing surface.

Following these steps to display the fourth and/or fifth optical characteristic, the method of the present invention using a five charged particle display layer may further comprise:

(viii) when the fifth optical characteristic is displayed at the viewing surface applying a seventh electric field having a magnitude intermediate the third and fifth electric fields and a polarity driving the third type of particles towards the viewing surface, thereby causing the display layer to display the third optical characteristic at the viewing surface.

Alternatively, following these steps to display the fourth and/or fifth optical characteristic, the method of the present invention using a six charged particle display layer may further comprise:

(viii) when the fifth optical characteristic is displayed at the viewing surface applying a seventh electric field having a magnitude intermediate the third and sixth electric fields and a polarity driving the third type of particles towards the viewing surface, thereby causing the display layer to display the third optical characteristic at the viewing surface; or (ix) when the fourth optical characteristic is displayed at the viewing surface applying a sixth electric field having a magnitude intermediate the fourth and fifth electric fields and a polarity driving the sixth type of particles towards the viewing surface, thereby causing the display layer to display the sixth optical characteristic at the viewing surface.

BRIEF DESCRIPTION OF DRAWINGS

FIGS. 3-1 to 3-5 are schematic cross-sections similar to those of FIG. 1 but illustrating changes in particle positions effected during various steps of driving methods of the present invention.

FIG. 4 illustrates a waveform which can used to cause the display layer shown in FIG. 1 to effect the transition shown in FIG. 3-2 to display the red color of low charged positive particles.

FIGS. 5-7, 8-10 and 11-13 illustrate alternative waveforms which may be used in place of part of the waveform shown in FIG. 4.

FIGS. 29-1 to 29-7 are schematic cross-sections similar to those of FIGS. 3-1 to 3-5 but illustrating changes in particle positions in the display layer of FIG. 28 effected during various steps of driving methods of the present invention.

FIGS. 30-33 illustrate waveforms which can be used to cause the display layer shown in FIG. 28 to effect the transitions shown in FIG. 29-6 or 29-7 to display the green color of the medium negative particles.

DETAILED DESCRIPTION

Figure 1:
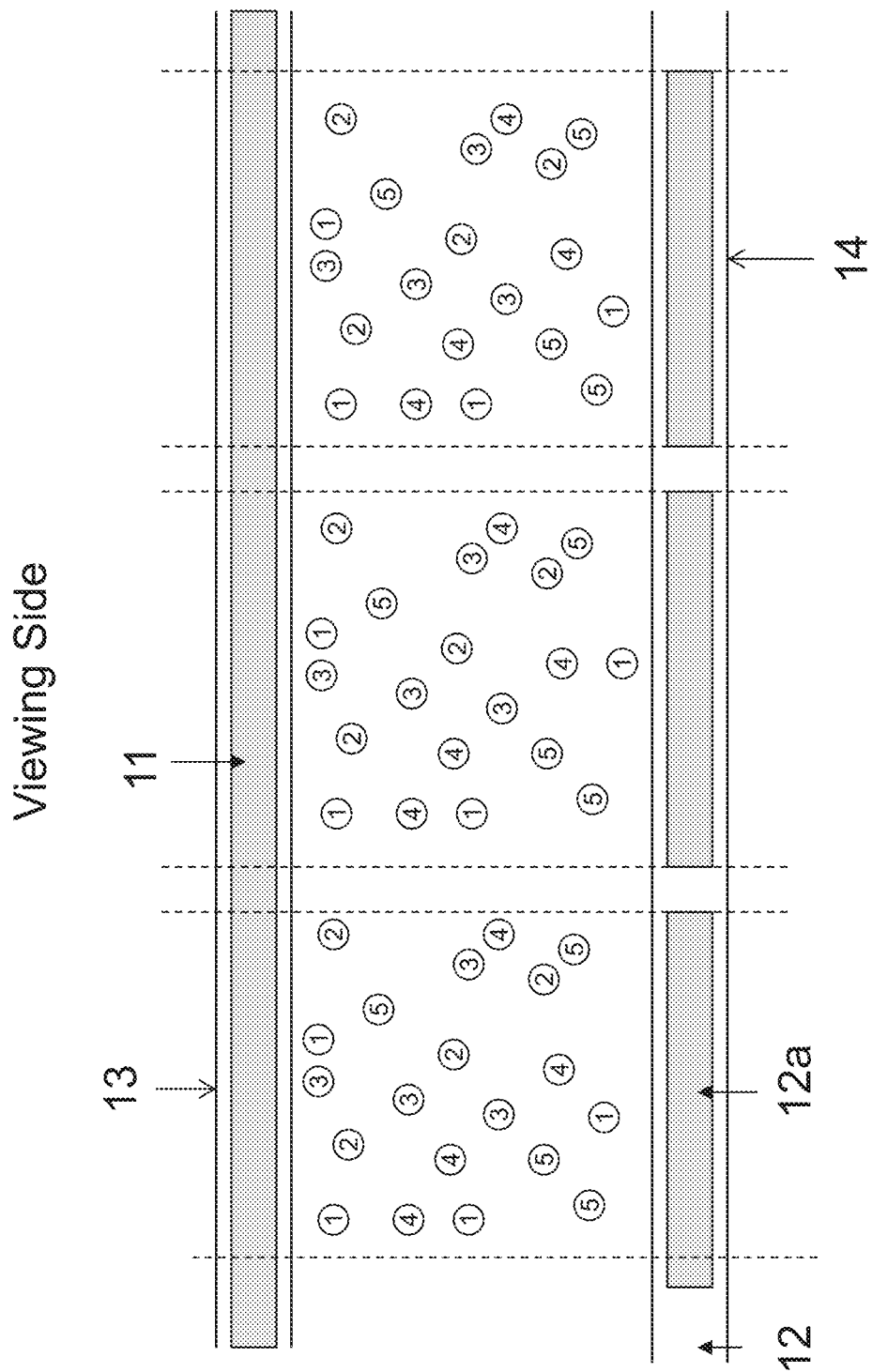
FIG. 1 is a schematic cross-section through a display layer containing five different types of particles which can display five different color states.

The driving methods of the present invention are suitable for driving an electrophoretic display utilizing a display fluid which comprises five, or in some cases six, types of particles dispersed in a fluid, which is typically a dielectric solvent or solvent mixture. The particles may be referred to as a first type of particles, a second type of particles, a third type of particles, a fourth type of particles and a fifth type of particles, and a sixth type of particles (when present). The various types of particles have different optical characteristics. These optical characteristics are typically colors perceptible to the human eye, but may be other optical properties, such as optical transmission, reflectance, luminescence or, in the case of displays intended for machine reading, pseudo-color in the sense of a change in reflectance of electromagnetic wavelengths outside the visible range. The invention broadly encompasses particles of any colors as long as the multiple types of particles are visually distinguishable. As an example, the particles may be any combinations of white particles (W), black particles (K), red particles (R), green particles (G), blue particles (B), cyan particles (C), magenta particles (M) and yellow particles (Y).

In addition, the various types of particles have different levels of charge potential. For example, five types of particles may be high positive particles, middle positive particles, low positive particles, high negative particles and low negative particles, or alternatively, high negative particles, middle negative particles, low negative particles, high positive particles and low positive particles. When six types of particles are present, they may be high positive particles, middle positive particles, low positive particles, high negative particles, middle negative particles and low negative particles. The term "charge potential", in the context of the present application, may be used interchangeably with "zeta potential" or with electrophoretic mobility. The charge polarities and levels of charge potential of the particles may be varied by the method described in U.S. Patent Application Publication No. 2014/0011913.

The magnitudes of the charges on, zeta potentials or electrophoretic mobilities on the "high positive" particles and the "high negative" particles may be the same or different. Likewise, the magnitudes of these parameters on the "middle positive" and the "middle negative" particles may be the same or different, and the magnitudes of these parameters on the "low positive" particles and the "low negative" particles may be the same or different.

As already mentioned, the charge potentials of the particles may be measured in terms of zeta potential. In one embodiment, the zeta potential is determined by Colloidal Dynamics AcoustoSizer TIM with a CSPU-100 signal processing unit, ESA EN #Attn flow through cell (K:127). The instrument constants, such as density of the solvent used in the sample, dielectric constant of the solvent, speed of sound in the solvent, viscosity of the solvent, all of which at the testing temperature (25° C.) are entered before testing. Pigment samples are dispersed in the solvent (which is usually a hydrocarbon fluid having less than 12 carbon atoms), and diluted to be 5-10% by weight. The sample also contains a charge control agent (Solsperse 17000, available from Lubrizol Corporation, a Berkshire Hathaway company; "Solsperse" is a Registered Trade Mark), with a weight ratio of 1:10 of the charge control agent to the particles. The mass of the diluted sample is determined and the sample is then loaded into the flow through cell for determination of the zeta potential. Methods and apparatus for the measurement of electrophoretic mobility are well known to those skilled in the technology of electrophoretic displays.

The dielectric fluid in which the particles are typically dispersed may be clear and colorless. It preferably has a dielectric constant in the range of about 2 to about 30, more preferably about 2 to about 15 for high particle mobility. Examples of suitable dielectric fluids include hydrocarbons such as isoparaffin, decahydronaphthalene (DECALIN), 5-ethylidene-2-norbornene, fatty oils, paraffin oil, silicon fluids, aromatic hydrocarbons such as toluene, xylene, phenylxylylethane, dodecylbenzene or alkylnaphthalene, halogenated solvents such as perfluorodecalin, perfluorotoluene, perfluoroxylene, dichlorobenzotrifluoride, 3,4,5-trichlorobenzotrifluoride, chloropentafluorobenzene, dichlorononane or pentachlorobenzene, and perfluorinated solvents such as FC-43, FC-70 or FC-5060 from 3M Company, St. Paul Minn., low molecular weight halogen containing polymers such as poly(perfluoropropylene oxide) from TCI America, Portland, Oreg., poly(chlorotrifluoroethylene) such as Halocarbon Oils from Halocarbon Product Corp., River Edge, N.J., perfluoropolyalkylether such as Galden from Ausimont or Krytox Oils and Greases K-Fluid Series from DuPont, Del., polydimethylsiloxane based silicone oil from Dow-corning (DC-200).

The particles are preferably opaque, in the sense that they should be light reflecting not light transmissive. It be apparent to those skilled in color science that if the particles were light transmissive, some of the color states appearing in the following description of specific embodiments of the invention would be severely distorted or not obtained. White particles are of course light scattering rather than reflective but care should be taken to ensure that not too much light passes through a layer of white particles. For example, if in the white state shown in FIG. 3-3 discussed below, the layer of white particles allowed a substantial amount of light to pass through it and be reflected from the particles behind it, the brightness of the white state could be substantially reduced. The particles used may be primary particles without a polymer shell. Alternatively, each particle may comprise an insoluble core with a polymer shell. The core could be either an organic or inorganic pigment, and it may be a single core particle or an aggregate of multiple core particles. The particles may also be hollow particles.

In the case of white particles (W), the primary particles or core particles may be $TiO_2$, $ZrO_2$, $ZnO$, $Al_2O_3$, $Sb_2O_3$, $BaSO_4$, $PbSO_4$ or the like. For the black particles (K), the primary particles or core particles may be CI pigment black 26 or 28 or the like (e.g., manganese ferrite black spinel or copper chromite black spinel) or carbon black. For the other colored particles (which are non-white and non-black), the primary particles or core particles may include, but are not limited to, CI pigment PR 254, PR122, PR149, PG36, PG58, PG7, PB15:3, PY83, PY138, PY150, PY155 or PY20. Those are commonly used organic pigments described in color index handbooks, "New Pigment Application Technology" (CMC Publishing Co, Ltd, 1986) and "Printing Ink Technology" (CMC Publishing Co, Ltd, 1984). Specific examples include Clariant Hostaperm Red D3G 70-EDS, Hostaperm Pink E-EDS, PV fast red D3G, Hostaperm red D3G 70, Hostaperm Blue B2G-EDS, Hostaperm Yellow H4G-EDS, F2G-EDS, Novoperm Yellow HR-70-EDS, Hostaperm Green GNX, BASF Irgazine red L 3630, Cinquasia Red L 4100 HD, and Irgazine Red L 3660 HD; Sun Chemical phthalocyanine blue, phthalocyanine green, diarylide yellow or diarylide AAOT yellow. Also, for the other colored particles (non-white and non-black), the primary particles or core particles may also be inorganic pigments, such as red, green, blue and yellow pigments. Examples may include, but are not limited to, CI pigment blue 28 (PB28), CI pigment green 50 and CI pigment yellow 227.

The percentages of different types of particles in the fluid may vary. For example, one type of particles may take up 0.1% to 10%, preferably 0.5% to 5%, by volume of the electrophoretic fluid; another type of particles may take up 1% to 50%, preferably 5% to 20%, by volume of the fluid; and each of the remaining types of particles may take up 2% to 20%, preferably 4% to 10%, by volume of the fluid.

The various types of particles may have different particle sizes. For example, the smaller particles may have a size which ranges from about 50 nm to about 800 nm. The larger particles may have a size which is about 2 to about 50 times, and more preferably about 2 to about 10 times, the sizes of the smaller particles.

As previously mentioned, in addition to the charged particles, the fluid used in the display layer of the present invention may comprise substantially uncharged neutral buoyancy particles. These substantially uncharged neutral buoyancy particles may be formed from a polymeric material. The polymeric material may be a copolymer or a homopolymer. Examples of the polymeric material for the substantially uncharged neutral buoyancy particles may include, but are not limited to, polyacrylate, polymethacrylate, polystyrene, polyaniline, polypyrrole, polyphenol and polysiloxane. Specific examples of the polymeric material may include, but are not limited to, poly(pentabromophenyl methacrylate), poly(2-vinylnapthalene), poly(naphthyl methacrylate), poly(α-methylstyrene), poly(N-benzyl methacrylamide) and poly(benzyl methacrylate).

Desirably, the substantially uncharged neutral buoyancy particles are formed from a polymer which is not soluble in the solvent of the display fluid, and also has a high refractive index. In one embodiment, the refractive index of the substantially uncharged neutral buoyancy particles is different from that of the solvent or solvent mixture in which the particles are dispersed. However, typically the refractive index of the substantially uncharged neutral buoyancy particles is higher than that of the solvent or solvent mixture. In some cases, the refractive index of the substantially uncharged neutral buoyancy particles may be above 1.45. In one embodiment, the materials for the substantially uncharged neutral buoyancy particles may comprise an aromatic moiety.

The substantially uncharged neutral buoyancy particles may be prepared from monomers through polymerization techniques, such as suspension polymerization, dispersion polymerization, seed polymerization, soap-free polymerization, emulsion polymerization or physical method, including inverse emulsification-evaporation process. The monomers are polymerized in the presence of a dispersant. The presence of the dispersant allows the polymer particles to be formed in a desired size range and the dispersant may also form a layer physically or chemically bonded to the surface of the polymer particles to prevent the particles from agglomeration. The dispersant preferably has a long chain (of at least eight atoms), which may stabilize the polymer particles in a hydrocarbon solvent. Such dispersants may be an acrylate-terminated or vinyl-terminated macromolecule, which are suitable because the acrylate or vinyl group can co-polymerize with the monomer in the reaction medium.

One specific example of the dispersant is acrylate terminated polysiloxane (Gelest, MCR-M17, MCR-M22), Another type of suitable dispersants is a polyethylene macro-monomer, of the formula:

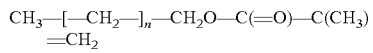

The backbone of the macro-monomer may be a polyethylene chain and the integer "n" may be 30-200. The synthesis of this type of macro-monomer may be found in Seigou Kawaguchi et al, Designed Monomers and Polymers, 2000, 3, 263. If the fluid system is fluorinated, the dispersants are then preferably also fluorinated.

Alternatively, the substantially uncharged neutral buoyancy particles may be formed from a core particle coated with a polymeric shell and the shell may be formed, for example, from any of the polymeric material identified above. The core particle may be of an inorganic pigment such as $TiO_2$, $ZrO_2$, ZnO, $Al_2O_3$, CI pigment black 26 or 28 or the like (e.g., manganese ferrite black spinel or copper chromite black spinel), or an organic pigment such as phthalocyanine blue, phthalocyanine green, diarylide yellow, diarylide AAOT yellow, and quinacridone, azo, rhodamine, perylene pigment series from Sun Chemical, Hansa yellow G particles from Kanto Chemical, and Carbon Lampblack from Fisher, or the like. Core-shell substantially uncharged neutral buoyancy particles may be formed by a microencapsulation method, such as coacervation, interfacial polycondensation, interfacial cross-linking, in-suit polymerization or matrix polymerization.

The size of the substantially uncharged neutral buoyancy particles is preferably in the range of about 100 nm to about 5 μm.

The substantially uncharged neutral buoyancy particles may have a color substantially the same visually to the color of one of the types of charged particles. For example, in a display fluid, there may be charged white, black, red, yellow, green and blue particles and substantially uncharged neutral buoyancy particles, and in this case, the substantially uncharged neutral buoyancy particles may be white, black, red, yellow, green or blue. Alternatively, the substantially uncharged neutral buoyancy particles may have a color substantially different from the color of the charged particles.

The presence of the substantially uncharged neutral buoyancy particles in the fluid increases reflection of incident light, thus also improving the contrast ratio, especially if they are formed from a reflective material. Furthermore, it has been found empirically that the presence of the neutral buoyancy particles results in "cleaner" colors being displayed at the viewing surface, i.e., that there is less mixing of the colors. Image stability may also be improved by the addition of the substantially uncharged neutral buoyancy particles. The substantially uncharged neutral buoyancy particles can fill in the gaps resulted from the charged particles being over packed on the surface of an electrode under an electrical field, thus preventing the charged particles from settling due to gravitational force.

In addition, if the substantially uncharged neutral buoyancy particles are white, they may enhance the reflectivity of the display. If they are black, they may enhance the blackness of the display. In any case, the substantially uncharged neutral buoyancy particles do not affect the driving behavior of the charged particles in the fluid.

Preferred embodiments of the invention will now be described in detail, though by way of illustration only, with reference to the accompanying drawings. Five particle systems of the invention will be described first, and then the modifications needed to incorporate a sixth type of particles will be described.

As already mentioned, FIG. 1 is a schematic cross-section through a display layer containing five different types of particles which can display five different color states (i.e., a 5-CP display layer). The display layer has a first, viewing surface 13 (the upper surface as illustrated in FIG. 1) and a second surface 14 on the opposed side of the display layer from the first surface 13. The term "viewing surface" of course refers to the side of the display on which a user normally views images. The display layer comprises an electrophoretic medium comprising a fluid and first, second, third fourth and fifth types of particles (indicated respectively by numbers 1-5 enclosed in a circle) dispersed in the fluid. The first, second, third, fourth and fifth types of particles having respectively first, second, third, fourth and fifth optical characteristics differing from one another, the first, third and fourth type of particles having charges of one polarity and the second and fifth types of particles having charges of the opposite polarity. More specifically, in the system shown in FIG. 1, the first type of particles are black particles (K) carrying a high positive charge and the second type of particles are yellow particles (Y) carrying a high negative charge. The third type of particles are blue (B) particles carrying a middle positive charge and the fourth type of particles are red (R) particles are positively charged; but their magnitudes are progressively less than that of the black particles, which means that the black particles are high-positive particles, the blue particles are mid-positive particles and the red particles are low-positive particles. The fifth type of particles are white (W) particles carrying a low negative charge.

The display layer shown in FIG. 1 is provided with means for applying electric fields across the display layer, these field applying means having the form of two electrode layers, the first of which is a light-transmissive or transparent common electrode layer 11 extending across the entire viewing surface of the display. The electrode layer 11 may be formed from indium tin oxide (ITO) or a similar light-transmissive conductor. The other electrode layer 12 is a layer of discrete pixel electrodes 12a, which define individual pixel of the display, these pixels being indicated by dotted vertical lines in FIG. 1. The pixel electrodes 12a may form part of an active matrix driving system with, for example, a thin film transistor (TFT) backplane, but other types of electrode addressing may be used provided the electrodes provide the necessary electric field across the display layer.

Figure 2:
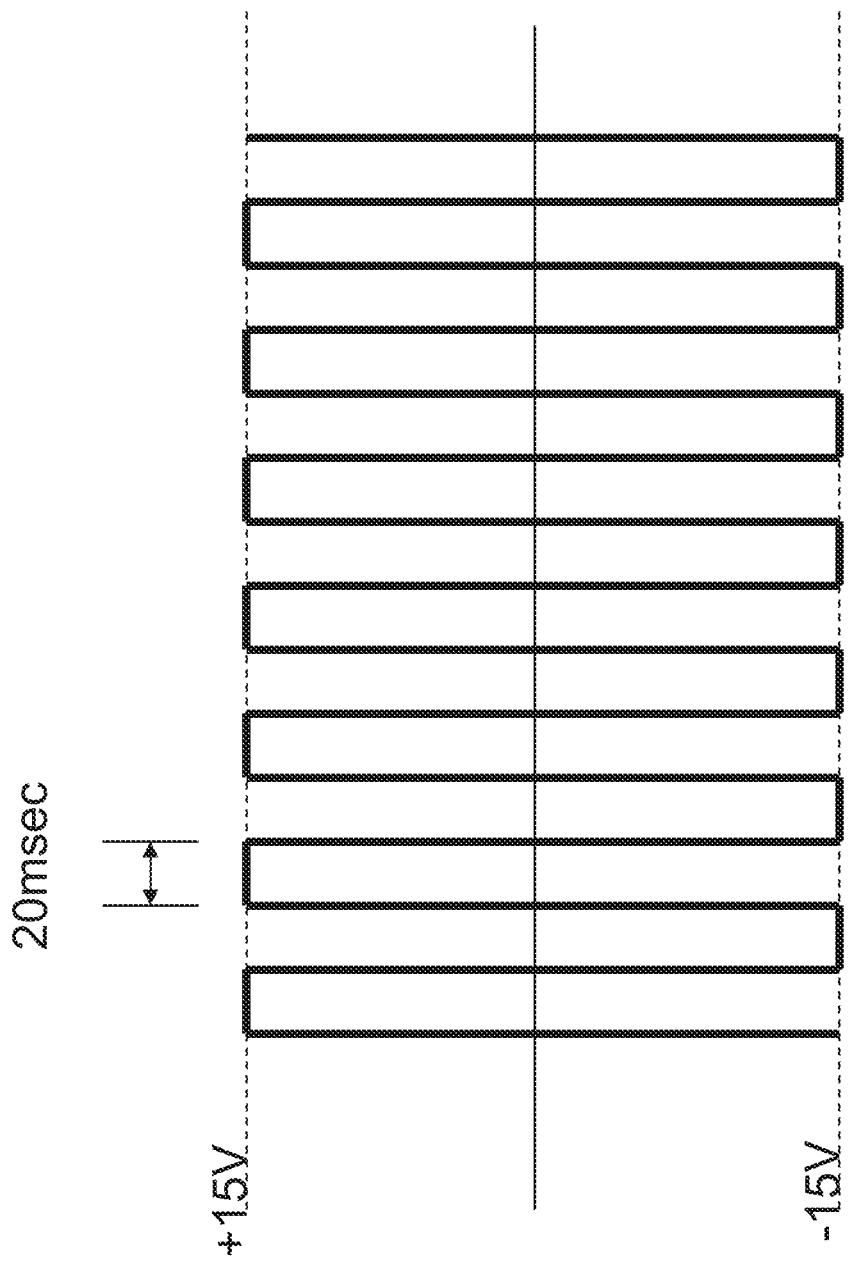
FIG. 2 shows a shaking waveform which may be used in the driving methods of the present invention.

FIG. 2 is a voltage versus time graph of a shaking waveform may which be used in the driving methods of the present invention. The shaking waveform may consist of repeating a pair of opposite driving pulses for many cycles. For example, the shaking waveform may consist of a +15V pulse for 20 msec and a −15V pulse for 20 msec, with this pair of pulses being repeated 50 times. The total duration of such a shaking waveform would be 2000 msec. For ease of illustration, FIG. 2 illustrates only seven pairs of pulses. In practice, there may be at least 10 repetitions (i.e., ten pairs of positive and negative pulses). The shaking waveform may be applied regardless of the optical state prior to a driving voltage is applied. After the shaking waveform is applied, the optical state (at either the viewing surface or the second surface, if visible) will not be a pure color, but will be a mixture of the colors of the five types of pigment particles.

Each of the driving pulses in the shaking waveform is applied for not exceeding 50% (or not exceeding 30%, 10% or 5%) of the driving time required for driving from the color state of the high positive particles to the color state of the high negative particles, or vice versa. For example, if it takes 300 msec to drive a display device from the color state of the high positive particles to the color state of the high negative particles, or vice versa, the shaking waveform may consist of positive and negative pulses, each applied for not more than 150 msec. In practice, it is preferred that the pulses be shorter.

As already mentioned, the display layer shown in FIG. 1 comprises first, black, high positive particles, second, yellow, high negative yellow particles, third, blue, middle positive particles, fourth red, low positive particles, and fifth, white, low negative particles. The manner in which the colors of the various particles can be displayed at the viewing surface will now be described with reference to FIGS. 3-1 to 3-5.

When a high negative driving voltage ($V_{H2}$, e.g., −15V) is applied to the pixel electrode (3b) (hereinafter, it will be assumed that the common electrode will be maintained at 0V, so in this case the common electrode is strongly positive relative to the pixel electrode) for a time period of sufficient length, an electric field is generated to cause the high negative yellow particles to be driven adjacent the common electrode 31 and the high positive black particles driven adjacent the pixel electrode 32a.

The low positive red and middle positive blue particles move slower than the high positive black particles and as a result, the blue particles are above the black particles but below the red particles because the blue particles carry higher charges than the red particles. The black particles are closest to the pixel electrode, as shown in 3(a). The low negative white particles move slower than the high negative yellow particles, and therefore the white particles are below and masked by the yellow particles and therefore not visible at the viewing surface. Thus, a yellow color is displayed at the viewing surface.

Conversely, when a high positive driving voltage ($V_{H1}$, e.g., +15V) is applied to the pixel electrode (3a) (so that the common electrode is strongly negative relative to the pixel electrode) for a time period of sufficient length, an electric field is generated to cause the high positive black particles to be driven adjacent the common electrode 31 and the high negative yellow particles adjacent the pixel electrode 32a. The resulting particle distribution (3(b)) is the exact inverse of that shown in 3(a) and a black color is displayed at the viewing surface.

The high driving voltages thus applied may be in the form of single pulses or pulsing waveforms having alternating periods of zero voltage and the driving voltage. The magnitude of the driving voltage used in a pulsing waveform may be or may not be the same as that of the driving voltage used in a single pulse method. There may be, for example, 10-200 cycles of pulsing. A pulsing waveform may lead to better color performance because it can prevent aggregation of the particles with each other, which usually causes reduction of hiding power of the layers of particles.

The driving methods used in FIG. 3-1 therefore may be summarized as follows:

A driving method for an electrophoretic display comprising a first surface on the viewing side, a second surface on the non-viewing side and an electrophoretic fluid which fluid is sandwiched between a common electrode and a layer of pixel electrodes and comprises a first type of particles, a second type of particles, a third type of particles, a fourth type of particles and a fifth type of particles, all of which are dispersed in a solvent or solvent mixture, wherein:

(a) the five types of pigment particles have optical characteristics differing from one another;

(b) the first and second types of particles carry opposite charge polarities;

(c) the third and fourth types of particles carry the same charge polarity as the first type of particles, and the first type, the third type and the fourth type of particles have progressively lower magnitudes; and (d) the fifth type of particles carries the same charge polarity as the second type of particles but its magnitude is lower than that of the second type of particles, the method comprising (i) applying a first driving voltage to a pixel of the electrophoretic display for a first period of time, wherein the first driving voltage has the same polarity as the first type of particles and the first period of time is sufficient to drive the pixel to the color state of the first type of particles to appear at the viewing side, or (ii) applying a second driving voltage to a pixel of the electrophoretic display for a second period of time, wherein the second driving voltage has the same polarity as the second type of particles and the second period of time is sufficient to drive the pixel to the color state of the second type of particles to appear at the viewing side.

Figures 2, 3:
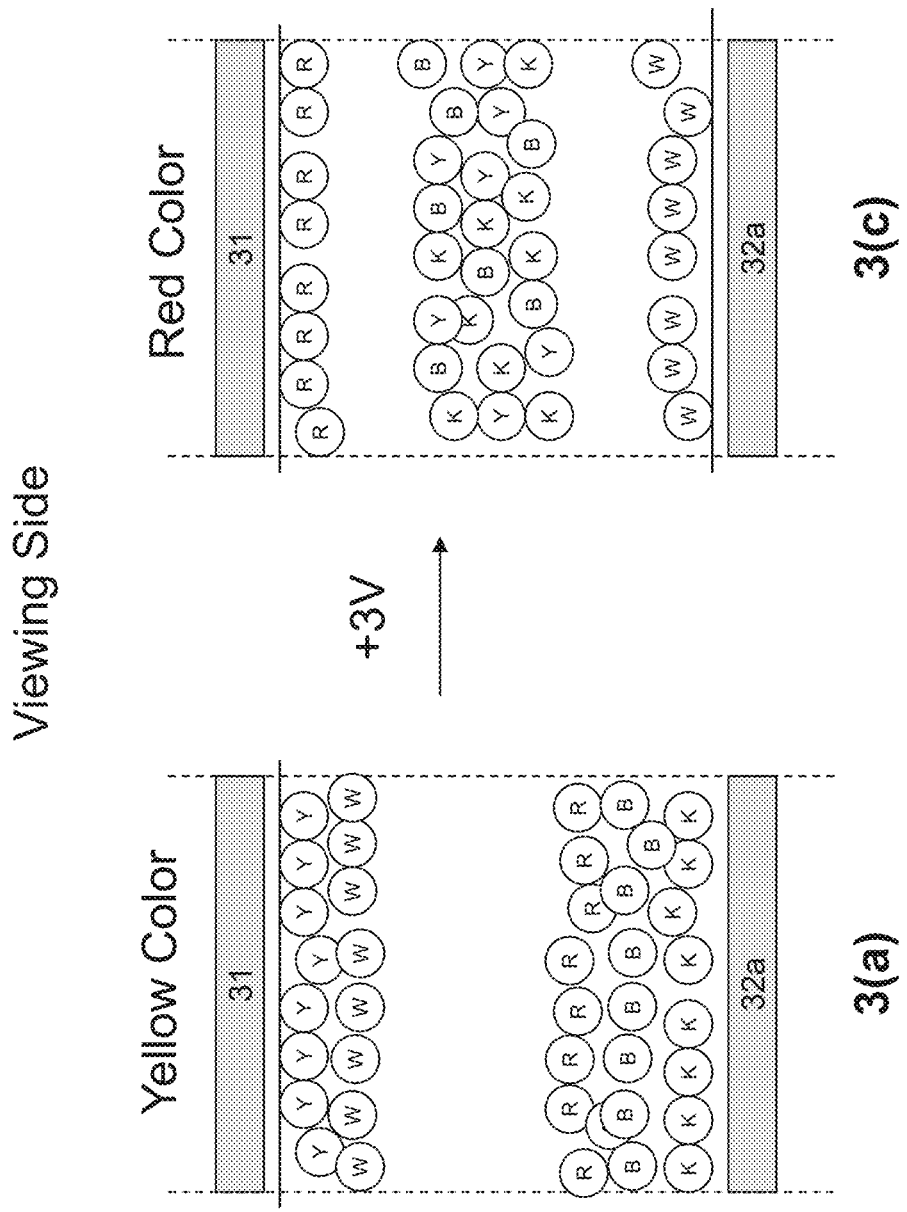

FIG. 3-2 illustrates the manner in which the low positive (red) particles are displayed at the viewing surface of the display shown in FIG. 1. The process starts from the (yellow) state 3(a) shown in FIG. 3-1 and repeated on the left side of FIG. 3-2. A low positive voltage ($V_{L1}$, e.g., +3V) is applied to the pixel electrode (i.e., the common electrode is made slightly negative with respect to the pixel electrode) for a time period of sufficient length to cause the high negative yellow particles to move towards the pixel electrode (32a) while the high positive black and middle positive blue particles move towards the common electrode (31). However, when the yellow, black and blue particles meet intermediate the pixel and common electrodes as shown at 3(c), they remain at the intermediate position because the electric field generated by the low driving voltage is not strong enough to overcome the attractive forces between them. As shown, the yellow, black and blue particles stay intermediate the pixel and common electrodes in a mixed state.

The term "attractive force" as used herein, encompasses electrostatic interactions, linearly dependent on the particle charge potentials, and the attractive force can be further enhanced by other forces, such as Van der Waals forces, hydrophobic interactions and the like.

Obviously, attractive forces also exist between the low positive red particles and the high negative yellow particles, and between the low negative white particles and both the high positive black and middle positive blue particles. However, these attractive forces are not as strong as the attractive forces between the black and yellow particles and between the blue and yellow particles, and thus the weak attractive forces on the red and white particles can be overcome by the electric field generated by the low driving voltage, so that the low charged particles and the high charged particles of opposite polarity can be separated. The electric field generated by the low driving voltage is sufficient to separate the low negative white and low positive red particles, thereby causing the red particles to move adjacent the common electrode (31) viewing surface and the white particles to move adjacent the pixel electrode (32a). As a result, the pixel displays a red color, while the white particles lie closest to the pixel electrode, as shown in 3(c).

The driving method of FIG. 3-2 can therefore be summarized as follows:

A driving method for an electrophoretic display comprising a first surface on the viewing side, a second surface on the non-viewing side and an electrophoretic fluid which fluid is sandwiched between a common electrode and a layer of pixel electrodes and comprises a first type of particles, a second type of particles, a third type of particles, a fourth type of particles and a fifth type of particles, all of which are dispersed in a solvent or solvent mixture, wherein:

(a) the five types of pigment particles have optical characteristics differing from one another;

(b) the first and second types of particles carry opposite charge polarities;

(c) the third and fourth types of particles carry the same charge polarity as the first type of particles, and the first type, the third type and the fourth type of particles have progressively lower magnitudes; and (d) the fifth type of particles carries the same charge polarity as the second type of particles but its magnitude is lower than that of the second type of particles, the method comprising:

(i) driving a pixel of the electrophoretic display to the color of the second type of particles; and (ii) applying a low driving voltage for a period of time, wherein the low driving voltage has the same polarity as the fourth type of particles and the period of time is sufficient to drive the pixel from the color state of the second type of particles to the color state of the fourth type of particles to appear at the viewing side.

FIG. 3-3 illustrates the manner in which the low negative (white) particles are displayed at the viewing surface of the display shown in FIG. 1. The process starts from the (black) state 3(b) shown in FIG. 3-1 and repeated on the left side of FIG. 3-3. A low negative voltage ($V_{L2}$, e.g., −10V) is applied to the pixel electrode (i.e., the common electrode is made slightly positive with respect to the pixel electrode) for a time period of sufficient length to cause the high positive black and middle positive blue particles to move towards the pixel electrode (32a) while the high negative yellow particles move towards the common electrode (31). However, when the yellow, black and blue particles meet intermediate the pixel and common electrodes as shown at 3(d), they remain at the intermediate position because the electric field generated by the low driving voltage is not strong enough to overcome the attractive forces between them. Thus, as previously discussed with reference to FIG. 3-2, the yellow, black and blue particles stay intermediate the pixel and common electrodes in a mixed state.

As discussed above with reference to Figure, attractive forces also exist between the low positive red particles and the high negative yellow particles, and between the low negative white particles and both the high positive black and middle positive blue particles. However, these attractive forces are not as strong as the attractive forces between the black and yellow particles and between the blue and yellow particles, and thus the weak attractive forces on the red and white particles can be overcome by the electric field generated by the low driving voltage, so that the low charged particles and the high charged particles of opposite polarity can be separated. The electric field generated by the low driving voltage is sufficient to separate the low negative white and low positive red particles, thereby causing the white particles to move adjacent the common electrode (31) viewing surface and the red particles to move adjacent the pixel electrode (32a). As a result, the pixel displays a white color, while the red particles lie closest to the pixel electrode, as shown in 3(d).

Figure 4:
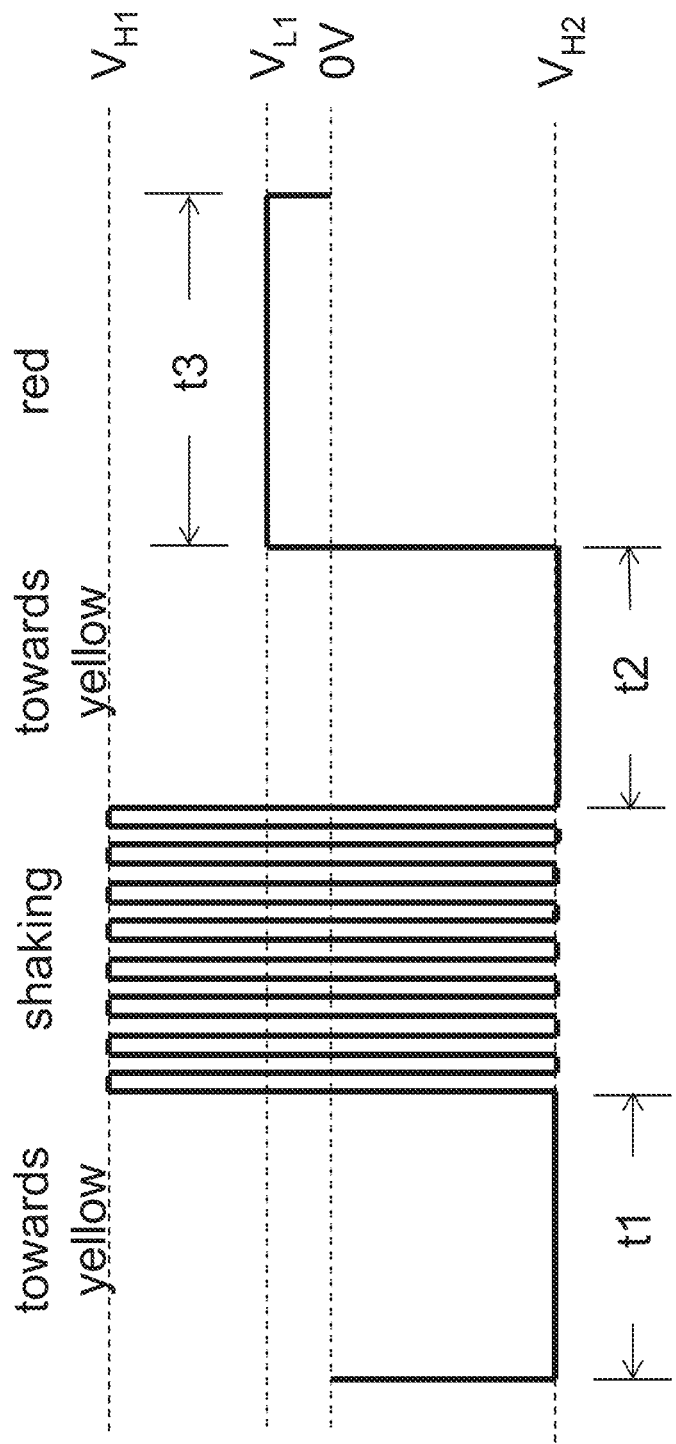
Figure 5:
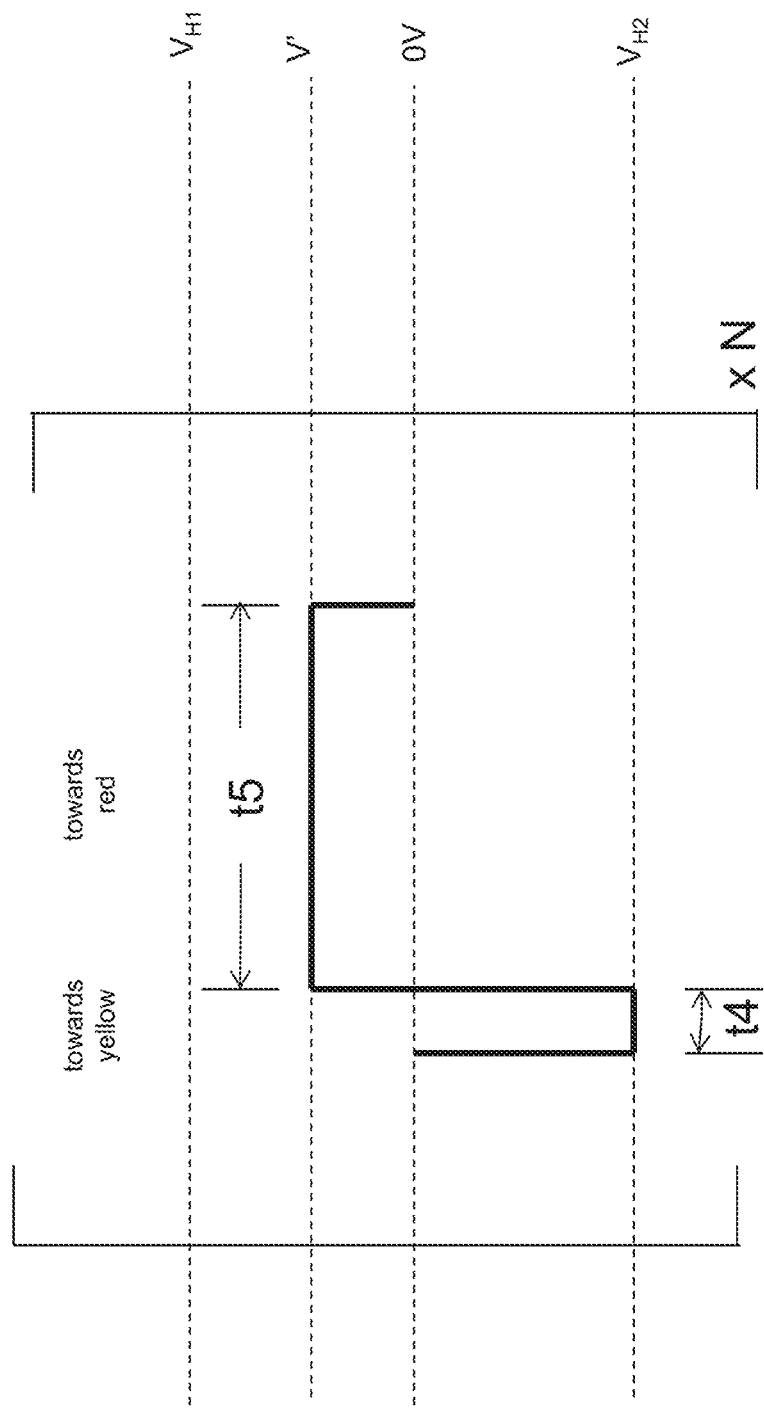

FIGS. 3-4 and 3-5 illustrate the manner in which the middle positive (blue) particles are displayed at the viewing surface of the display shown in FIG. 1. The process starts from the (white) state 3(d) shown in FIG. 3-3 and repeated on the left sides of FIGS. 3-4 and 3-5. In FIG. 3-4, a medium positive voltage ($V_{M1}$, e.g., +12V) is applied to the pixel electrode (i.e., the common electrode is made moderately negative with respect to the pixel electrode). The medium positive driving voltage causes the white particles to move away from the common electrode and the red particles to move away from the pixel electrode, thereby tending to cause all five types of particles to meet and form a "pack" intermediate the common and pixel electrodes. The medium voltage applied is not sufficient to separate the high positive black from the high negative yellow particles in the pack, but (unlike the situation with the low driving voltage used in FIG. 3-2) is sufficient to cause the middle positive blue particles to break away from the pack and move towards the common electrode. The low positive red particles also separate from the high negative yellow particles and move towards the common electrode. However, the middle positive blue particles move faster than the low positive red particles and arrive adjacent the common electrode first, so that the pixel displays a blue color at the viewing surface. Similarly, the low negative white particles separate from the high positive black particles and move adjacent the pixel electrode, to produce the state illustrated at 3(e).

FIG. 3-5 shows an alternative method of effected the same white-to-blue transition as in FIG. 3-4. The difference between FIGS. 3-4 and 3-5 is that in the latter the medium positive driving voltage is reduced from +12 to +8V, with the result that, although the blue and red particles separate from the pack in the same way as in FIG. 3-4, the electric field generated by the driving voltage of +8V is not sufficient to separate the low negative white particles from the high positive black particles, so that the black, yellow and white particles remain in a pack intermediate the common and pixel electrodes. A blue color is still displayed at the viewing surface but the pixel electrode surface (if visible) will display the color of a mixture of black, yellow and white particles, rather than the white state displayed at this surface in FIG. 3-4. For most practical purposes, this difference is of no consequence.

It will readily be apparent to those skilled in imaging science that if "clean", well saturated colors are to be obtained in the various color states illustrated in FIGS. 3-1 to 3-5, all non-black and non-white particles used in the electrophoretic medium should be light-reflecting rather than light-transmissive. (White particles are inherently light-scattering, while black particles are inherently light-absorbing.) For example, in the blue color state 3(e) shown in FIG. 3-4, if the blue particles were substantially light-transmissive, a substantial proportion of the light entering the electrophoretic layer through the viewing surface would pass through the blue particles and a proportion of this transmitted would be reflected back from the red particles immediately "behind" (i.e., immediately below as illustrated in FIG. 3-4) the blue particles. Assuming the red particles were also significantly light-transmissive, a further proportion of the light transmitted through blue particles would be reflected from the pack of white and yellow particles. The overall effect would be serious "contamination" of the desired blue color with at least red, and possibly also yellow tinges, a highly undesirable. Similar considerations apply, with even more force, to six particle systems of the invention described below with reference to FIGS. 29-1 to 29-7.

FIG. 4 illustrates a waveform which may be used to effect the yellow-to-red (high negative to low positive) transition of FIG. 3-2. In the waveform of FIG. 4, a high negative driving voltage ($V_{H2}$, for example −15V) is first applied for a period of t1. This initial application of a high negative driving voltage may be omitted but is preferably included to ensure that the entire waveform of FIG. 4 is DC balanced. (The term "DC balanced" is used herein to mean that the integral of the driving voltage applied to a pixel with respect to time taken over an entire waveform is substantially zero.) A shaking waveform is then applied, followed by application of the high negative driving voltage ($V_{H2}$) for a period of t2, thus ensuring that the pixel is in the yellow state shown in FIG. 3-2. From this yellow state, the pixel is driven to the red state by applying a low positive driving voltage (VIA, for example +3V) for a period of t3, to effect the yellow-to-red transition shown in FIG. 3-2. The period t2 is sufficient to drive the pixel to the yellow state when $V_{H2}$ is applied and the period t3 is sufficient to drive the pixel to the red state from the yellow state when $V_{L1}$ is applied.

FIG. 5 illustrates a waveform which may be used to replace the portion of the waveform of FIG. 4 occurring in period t3. In the first portion of the waveform of FIG. 5, the high negative driving voltage ($V_{H2}$) is applied to a pixel for a period of t4 to drive the pixel towards the yellow state, then a positive driving voltage (+V') is applied for a period of t5 to drive the pixel towards the red state. The magnitude of V' is lower than that of $V_H$ (e.g., $V_{H1}$ or $V_{H2}$). The magnitude of +V' may be less than 50% of the magnitude of $V_H$, and t5 may greater than t4, for example, t4 may be in the range of 20-400 msec and t5 may be ≥200 msec. The waveform of FIG. 5 is repeated for at least 2 cycles (N≥2), preferably at least 4 cycles and more preferably at least 8 cycles. The red color becomes more intense after each driving cycle.

Figure 6:
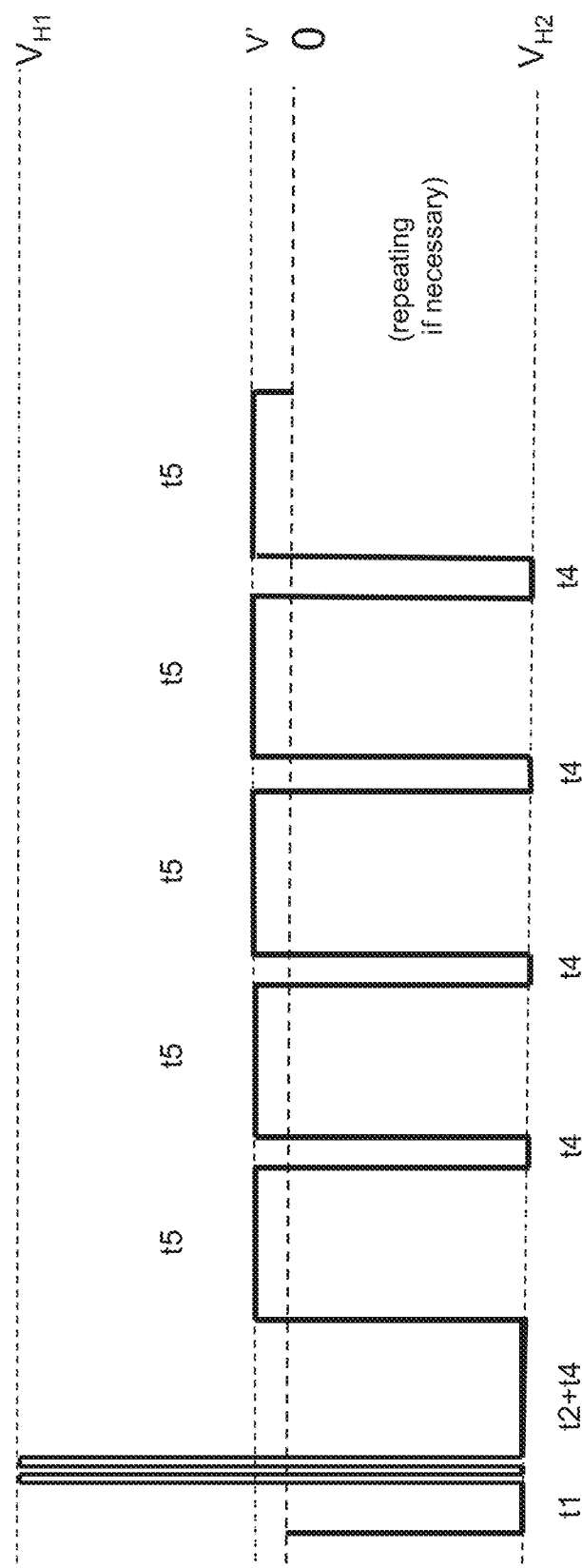

As already noted, the waveform of FIG. 5 may be used to replace the portion of the waveform of FIG. 4 occurring in period t3. FIG. 6 illustrates a waveform in which the portion of the waveform of FIG. 4 occurring in period t3 is replaced by five cycles of the waveform of FIG. 5 (more or fewer cycles may of course be used). In other words, the waveform of FIG. 6 comprises driving towards yellow for a period of t1 (cf. FIG. 4), a shaking waveform, driving towards yellow for a period of t2 (again, cf. FIG. 4), and then applying multiple cycles of the waveform of FIG. 5.

Figure 7:
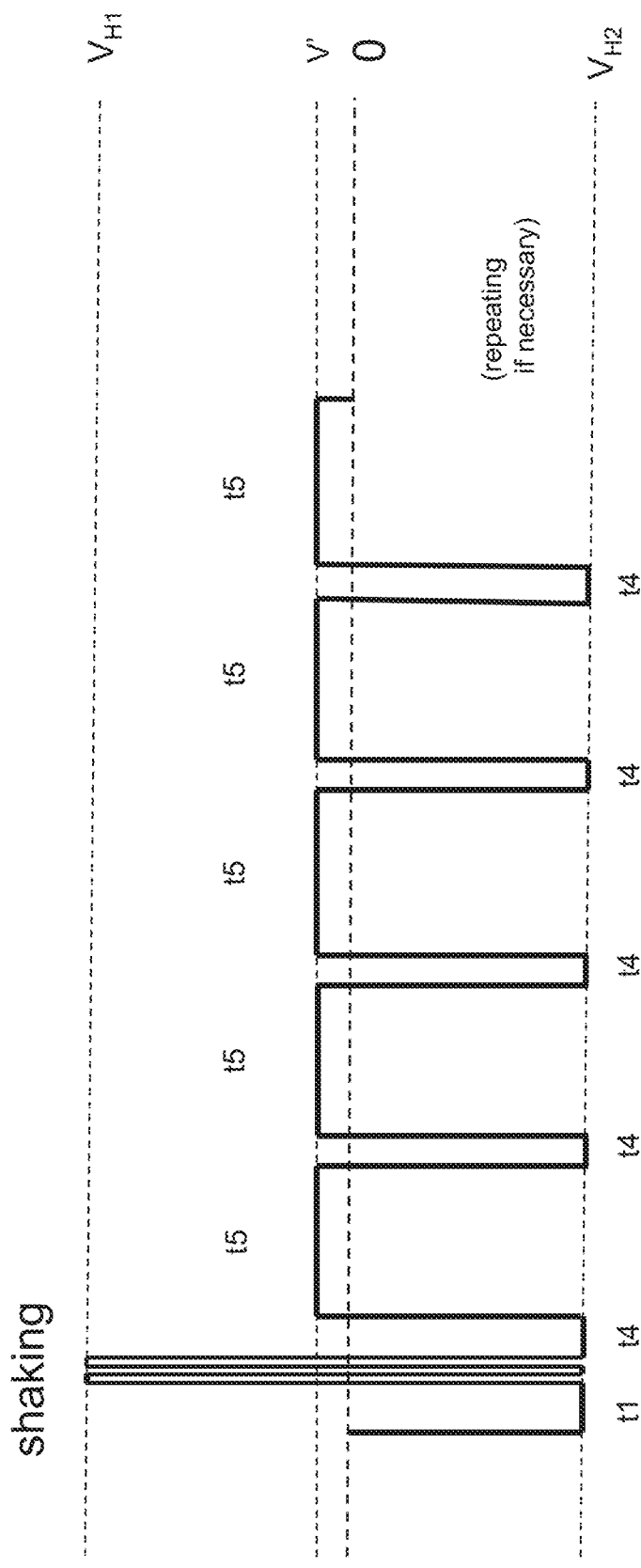

FIG. 7 illustrates a waveform similar to that of FIG. 6 but in which the step of driving towards the yellow state for the period of t2 is eliminated, so that the waveform of FIG. 7 transitions from the shaking waveform immediately to the waveform of FIG. 5. The waveforms of FIGS. 6 and 7 may each be DC balanced.

The driving method of FIG. 5 therefore may be summarized as follows:

A driving method for an electrophoretic display comprising a first surface on the viewing side, a second surface on the non-viewing side and an electrophoretic fluid which fluid is sandwiched between a common electrode and a layer of pixel electrodes and comprises a first type of particle s, a second type of particles, a third type of particles, a fourth type of particles and a fifth type of particles, all of which are dispersed in a solvent or solvent mixture, wherein:

(a) the five types of pigment particles have optical characteristics differing from one another;

(b) the first and second types of particles carry opposite charge polarities;

(c) the third and fourth types of particles carry the same charge polarity as the first type of particles, and the first type, the third type and the fourth type of particles have progressively lower magnitudes; and (d) the fifth type of particles carries the same charge polarity as the second type of particles but its magnitude is lower than that of the second type of particles, the method comprises the following steps:

(i) applying a first driving voltage to a pixel of the electrophoretic display for a first period of time to drive the pixel towards the color state of the second type of particles;

(ii) applying a second driving voltage to the pixel for a second period of time, wherein the second driving voltage has same polarity as the fourth type of particles and a magnitude lower than that of the first driving voltage, to drive the pixel from the color state of the second type of particles towards the color state of the fourth type of particles to appear at the viewing side; and repeating steps (i) and (ii).

In this method, the magnitude of the second driving voltage may be less than 50% of the magnitude of the first driving voltage. Steps (i) and (ii) may be repeated at least 2 times, preferably at least 4 times and more preferably at least 8 times. The method may further comprise a shaking waveform before step (i), and/or may further comprise driving the pixel to the color state of the second type of particles after the shaking waveform but prior to step (i).

Figure 8:
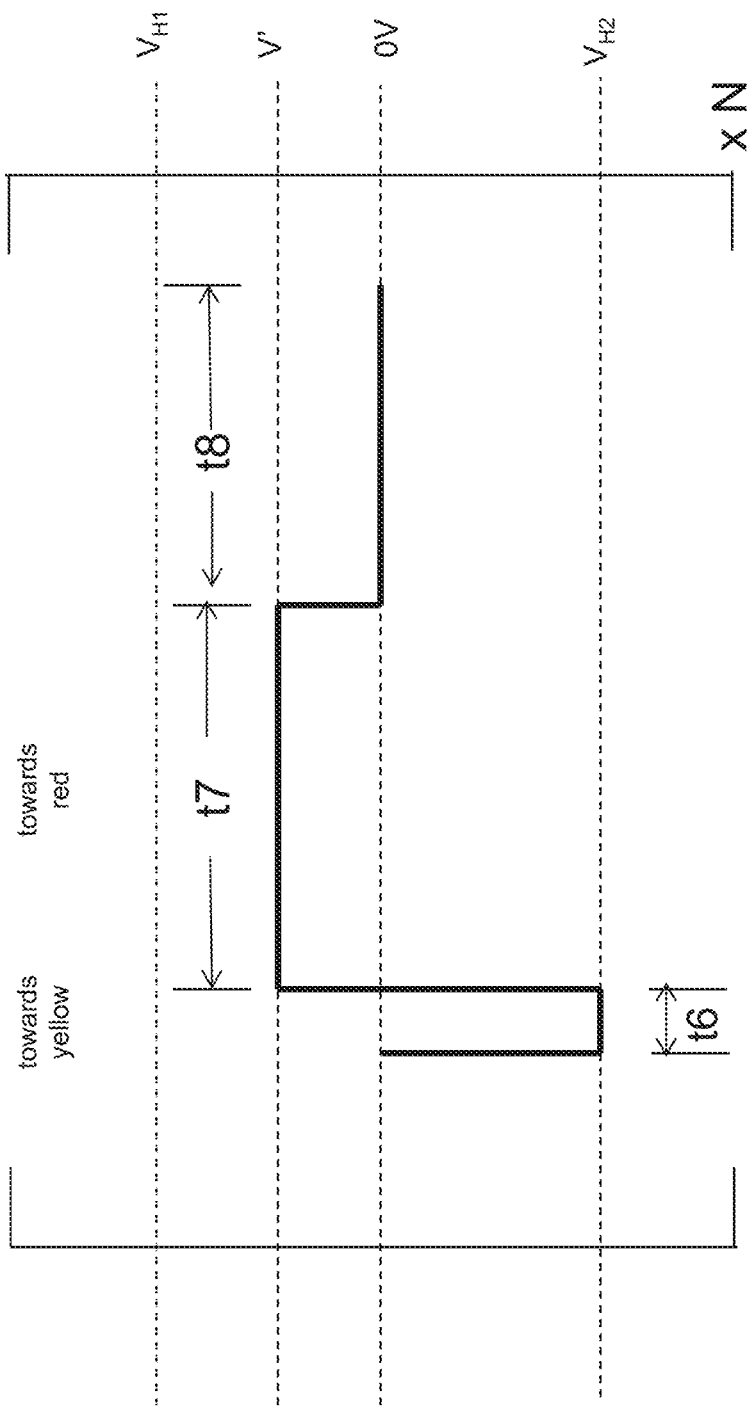

FIG. 8 illustrates a waveform which may be used in place of the waveform of FIG. 5 to replace the portion of the waveform of FIG. 4 occurring in period t3. The waveform of FIG. 8 comprises driving towards yellow for an initial period of t6 (cf. period t4 in FIG. 5), followed by driving towards red for a period of t7 (cf. period t5 in FIG. 5). However, in the waveform of FIG. 8, period t7 is followed by a wait period of t8 in which no driving voltage is applied. The waveform of FIG. 8 is designed to release the charge imbalance stored in the dielectric layers and/or at the interfaces between layers of different materials, in an electrophoretic display device, especially when the resistance of the dielectric layers is high, for example, at a low temperature. (As used herein, the term "low temperature" refers to a temperature below about 10° C.) The wait time presumably can dissipate the unwanted charge stored in the dielectric layers and cause the short pulse t6 for driving a pixel towards the yellow state and the longer pulse t7 for driving the pixel towards the red state to be more efficient. As a result, this alternative driving method will bring a better separation of the low charged (red) particles from the higher charged ones. The wait period t8 may be in the range of 5-5000 msec, depending on the resistance of the dielectric layers. The entire waveform of FIG. 8 may be repeated at least 2 times (N≥2), preferably at least 4 times and more preferably at least 8 times.

Figure 9:
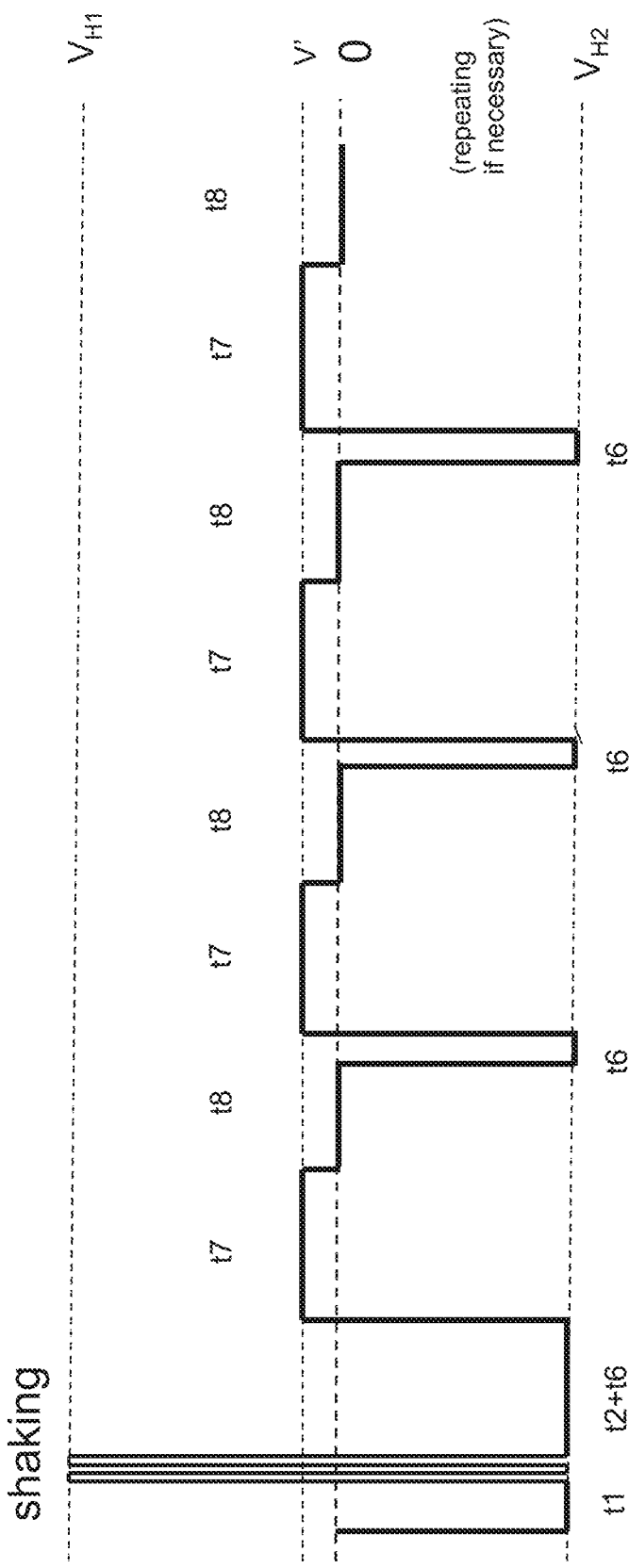

As already noted, the waveform of FIG. 8 may be used to replace the portion of the waveform of FIG. 4 occurring in period t3. FIG. 9 illustrates a waveform in which the portion of the waveform of FIG. 4 occurring in period t3 is replaced by four cycles of the waveform of FIG. 8 (more or fewer cycles may of course be used). In other words, the waveform of FIG. 9 comprises driving towards yellow for a period of t1 (cf. FIG. 4), a shaking waveform, driving towards yellow for a period of t2 (again, cf. FIG. 4), and then applying multiple cycles of the waveform of FIG. 8.

Figure 10:
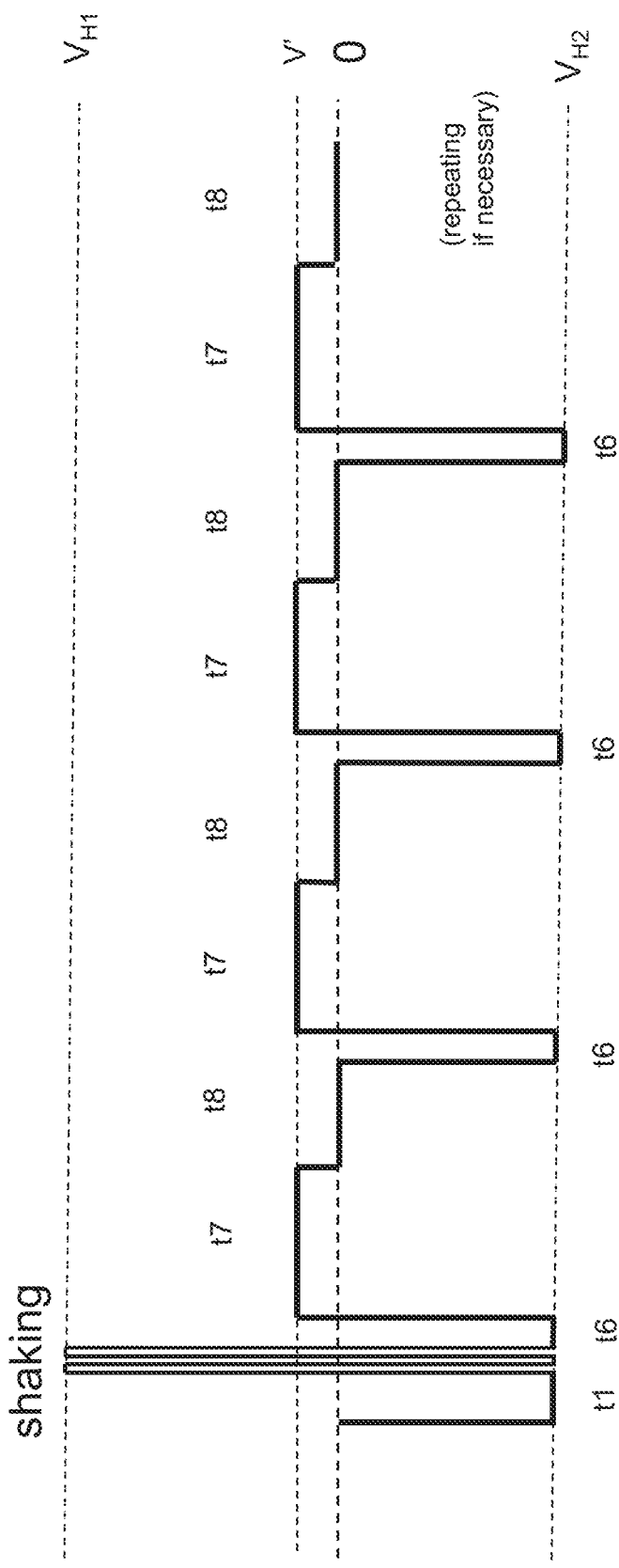

FIG. 10 illustrates a waveform similar to that of FIG. 9 but in which the step of driving towards the yellow state for the period of t2 is eliminated, so that the waveform of FIG. 10 transitions from the shaking waveform immediately to the waveform of FIG. 8. The waveforms of FIGS. 9 and 10 may each be DC balanced.

The driving method of FIG. 8 therefore can be summarized as follows:

A driving method for an electrophoretic display comprising a first surface on the viewing side, a second surface on the non-viewing side and an electrophoretic fluid which fluid is sandwiched between a common electrode and a layer of pixel electrodes and comprises a first type of particles, a second type of particles, a third type of particles, a fourth type of particles and a fifth type of particles, all of which are dispersed in a solvent or solvent mixture, wherein:

(a) the five types of pigment particles have optical characteristics differing from one another;

(b) the first and second types of particles carry opposite charge polarities;

(c) the third and fourth types of particles carry the same charge polarity as the first type of particles, and the first type, the third type and the fourth type of particles have progressively lower magnitudes; and (d) the fifth type of particles carries the same charge polarity as the second type of particles but its magnitude is lower than that of the second type of particles, the method comprises the following steps:

(i) applying a first driving voltage to a pixel of the electrophoretic display for a first period of time to drive the pixel towards the color state of the second type of particles;

(ii) applying a second driving voltage to the pixel for a second period of time, wherein the second driving voltage has same polarity as the fourth type of particles and a magnitude lower than that of the first driving voltage, to drive the pixel from the color state of the second type of particles towards the color state of the fourth type of particles to appear at the viewing side;

(iii) applying no driving voltage to the pixel for a third period of time; and repeating steps (i)-(iii).

In this method, the magnitude of the second driving voltage may be less than 50% of the magnitude of the first driving voltage. Steps (i), (ii) and (iii) may be repeated at least 2 times, preferably at least 4 times and more preferably at least 8 times. The method may further comprise a shaking waveform before step (i), and/or may further comprise driving the pixel to the color state of the second type of particles after the shaking waveform but prior to step (i). The lengths of the driving periods may be temperature dependent.

Figure 11:
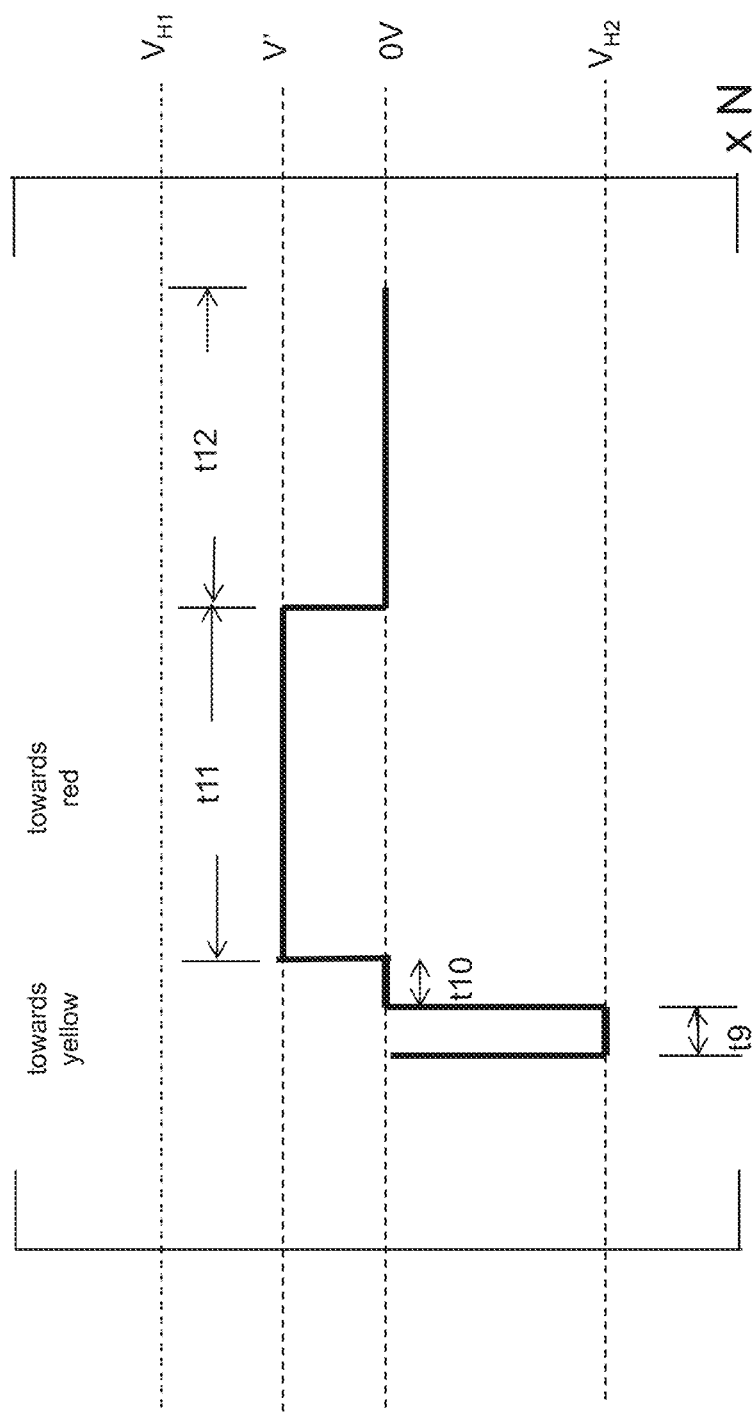

FIG. 11 illustrates a waveform which may be used in place of the waveform of FIG. 5 or 8 to replace the portion of the waveform of FIG. 4 occurring in period t3. The waveform of FIG. 11 comprises driving towards yellow for an initial period of t9 (cf. period t4 in FIG. 5), followed by a wait time of t10 during which no driving voltage is applied. The wait time of t10 is followed by driving towards red for a period of t11 (cf. period t5 in FIG. 5), followed by a wait period of t12 in which no driving voltage is applied (cf. period t8 in FIG. 8). The waveform of FIG. 11 may be repeated at least 2 times, preferably at least 4 times and more preferably at least 8 times.

In the waveform of FIG. 11, the first wait time t10 is very short while the second wait time t12 is longer. The period t9 is also shorter than the period t11. For example, t9 may be in the range of 20-200 msec; t10 may be less than 100 msec; t11 may be in the range of 100-200 msec; and t12 may be less than 1000 msec.

Figure 12:
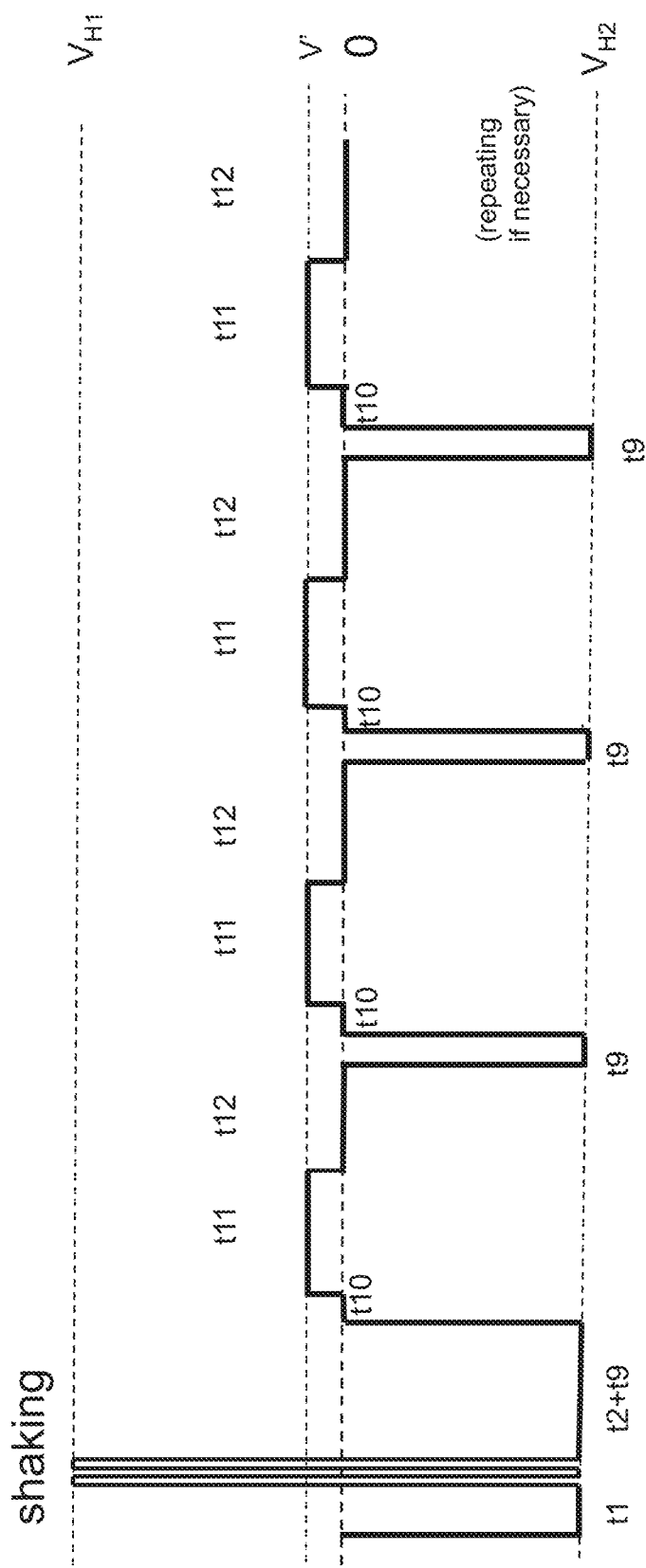

As already noted, the waveform of FIG. 11 may be used to replace the portion of the waveform of FIG. 4 occurring in period t3. FIG. 12 illustrates a waveform in which the portion of the waveform of FIG. 4 occurring in period t3 is replaced by four cycles of the waveform of FIG. 11 (more or fewer cycles may of course be used). In other words, the waveform of FIG. 12 comprises driving towards yellow for a period of t1 (cf. FIG. 4), a shaking waveform, driving towards yellow for a period of t2 (again, cf. FIG. 4), and then applying multiple cycles of the waveform of FIG. 11. As a general rule, the better the yellow state achieved at the end of period t2, the better the red state that will be displayed at the end of the waveform.

Figure 13:
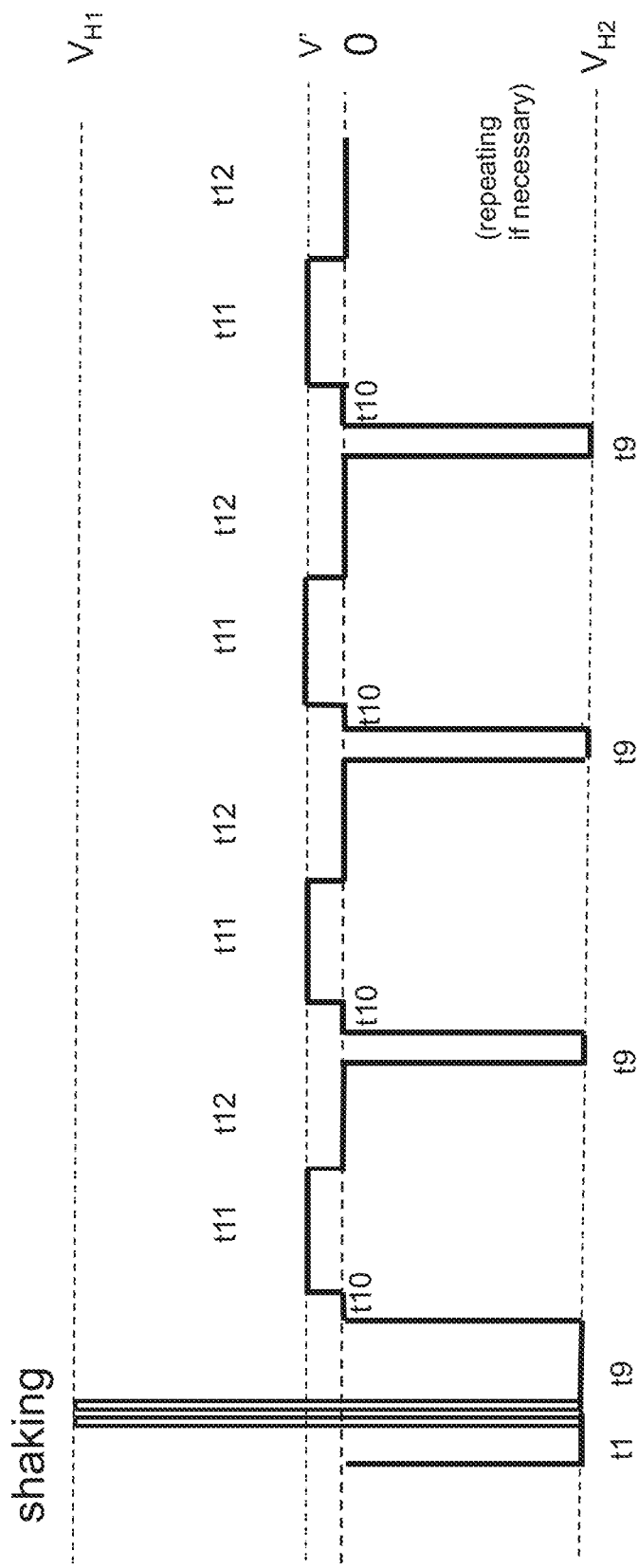

FIG. 13 illustrates a waveform similar to that of FIG. 12 but in which the step of driving towards the yellow state for the period of t2 is eliminated, so that the waveform of FIG.

13 transitions from the shaking waveform immediately to the waveform of FIG. 11. The waveforms of FIGS. 12 and 13 may each be DC balanced.

The driving method of FIG. 11 therefore can be summarized as follows:

A driving method for an electrophoretic display comprising a first surface on the viewing side, a second surface on the non-viewing side and an electrophoretic fluid which fluid is sandwiched between a common electrode and a layer of pixel electrodes and comprises a first type of particles, a second type of particles, a third type of particles, a fourth type of particles and a fifth type of particles, all of which are dispersed in a solvent or solvent mixture, wherein:
  (a) the five types of pigment particles have optical characteristics differing from one another;
  (b) the first and second types of particles carry opposite charge polarities;
  (c) the third and fourth types of particles carry the same charge polarity as the first type of particles, and the first type, the third type and the fourth type of particles have progressively lower magnitudes; and
  (d) the fifth type of particles carries the same charge polarity as the second type of particles but its magnitude is lower than that of the second type of particles, the method comprises the following steps:
  (i) applying a first driving voltage to a pixel in the electrophoretic display for a first period of time to drive the pixel towards the color state of the second type of particles;
  (ii) applying no driving voltage to the pixel for a second period of time;
  (iii) applying a second driving voltage to the pixel for a third period of time, wherein the second driving voltage has the same polarity as the fourth type of particles and has a magnitude lower than that of the first driving voltage, to drive the pixel from the color state of the second type of particles towards the color state of the fourth type of particles to appear at the viewing side;
  (iv) applying no driving voltage to the pixel for a fourth period of time; and repeating steps (i)-(iv).

In this method, the magnitude of the second driving voltage may be less than 50% of the magnitude of the first driving voltage. Steps (i)-(iv) may be repeated at least 2 times, preferably at least 4 times and more preferably at least 8 times. The method may further comprise a shaking waveform before step (i), and/or may further comprise driving the pixel to the color state of the second type of particles after the shaking waveform but prior to step (i). The lengths of the driving periods may be temperature dependent.

This driving method not only is particularly effective at a low temperature, but can also provide a display device better tolerance of structural variations caused during manufacture of the display device. Therefore its usefulness is not limited to low temperature driving.

Figure 14:
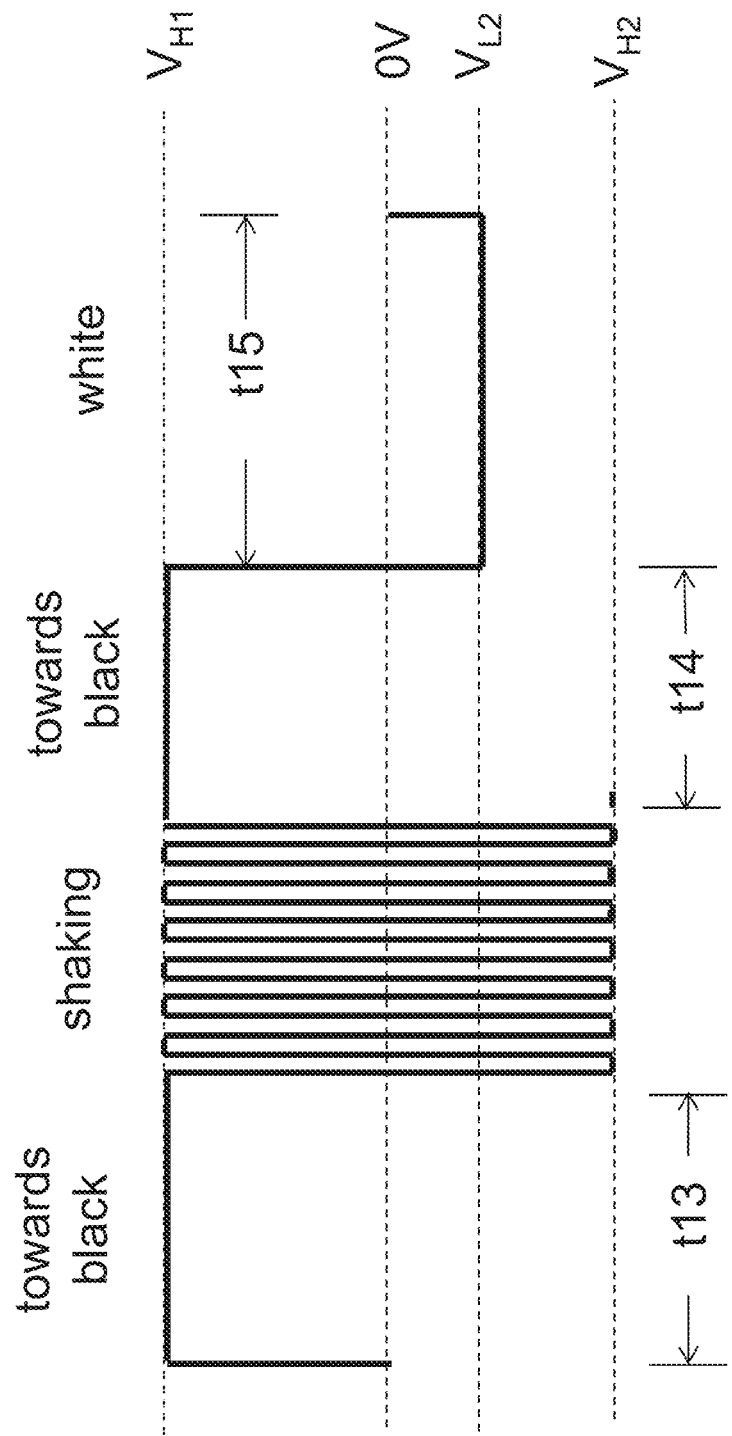
FIG. 14 illustrates a waveform which can used to cause the display layer shown in FIG. 1 to effect the transition shown in FIG. 3-3 to display the white color of low charged negative particles.

FIG. 14 illustrates a waveform which may be used to effect the black-to-white (high positive to low negative) transition of FIG. 3-3. In the waveform of FIG. 14, which is essentially an inverted version of the waveform of FIG. 4, a high positive driving voltage ($V_{H1}$, for example +15V) is first applied for a period of t13. This initial application of a high positive driving voltage may be omitted but is preferably included to ensure that the entire waveform of FIG. 14 is DC balanced. A shaking waveform is then applied, followed by application of the high positive driving voltage ($V_{H1}$) for a period of t14, thus ensuring that the pixel is in the black state shown in FIG. 3-3. From this black state, the pixel is driven to the white state by applying a low negative driving voltage ($V_{L2}$, for example −10V) for a period of t15, to effect the black-to-white transition shown in FIG. 3-3. The period t14 is sufficient to drive the pixel to the black state when $V_{H1}$ is applied and the period t15 is sufficient to drive the pixel to the white state from the black state when $V_{L2}$ is applied. The waveform of FIG. 14 may be DC balanced.

The driving method of FIG. 14 therefore can be summarized as follows:

A driving method for an electrophoretic display comprising a first surface on the viewing side, a second surface on the non-viewing side and an electrophoretic fluid which fluid is sandwiched between a common electrode and a layer of pixel electrodes and comprises a first type of particles, a second type of particles, a third type of particles, a fourth type of particles and a fifth type of particles, all of which are dispersed in a solvent or solvent mixture, wherein:
  (a) the five types of pigment particles have optical characteristics differing from one another;
  (b) the first and second types of particles carry opposite charge polarities;
  (c) the third and fourth types of particles carry the same charge polarity as the first type of particles, and the first type, the third type and the fourth type of particles have progressively lower magnitudes; and
  (d) the fifth type of particles carries the same charge polarity as the second type of particles but its magnitude is lower than that of the second type of particles, the method comprises the following steps:
  (i) driving a pixel of the electrophoretic display to the color of the first type of particles; and
  (ii) applying a low driving voltage for a period of time, wherein the low driving voltage has the same polarity as the fifth type of particles and the period of time is sufficient to drive the pixel from the color state of the first type of particles to the color state of the fifth type of particles to appear at the viewing side.

Figure 15:
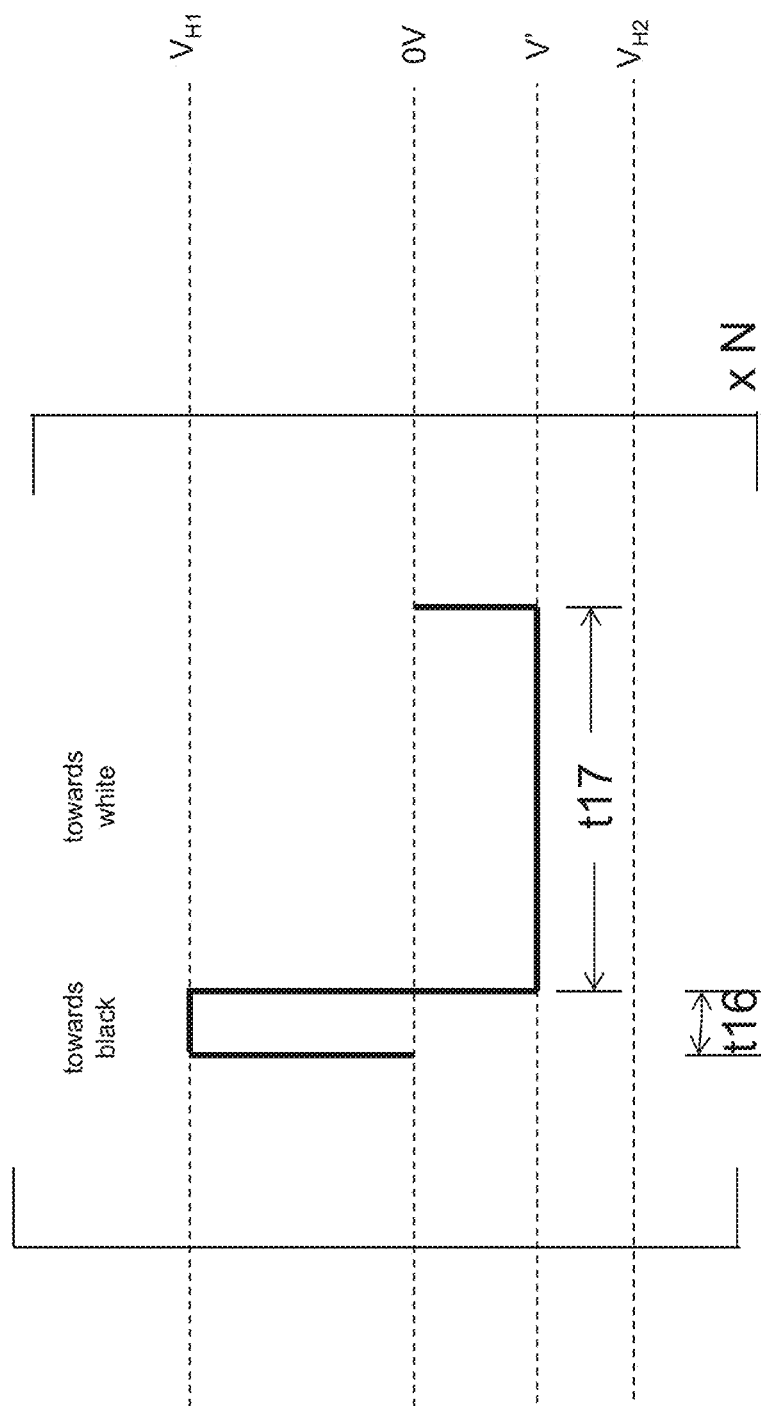
FIGS. 15-17, 18-20 and 21-23 illustrate alternative waveforms which may be used in place of part of the waveform shown in FIG. 14.

FIG. 15 illustrates a waveform which may be used to replace the portion of the waveform of FIG. 14 occurring in period t15. In the first portion of the waveform of FIG. 14, which is essentially an inverted version of the waveform of FIG. 5, the high positive driving voltage ($V_{H1}$) is applied to a pixel for a period of t16 to drive the pixel towards the black state, then a negative driving voltage (−V') is applied for a period of t17 to drive the pixel towards the white state. The magnitude of −V' is lower than that of $V_H$ (e.g., $V_{H1}$ or $V_{H2}$) The magnitude of −V' may be less than 50% of the magnitude of $V_H$, and t17 may greater than t16, for example, t16 may be in the range of 20-400 msec and t17 may be ≥200 msec. The waveform of FIG. 15 is repeated for at least 2 cycles (N≥2), preferably at least 4 cycles and more preferably at least 8 cycles. The white color becomes more intense after each driving cycle.

Figure 16:
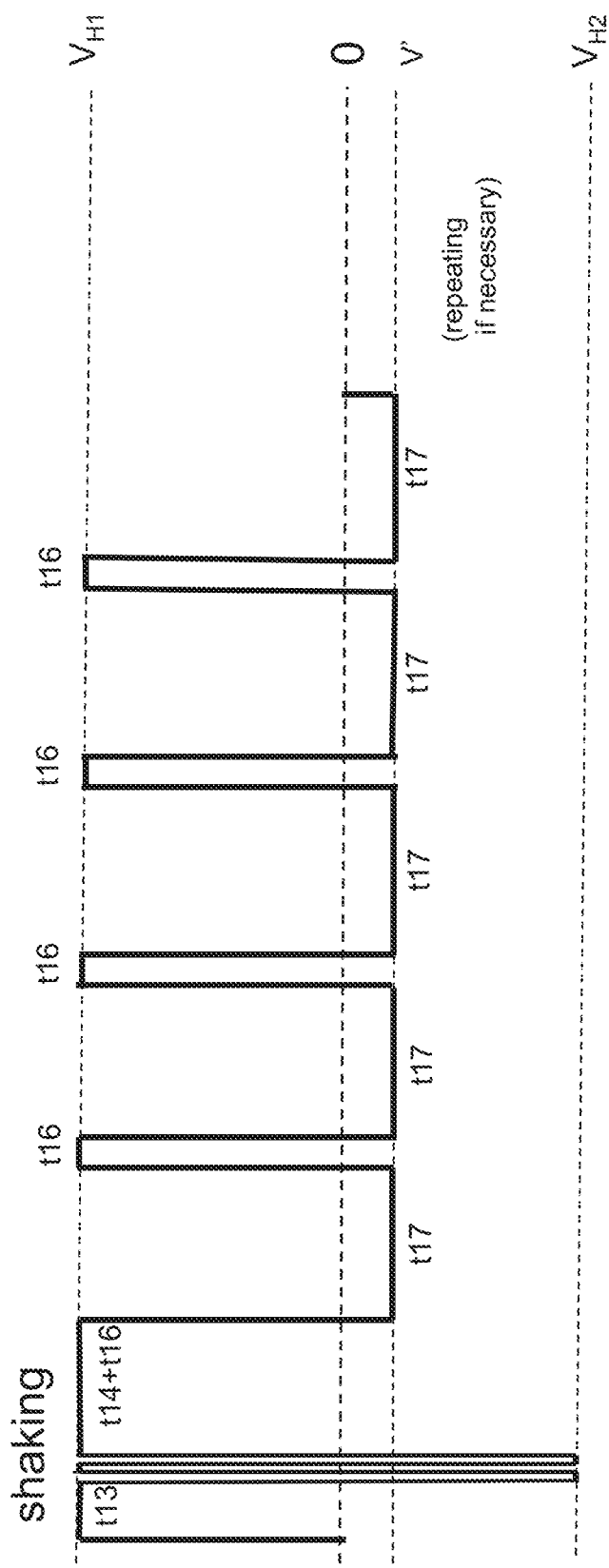

As already noted, the waveform of FIG. 15 may be used to replace the portion of the waveform of FIG. 14 occurring in period t15. FIG. 16 illustrates a waveform in which the portion of the waveform of FIG. 14 occurring in period t15 is replaced by four cycles of the waveform of FIG. 15 (more or fewer cycles may of course be used). In other words, the waveform of FIG. 16 comprises driving towards black for a period of t13 (cf. FIG. 14), a shaking waveform, driving towards black for a period of t14 (again, cf. FIG. 14), and then applying multiple cycles of the waveform of FIG. 15.

Figure 17:
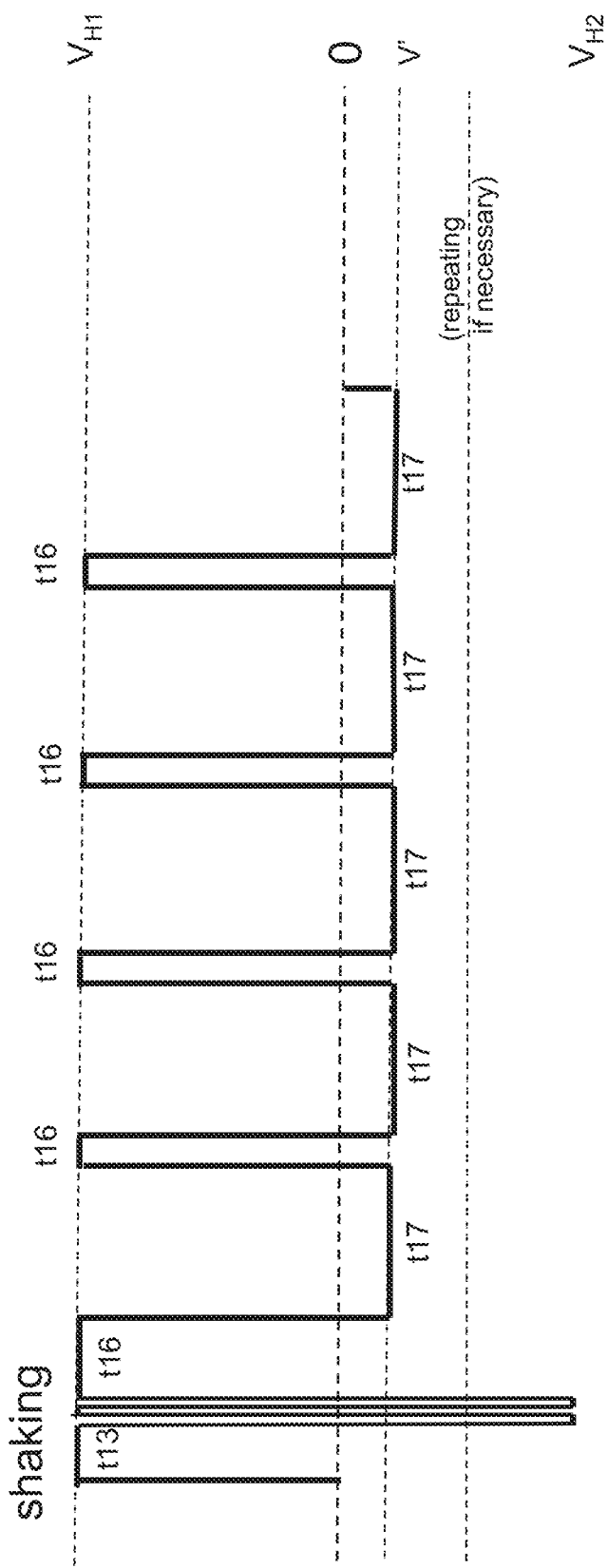

FIG. 17 illustrates a waveform similar to that of FIG. 16 but in which the step of driving towards the black state for the period of t14 is eliminated, so that the waveform of FIG. 17 transitions from the shaking waveform immediately to the waveform of FIG. 15. The waveforms of FIGS. 16 and 17 may each be DC balanced.

The driving method of FIG. 15 therefore can be summarized as follows:

A driving method for an electrophoretic display comprising a first surface on the viewing side, a second surface on the non-viewing side and an electrophoretic fluid which fluid is sandwiched between a common electrode and a layer of pixel electrodes and comprises a first type of particles, a second type of particles, a third type of particles, a fourth type of particles and a fifth type of particles, all of which are dispersed in a solvent or solvent mixture, wherein:
- (a) the five types of pigment particles have optical characteristics differing from one another;
- (b) the first and second types of particles carry opposite charge polarities;
- (c) the third and fourth types of particles carry the same charge polarity as the first type of particles, and the first type, the third type and the fourth type of particles have progressively lower magnitudes; and
- (d) the fifth type of particles carries the same charge polarity as the second type of particles but its magnitude is lower than that of the second type of particles, the method comprises the following steps:
  - (i) applying a first driving voltage to a pixel of the electrophoretic display for a first period of time to drive the pixel towards the color state of the first type of particles;
  - (ii) applying a second driving voltage to the pixel for a second period of time, wherein the second driving voltage has same polarity as the fifth type of particles and a magnitude lower than that of the first driving voltage, to drive the pixel from the color state of the first type of particles towards the color state of the fifth type of particles to appear at the viewing side; and
repeating steps (i) and (ii).

In this method, the magnitude of the second driving voltage may be less than 50% of the magnitude of the first driving voltage. Steps (i) and (ii) may be repeated at least 2 times, preferably at least 4 times and more preferably at least 8 times. The method may further comprise a shaking waveform before step (i), and/or may further comprise driving the pixel to the color state of the first type of particles after the shaking waveform but prior to step (i). The lengths of the driving periods may be temperature dependent.

Figure 18:
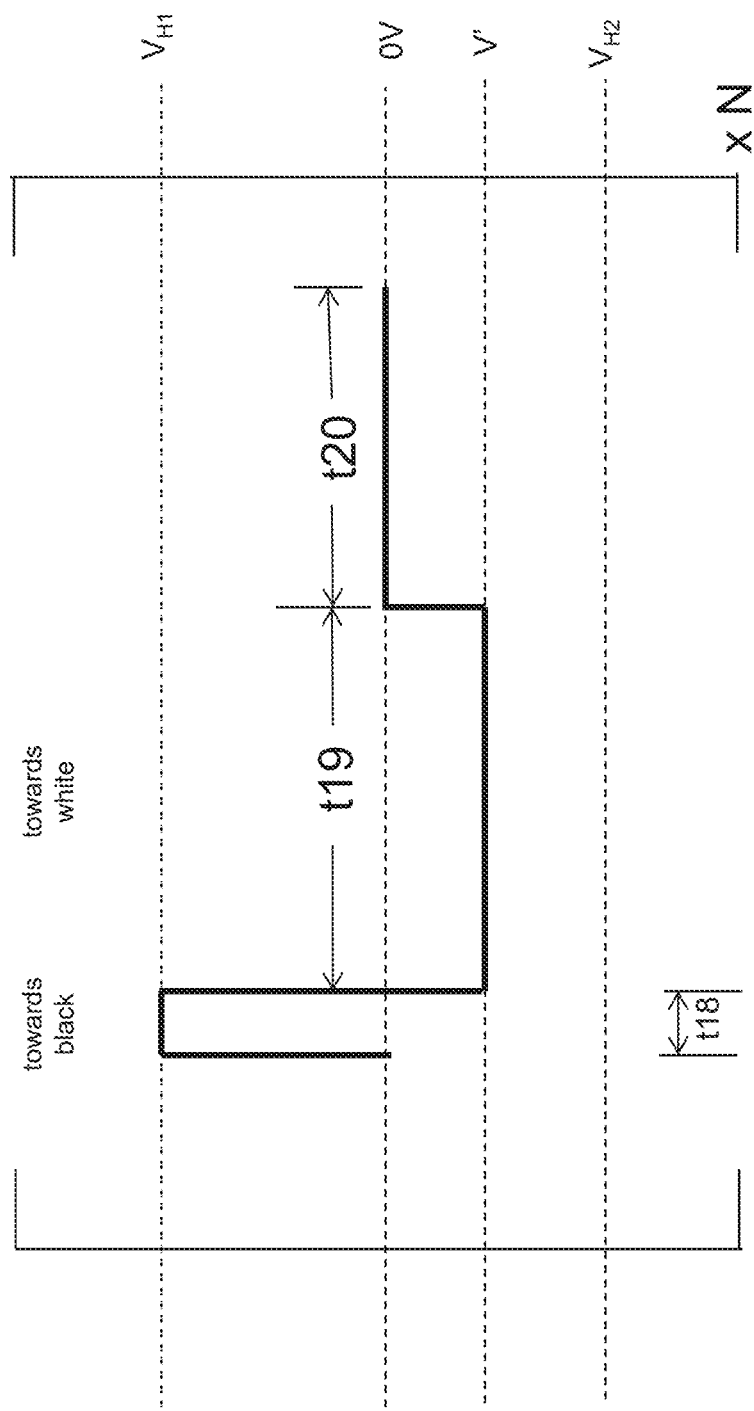

FIG. 18 illustrates a waveform which may be used in place of the waveform of FIG. 15 to replace the portion of the waveform of FIG. 14 occurring in period t15. The waveform of FIG. 8, which is essentially an inverted version of the waveform of FIG. 8, comprises driving towards black for an initial period of t18 (cf. period t16 in FIG. 15), followed by driving towards white for a period of t19 (cf. period t17 in FIG. 15). However, in the waveform of FIG. 18, period t19 is followed by a wait period of t20 in which no driving voltage is applied. Like the waveform of FIG. 8, the waveform of FIG. 18 is designed to release the charge imbalance stored in the dielectric layers and/or at the interfaces between layers of different materials, in an electrophoretic display device, especially when the resistance of the dielectric layers is high, for example, at a low temperature. The wait time presumably can dissipate the unwanted charge stored in the dielectric layers and cause the short pulse t18 for driving a pixel towards the black state and the longer pulse t19 for driving the pixel towards the white state to be more efficient. The wait period t20 may be in the range of 5-5000 msec, depending on the resistance of the dielectric layers. The entire waveform of FIG. 8 may be repeated at least 2 times (N≥2), preferably at least 4 times and more preferably at least 8 times. The periods, t18 and t19 in FIG. 18, are similar to periods t16 and t17 in FIG. 15, respectively. In other words, t19 is greater than t18.

Figure 19:
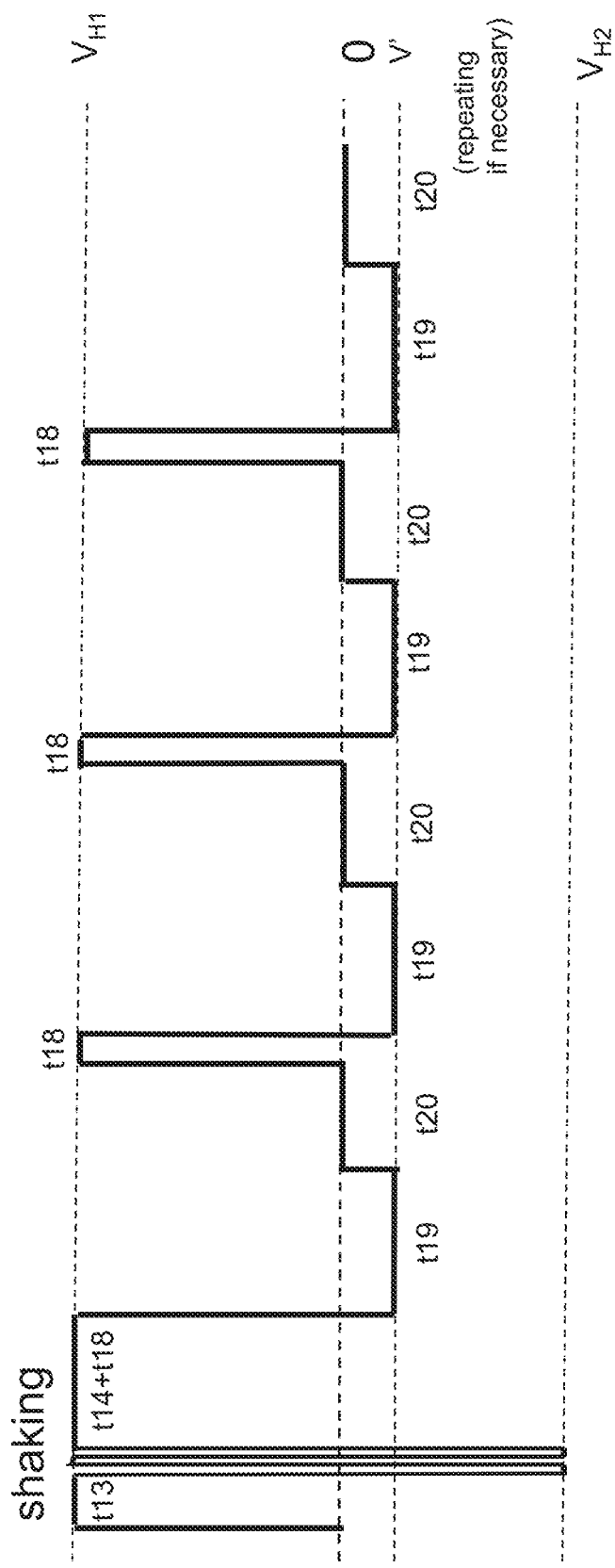

As already noted, the waveform of FIG. 18 may be used to replace the portion of the waveform of FIG. 14 occurring in period t15. FIG. 19 illustrates a waveform in which the portion of the waveform of FIG. 14 occurring in period t15 is replaced by three cycles of the waveform of FIG. 18 (more or fewer cycles may of course be used). In other words, the waveform of FIG. 19 comprises driving towards black for a period of t13 (cf. FIG. 14), a shaking waveform, driving towards black for a period of t14 (again, cf. FIG. 14), and then applying multiple cycles of the waveform of FIG. 18.

Figure 20:
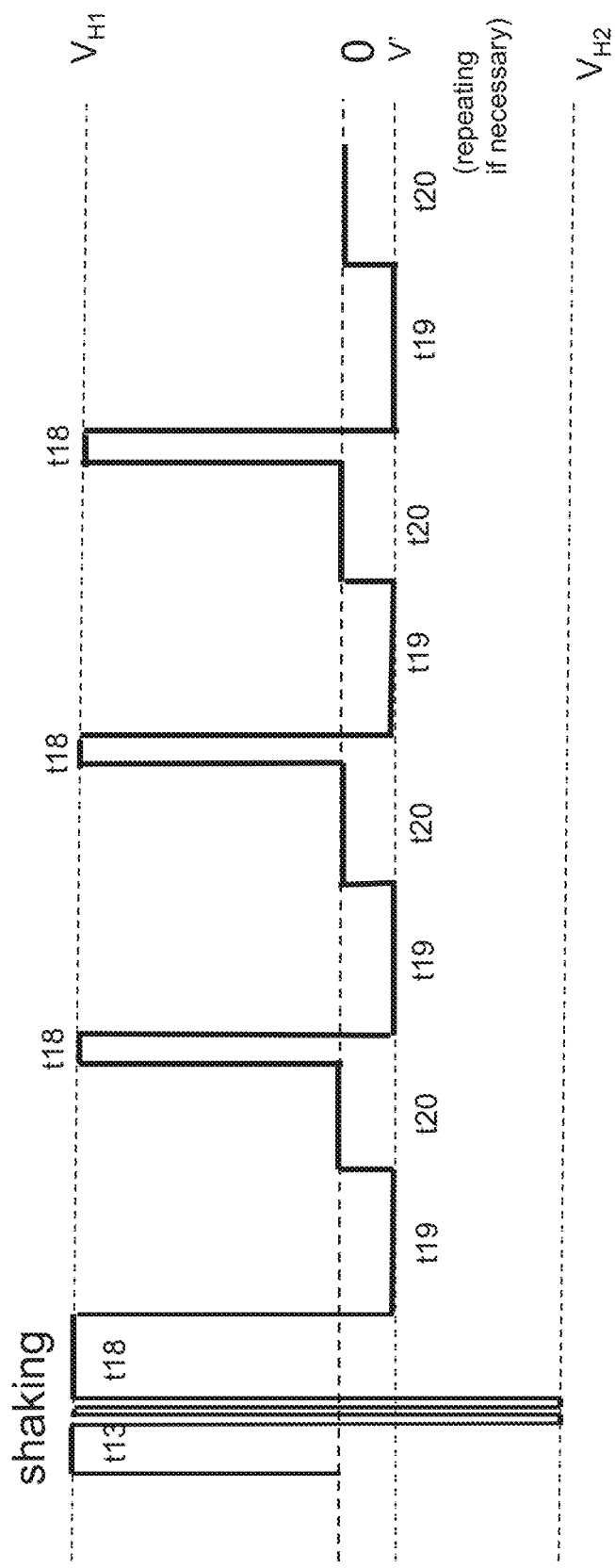

FIG. 20 illustrates a waveform similar to that of FIG. 19 but in which the step of driving towards the black state for the period of t14 is eliminated, so that the waveform of FIG. 20 transitions from the shaking waveform immediately to the waveform of FIG. 18. The waveforms of FIGS. 19 and 20 may each be DC balanced.

The driving method of FIG. 18 therefore can be summarized as follows:

A driving method for an electrophoretic display comprising a first surface on the viewing side, a second surface on the non-viewing side and an electrophoretic fluid which fluid is sandwiched between a common electrode and a layer of pixel electrodes and comprises a first type of particles, a second type of particles, a third type of particles, a fourth type of particles and a fifth type of particles, all of which are dispersed in a solvent or solvent mixture, wherein:
- (a) the five types of pigment particles have optical characteristics differing from one another;
- (b) the first and second types of particles carry opposite charge polarities;
- (c) the third and fourth types of particles carry the same charge polarity as the first type of particles, and the first type, the third type and the fourth type of particles have progressively lower magnitudes; and
- (d) the fifth type of particles carries the same charge polarity as the second type of particles but its magnitude is lower than that of the second type of particles, the method comprises the following steps:
  - (i) applying a first driving voltage to a pixel of the electrophoretic display for a first period of time to drive the pixel towards the color state of the first type of particles;
  - (ii) applying a second driving voltage to the pixel for a second period of time, wherein the second driving voltage has same polarity as the fifth type of particles and a magnitude lower than that of the first driving voltage, to drive the pixel from the color state of the first type of particles towards the color state of the fifth type of particles to appear at the viewing side;
  - (iii) applying no driving voltage to the pixel for a third period of time; and repeating steps (i)-(iii).

In this method, the magnitude of the second driving voltage may be less than 50% of the magnitude of the first driving voltage. Steps (i), (ii) and (iii) may be repeated at least 2 times, preferably at least 4 times and more preferably at least 8 times. The method may further comprise a shaking waveform before step (i), and/or may further comprise driving the pixel to the color state of the first type of particles after the shaking waveform but prior to step (i). The lengths of the driving periods may be temperature dependent.

Figure 21:
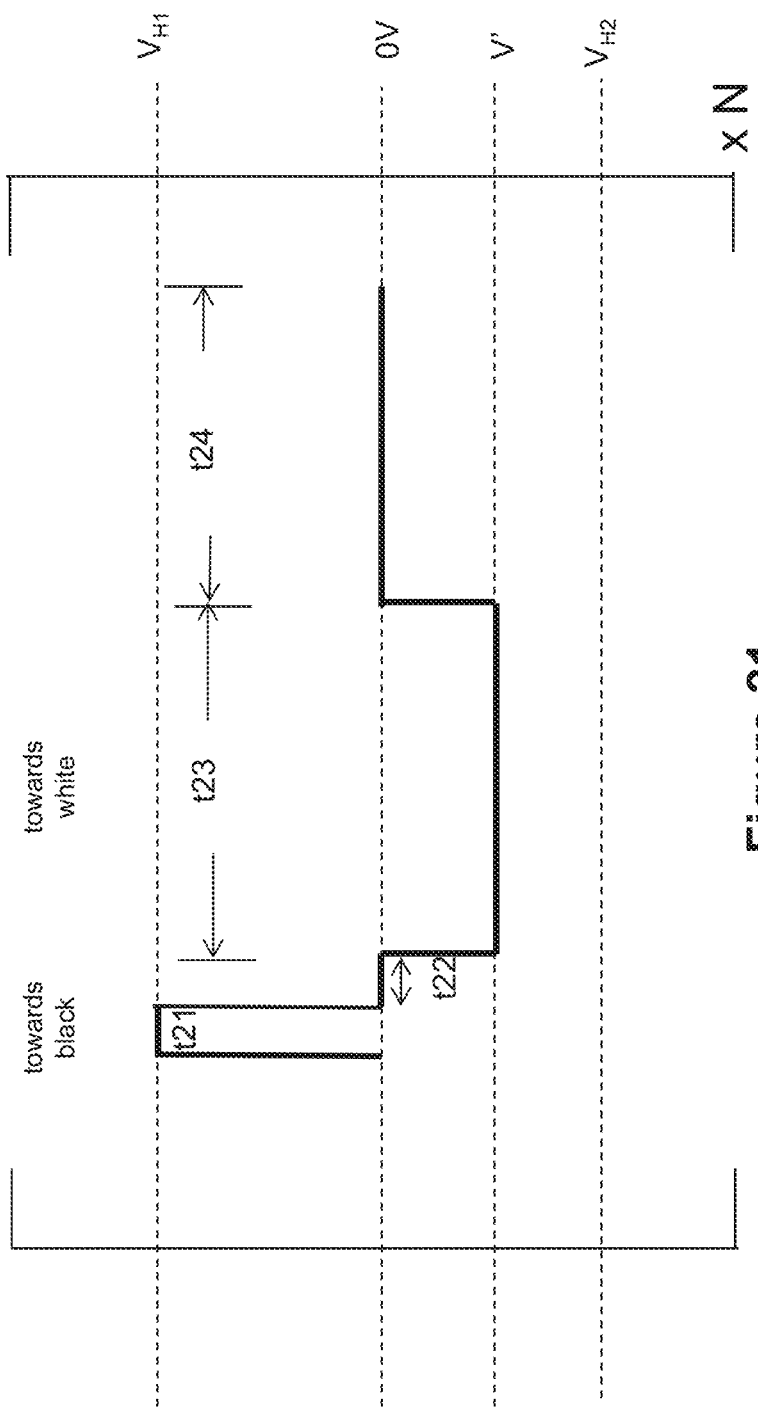

FIG. 21 illustrates a waveform which may be used in place of the waveform of FIG. 15 or 18 to replace the portion of the waveform of FIG. 14 occurring in period t15. The waveform of FIG. 21, which is essentially an inverted version of the waveform of FIG. 11, comprises driving towards black for an initial period of t21 (cf. period t16 in FIG. 15), followed by a wait time of t22 during which no driving voltage is applied. The wait time of t22 is followed by driving towards white for a period of t23 (cf. period t17 in FIG. 15), followed by a wait period of t24 in which no driving voltage is applied (cf. period t20 in FIG. 18). The waveform of FIG. 21 may be repeated at least 2 times, preferably at least 4 times and more preferably at least 8 times.

In the waveform of FIG. 21, the first wait time t22 is very short while the second wait time t24 is longer. The period t21 is also shorter than the period t23. For example, t21 may be in the range of 20-200 msec; t22 may be less than 100 msec; t23 may be in the range of 100-200 msec; and t24 may be less than 1000 msec.

Figure 22:
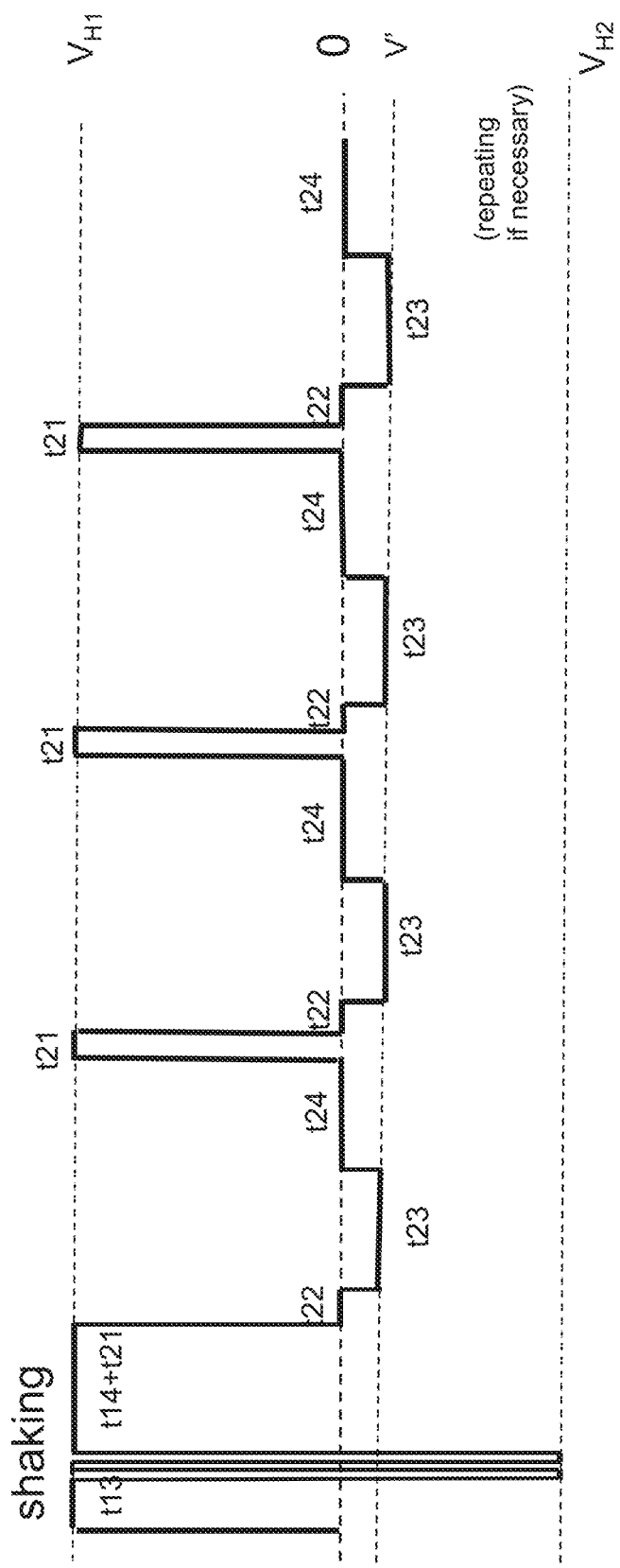

As already noted, the waveform of FIG. 21 may be used to replace the portion of the waveform of FIG. 14 occurring in period t15. FIG. 22 illustrates a waveform in which the portion of the waveform of FIG. 14 occurring in period t15 is replaced by three cycles of the waveform of FIG. 21 (more or fewer cycles may of course be used). In other words, the waveform of FIG. 22 comprises driving towards black for a period of t13 (cf. FIG. 14), a shaking waveform, driving towards black for a period of t14 (again, cf. FIG. 14), and then applying multiple cycles of the waveform of FIG. 21. As a general rule, the better the black state achieved at the end of period t14, the better the white state that will be displayed at the end of the waveform.

Figure 23:
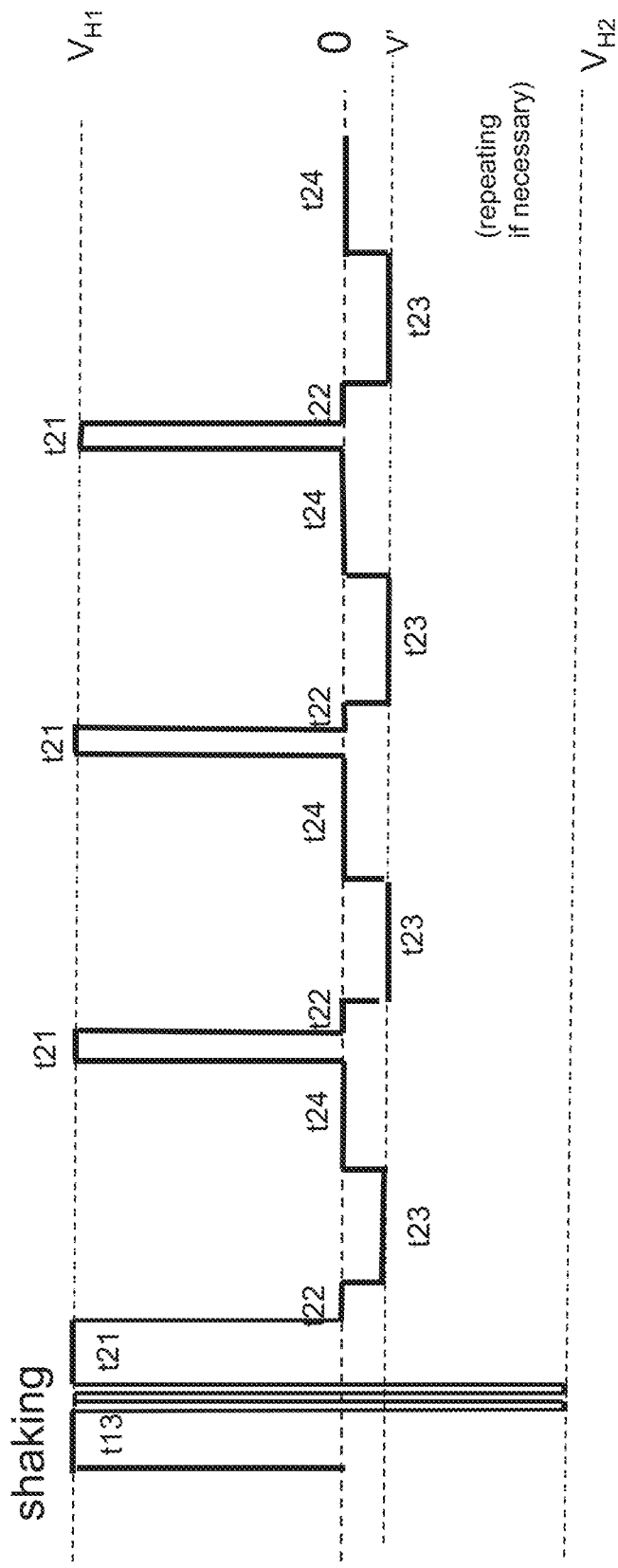

FIG. 23 illustrates a waveform similar to that of FIG. 22 but in which the step of driving towards the black state for the period of t14 is eliminated, so that the waveform of FIG. 23 transitions from the shaking waveform immediately to the waveform of FIG. 21. The waveforms of FIGS. 22 and 23 may each be DC balanced.

The driving method of FIG. 21 therefore can be summarized as follows:

A driving method for an electrophoretic display comprising a first surface on the viewing side, a second surface on the non-viewing side and an electrophoretic fluid which fluid is sandwiched between a common electrode and a layer of pixel electrodes and comprises a first type of particles, a second type of particles, a third type of particles, a fourth type of particles and a fifth type of particles, all of which are dispersed in a solvent or solvent mixture, wherein:
(a) the five types of pigment particles have optical characteristics differing from one another;
(b) the first and second types of particles carry opposite charge polarities;
(c) the third and fourth types of particles carry the same charge polarity as the first type of particles, and the first type, the third type and the fourth type of particles have progressively lower magnitudes; and
(d) the fifth type of particles carries the same charge polarity as the second type of particles but its magnitude is lower than that of the second type of particles, the method comprises the following steps:
(i) applying a first driving voltage to a pixel in the electrophoretic display for a first period of time to drive the pixel towards the color state of the first type of particles;
(ii) applying no driving voltage to the pixel for a second period of time;
(iii) applying a second driving voltage to the pixel for a third period of time, wherein the second driving voltage has the same polarity as the fifth type of particles and has a magnitude lower than that of the first driving voltage, to drive the pixel from the color state of the first type of particles towards the color state of the fifth type of particles to appear at the viewing side;
(iv) applying no driving voltage to the pixel for a fourth period of time; and repeating steps (i)-(iv).

In this method, the magnitude of the second driving voltage may be less than 50% of the magnitude of the first driving voltage. Steps (i)-(iv) may be repeated at least 2 times, preferably at least 4 times and more preferably at least 8 times. The method may further comprise a shaking waveform before step (i), and/or may further comprise driving the pixel to the color state of the first type of particles after the shaking waveform but prior to step (i). The lengths of the driving periods may be temperature dependent.

This driving method not only is particularly effective at a low temperature, but can also provide a display device better tolerance of structural variations caused during manufacture of the display device. Therefore its usefulness is not limited to low temperature driving.

Figure 24:
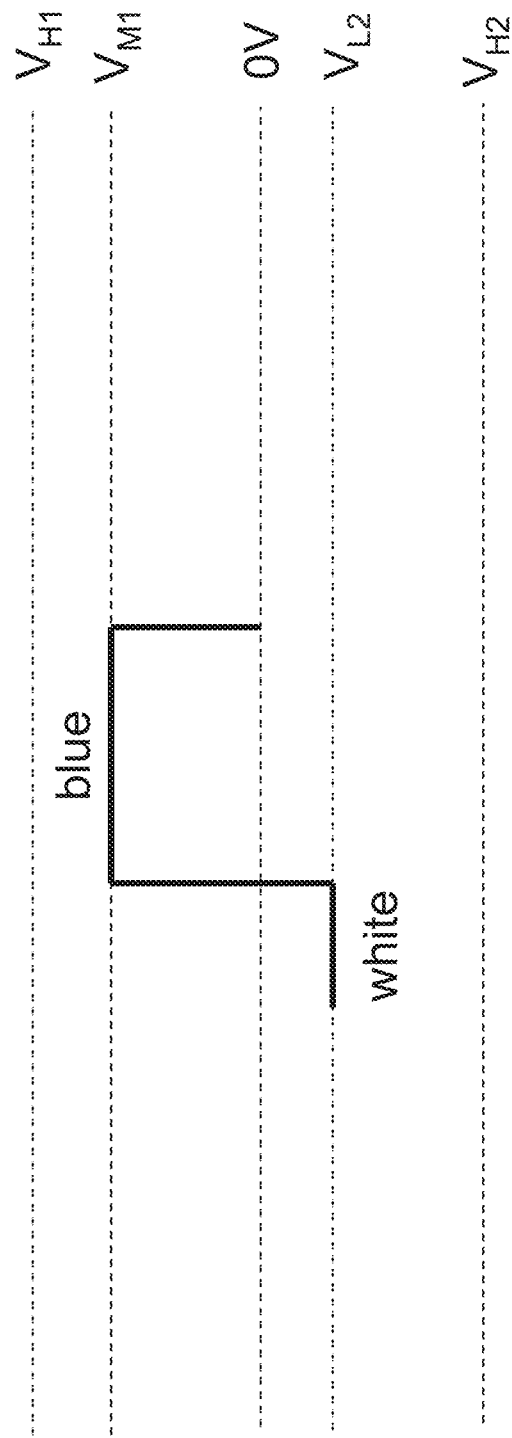
FIGS. 24-27 illustrate waveforms which can be used to cause the display layer shown in FIG. 1 to effect the transitions shown in FIG. 3-4 or 3-5 to display the blue color of the medium positive particles.

FIG. 24 illustrates a waveform which may be used to effect the white-to-blue (low negative to middle positive) transition of FIG. 3-4 or 3-5. The waveform of FIG. 24 is a "single pulse" waveform comprising a low negative driving voltage ($V_{L2}$, for example −3V) to drive the pixel to the white state shown on the left hand side of FIG. 3-4 or 3-5, followed by a medium positive driving voltage $V_{M1}$, for example +12V). The single pulse waveform shown in FIG. 24 can lead to a blue color state, with proper timing. The driving time for the single blue-going pulse may be in the range of about 100 to about 2,000 msec. If the pulse is applied for too long, the red particles may catch up with the blue particles adjacent the viewing surface of the display, which may cause some red contamination of the blue state.

Figure 25:
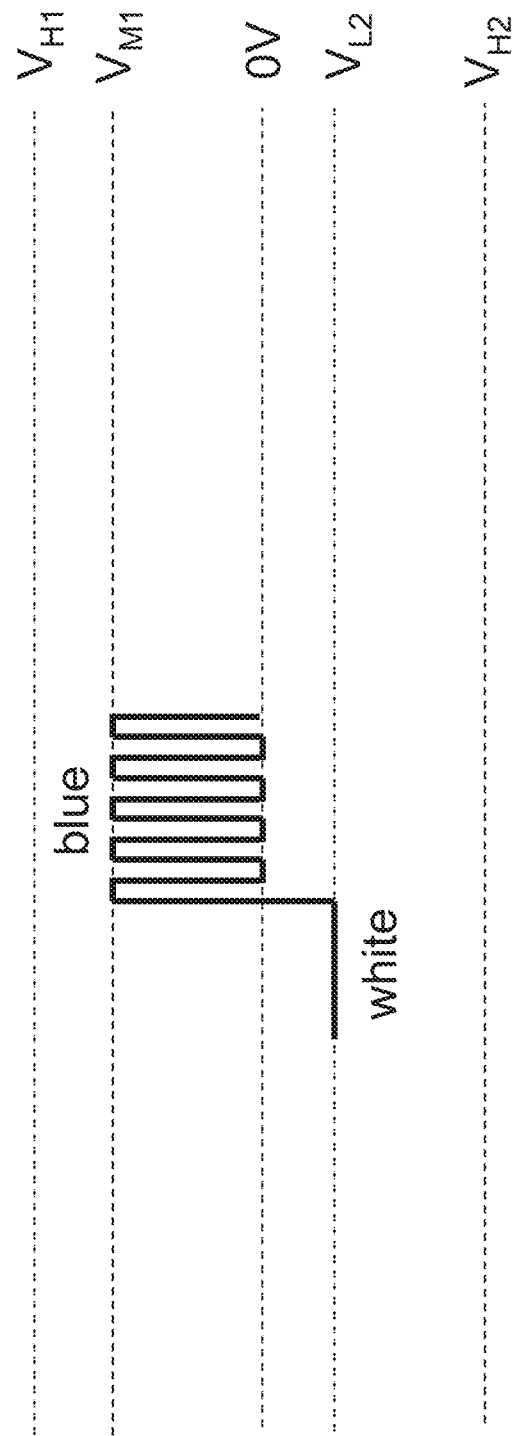

Alternatively, the white-to-blue transition of FIG. 3-4 or 3-5 may be effected using a pulsing waveform as shown in FIG. 25. The waveform of FIG. 25 begins with the same white-going pulse as the waveform of FIG. 24 but instead of the single blue-going pulse in the waveform of FIG. 24, the waveform of FIG. 25 has a series of short driving pulses of the medium positive driving voltage $V_{M1}$, alternating with periods of zero voltage. The medium positive driving voltage used in the waveform of FIG. 25 has a magnitude which may or may not be the same as that of the medium positive driving voltage used in the single pulse waveform of FIG. 24. In a waveform such as that of FIG. 25, there may be 10-200 cycles of pulsing. A pulsing waveform may lead to better color performance because it can prevent self-aggregation of the blue particles, which usually causes reduction of the hiding power of layers of such particles.

As already noted, the five particle system shown in FIGS. 1 and 3-1 to 3-5, has high, middle and low positive particles, and high and low negative particles. If the middle positive particles were replaced with middle negative particles, the color state of these middle negative particles could be displayed by a transition from the color state of the low positive particles using waveforms which are inverted versions of those shown in FIGS. 24 and 25.

The driving method for achieving the (blue) color state of the middle positive particles in the five particle system shown in FIGS. 1 and 3-4 to 3-5 may be summarized as follows:

A driving method for an electrophoretic display comprising a first surface on the viewing side, a second surface on the non-viewing side and an electrophoretic fluid which fluid is sandwiched between a common electrode and a layer of pixel electrodes and comprises a first type of particles, a second type of particles, a third type of particles, a fourth type of particles and a fifth type of, all of which are dispersed in a solvent or solvent mixture, wherein:
(a) the five types of pigment particles have optical characteristics differing from one another;
(b) the first and second types of particles carry opposite charge polarities;
(c) the third and fourth types of particles carry the same charge polarity as the first type of particles and the first type, the third type and the fourth type have progressively lower magnitudes; and
(d) the fifth type of particles carries the same charge polarity as the second type of particles but their magnitude is lower than that of the second type of particles, the method comprises applying a driving voltage or a pulsing waveform with alternating a driving voltage and no driving voltage, to a pixel of the electrophoretic display, wherein the pixel is in the color state of the fifth type of particles and the driving voltage has the same polarity as the third type of particles, to drive the pixel from the color state of the fifth type of particles towards the color state of the third type of particles to appear at the viewing side.

Figure 26:
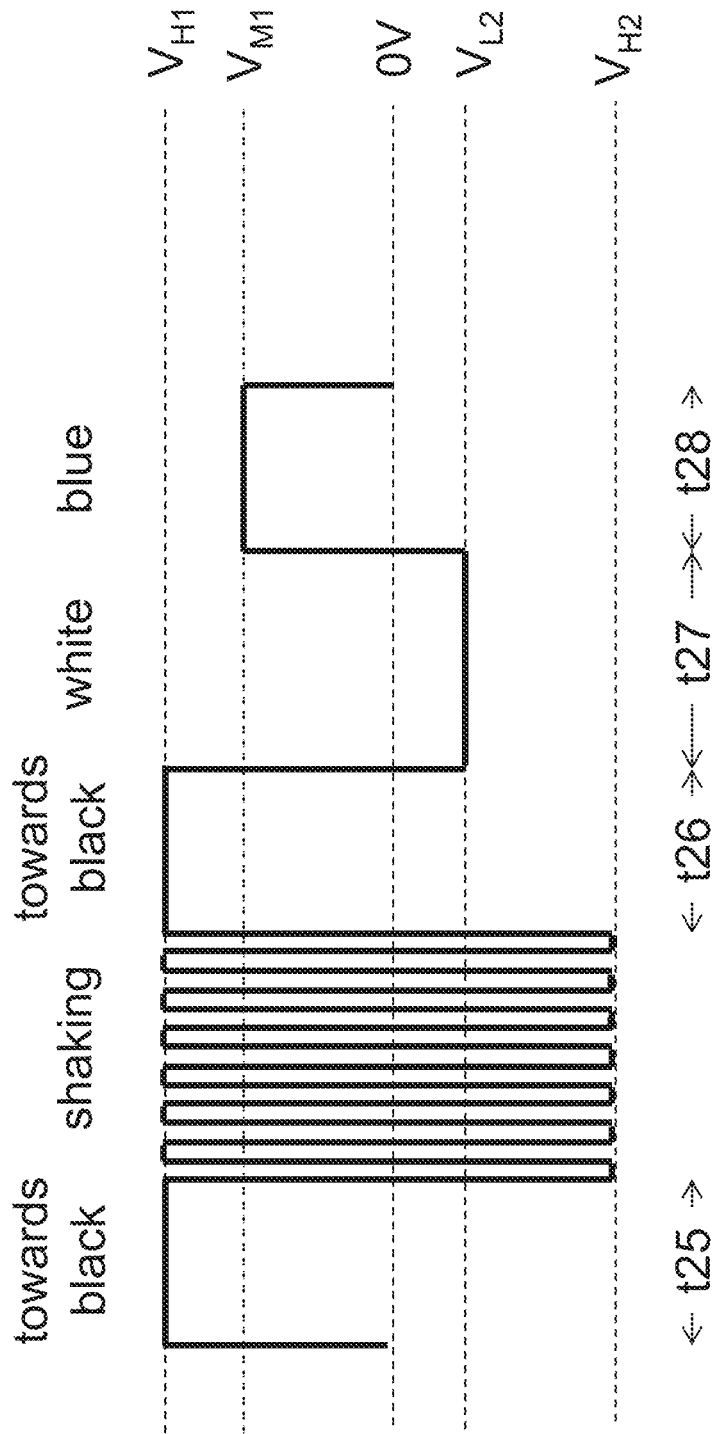
Figure 27:
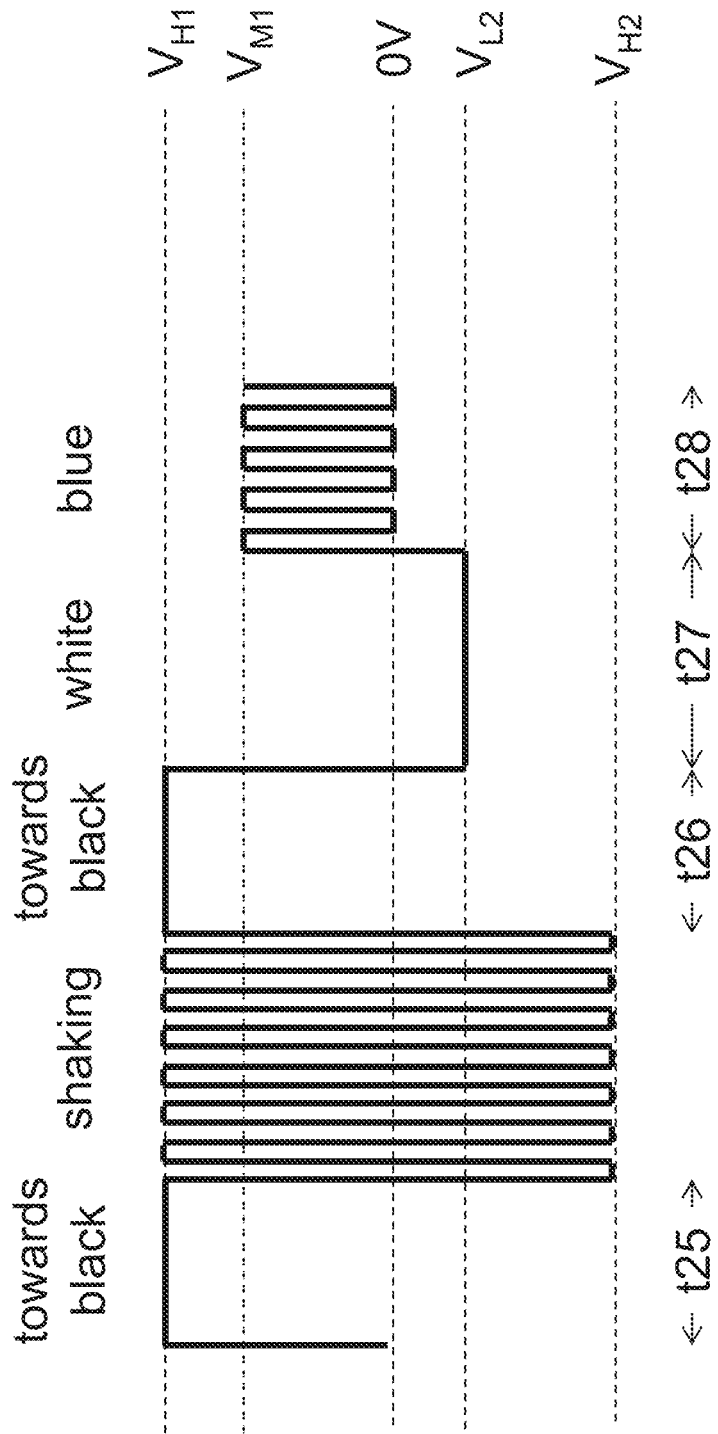

The white state needed for the white-to-blue transition of FIG. 3-4 or 3-5 can be achieved by any of the methods described above, and FIGS. 26 and 27 illustrate two possible waveforms for this purpose. The waveform of FIG. 26 is in effect a combination of the waveforms of FIGS. 14 and 24, while the waveform of FIG. 27 is in effect a combination of the waveforms of FIGS. 14 and 25.

The waveforms described above make use of three levels of positive driving voltage, high positive ($V_{H1}$), medium positive ($V_{M1}$) and low positive ($V_{L1}$), and two levels of negative driving voltage, high negative ($V_{H2}$) and low negative ($V_{L2}$). The medium positive driving voltage ($V_{M1}$) may be 40% to 100%, preferably 50% to 90%, of the high positive driving voltage ($V_{H1}$) and the low positive driving voltage ($V_{L1}$) may be 5% to 50%, preferably 15% to 40%, of the high positive driving voltage ($V_{H1}$). The low negative driving voltage ($V_{L2}$) may be 10% to 90%, preferably 30% to 70%, of the high negative driving voltage ($V_{H2}$).

If the middle positive particles were replaced with middle negative particles, three levels of negative driving voltage, high negative, medium negative and low negative, and two levels of positive driving voltage, high positive and low positive would be required. In such a case, the medium negative driving voltage ($V_{M2}$) may be 40% to 100%, preferably 40% to 90%, of the high negative driving voltage ($V_{H2}$) and the low negative driving voltage ($V_{L2}$) may be 5% to 50%, preferably 10% to 45%, of the high negative driving voltage ($V_{H2}$). The low positive driving voltage ($V_{L1}$) may be 5% to 95%, preferably 25% to 75%, of high positive driving voltage ($V_{H1}$).

The "high" driving voltage (positive or negative) referred to above is usually the driving voltage required to drive a pixel from a color state of one type of the high charged particles to a color state of another type of high charged particles of opposite polarity. For example, in the system shown in FIGS. 1 and 3-1 to 3-5, a high driving voltage ($V_{H1}$ or $V_{H2}$) is defined as a driving voltage which is sufficient to drive a pixel from the black color state to the yellow color state, or vice versa (see FIG. 3-1).

In all embodiments of the present invention, since the five color states are controlled by varying voltage levels and each particle type/color can occupy 100% of the pixel area at a particular driving voltage, the brightness of each individual color state is not compromised. This type of full color electrophoretic display will provide not only non-compromised white and black states, but also non-compromised color states of other colors, such as red, green and blue.

In the specific systems described above, each pixel can display five color states, so that the system is a 5-CP system. More color states may be displayed if a pixel consists of multiple sub-pixels each capable of displaying five color states. For example, if each pixel has three sub-pixels, one of the five color states may be displayed by the pixel if all three sub-pixels display that color. If the three sub-pixels display red, blue and black color states respectively, the pixel will display a magenta color state. If the three sub-pixels display green, blue and black color states respectively, the pixel will display a cyan color state. If the three sub-pixels display red, green and black color states respectively, the pixel will display a yellow color state. More color states may be displayed through adjusting driving waveforms or by using various image processing techniques.

The electrophoretic medium used in the present invention may be unencapsulated, microencapsulated, a polymer-dispersed electrophoretic medium or in microcells or other display cells, for example as described in U.S. Pat. No. 6,930,818, or in microchannels or equivalents, regardless of their shapes or sizes.

Electrophoretic layers of the present invention using six different types of particles (6-CP systems), and driving methods for such electrophoretic layers, will now be described. Such layers differ from the five particle systems previously described in that they have three positive and three negative types of particles, and thus contain both middle positive and middle negative particles.

Figure 28:
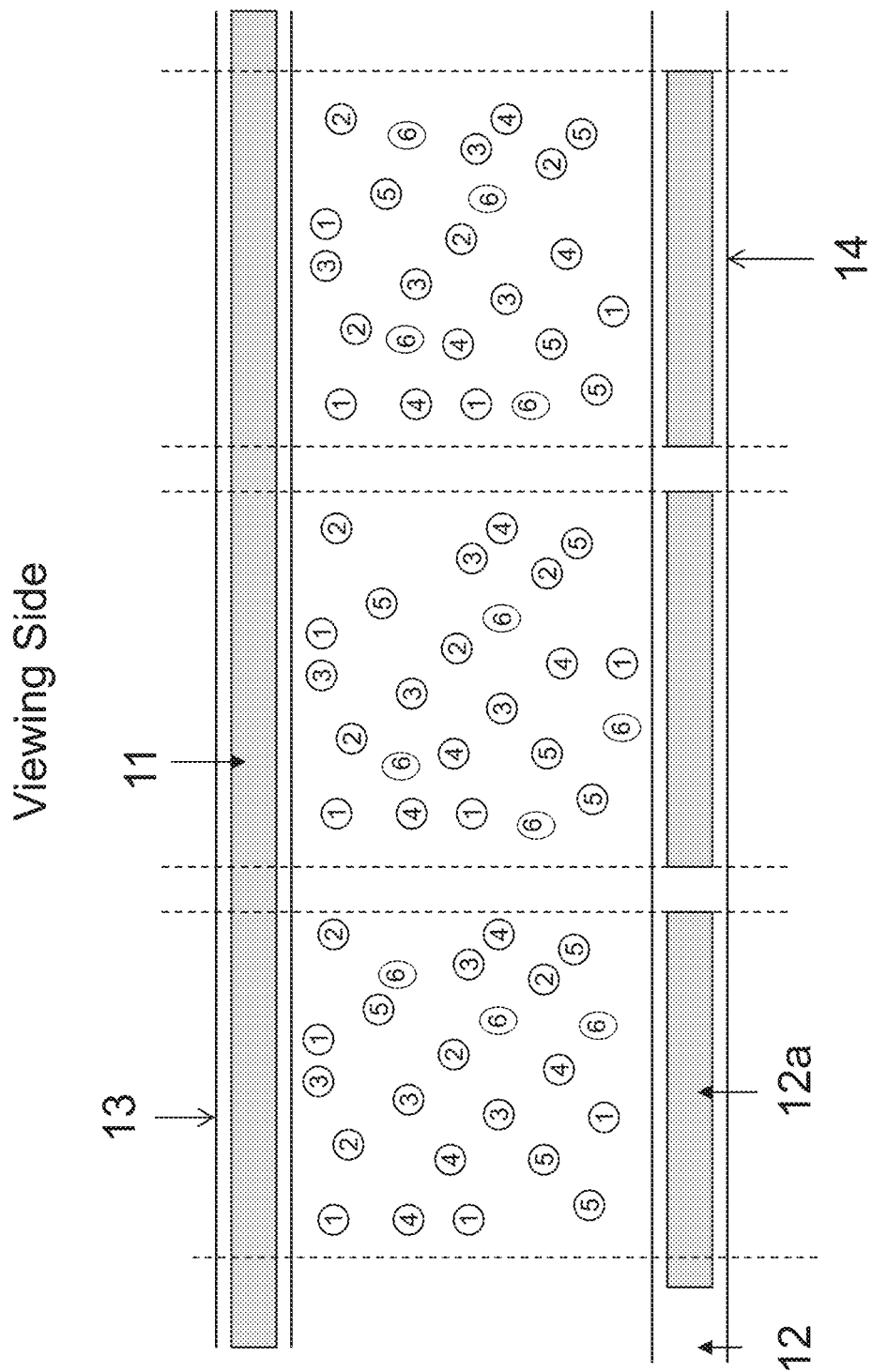
FIG. 28 is a schematic cross-section similar to that of FIG. 1, but taken through a display layer containing six different types of particles which can display six different color states.

FIG. 28 is a schematic cross-section similar to that of FIG. 1, but taken through a display layer containing six different types of particles (designated respectively by numbers 1-6 within circles) which can display six different color states. In addition to the high positive black, middle positive blue, low positive red, high negative yellow and low positive white of the electrophoretic layer shown in FIG. 1, the electrophoretic layer of FIG. 28 contains middle negative green (G) particles.

Figures 4, 29:
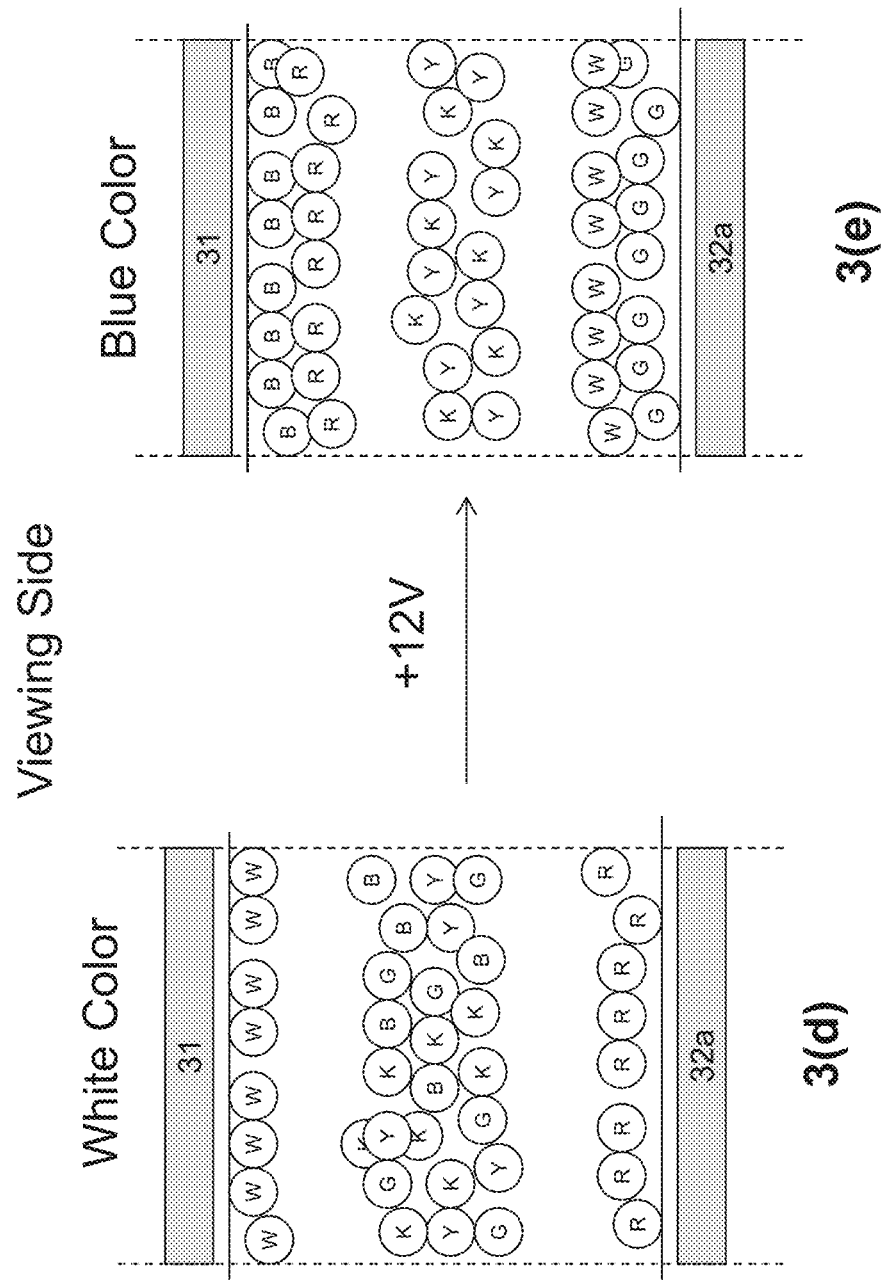
Figures 5, 29:
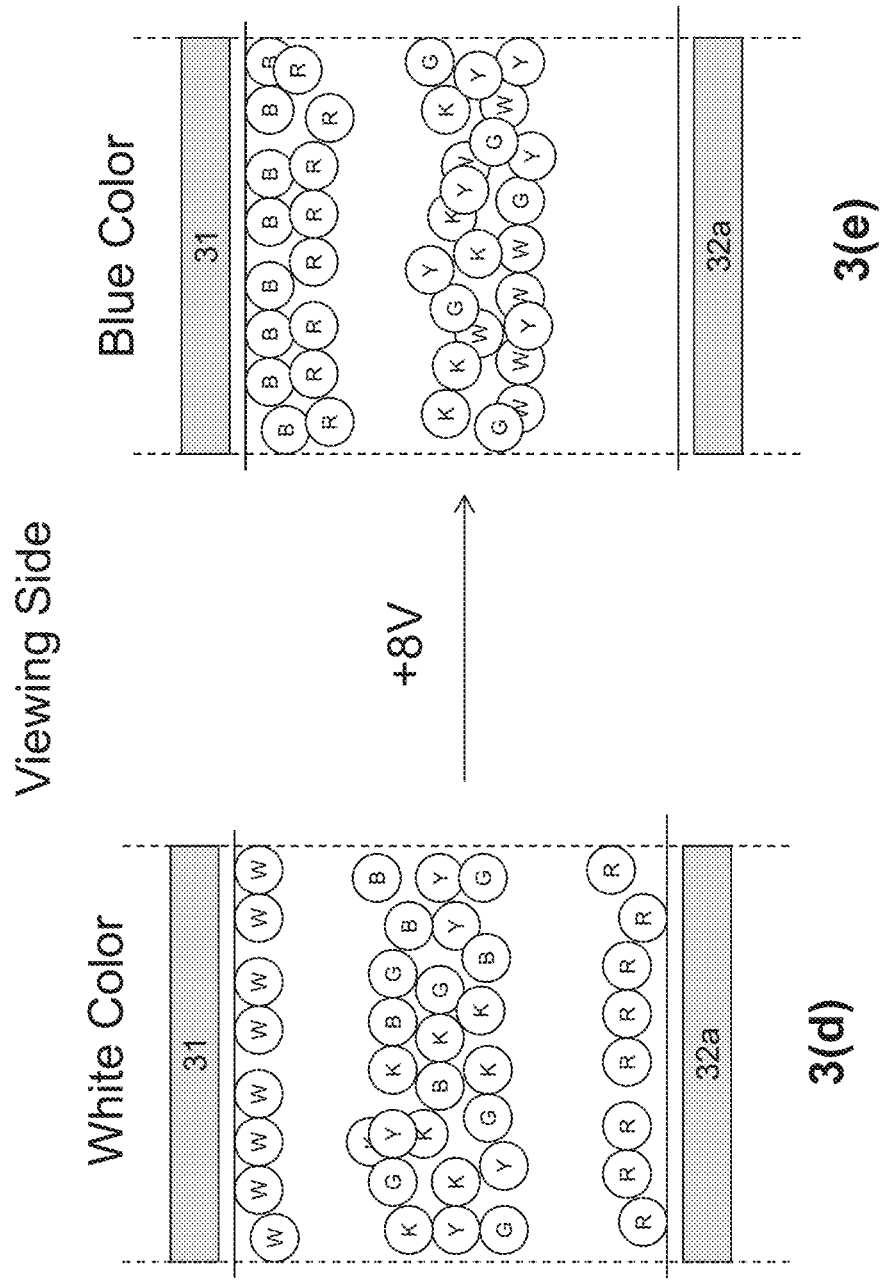
Figures 6, 29:
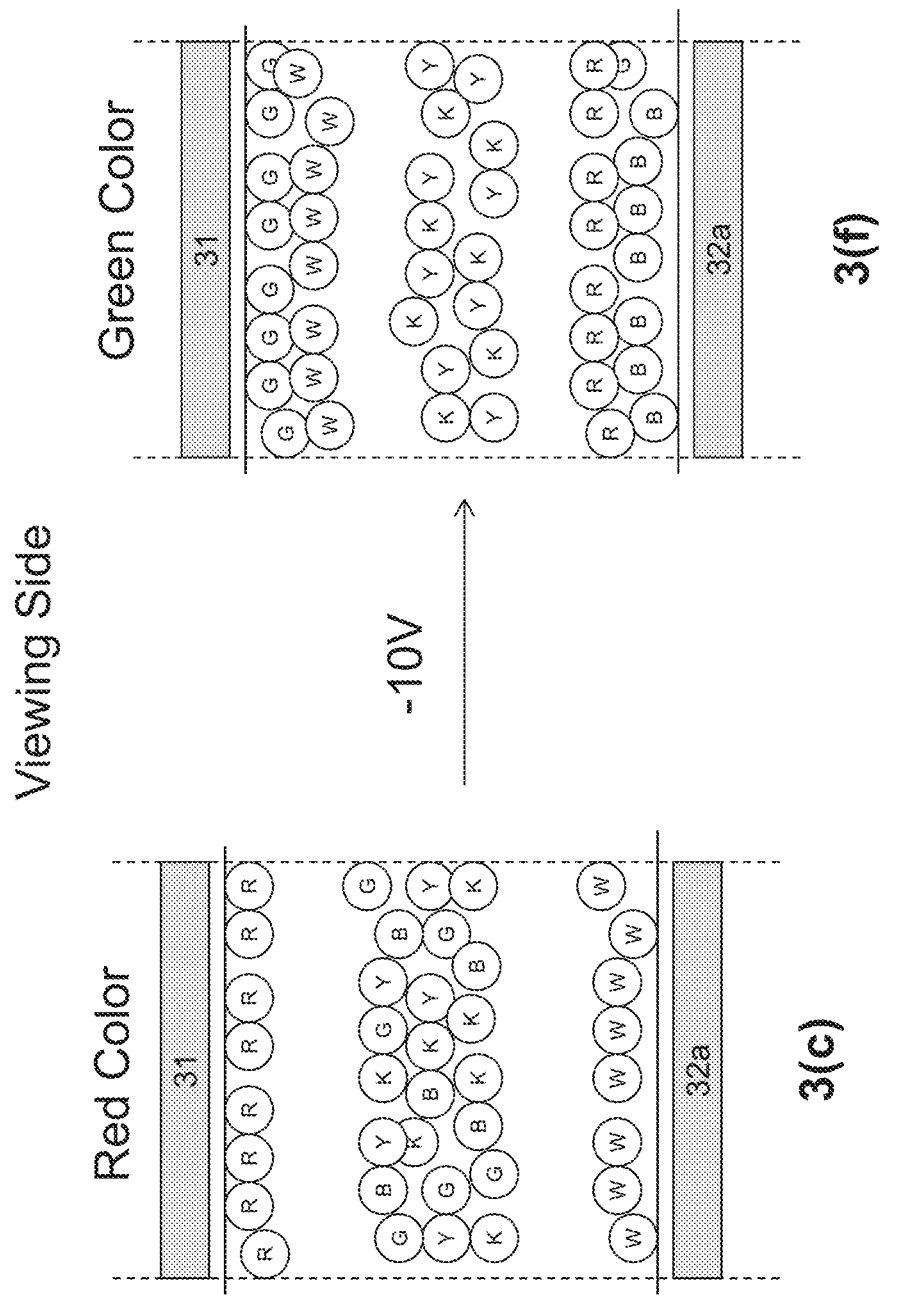

FIGS. 29-1 to 29-5 are schematic cross-sections similar to those of FIGS. 3-1 to 3-5 respectively and illustrating the same transitions. The driving voltages and the positions of the black, yellow, blue, red and white particles in FIGS. 29-1 to 29-5 are essentially identical to those in FIGS. 3-1 to 3-5 respectively; the positions of the green particles are as follows:
(a) in the yellow state shown in FIG. 29-1, the green particles lie between the yellow and white particles adjacent the common electrode;
(b) in the black state shown in FIG. 29-1, the green particles lie between the yellow and white particles adjacent the pixel electrode;
(c) in the black state shown in FIG. 29-2, the green particles are admixed with the yellow, black and blue particles in the pack intermediate the pixel and common electrodes;
(c) in the white state shown in FIG. 29-3, the green particles are again admixed with the yellow, black and blue particles in the pack intermediate the pixel and common electrodes;
(d) in the blue state shown in FIG. 29-4, the green particles lie between the pixel electrode and the white particles (so that a green color is displayed at the pixel electrode, if visible); and
(e) in the blue state shown in FIG. 29-5, the green particles are admixed with the yellow, black and white particles in the pack intermediate the pixel and common electrodes (so that a mixture of colors of these four particles would be displayed at the pixel electrode, if visible).

In FIG. 29-4, depending upon the charges on the white and green particles and the specific driving voltage used, it is possible that only the white particles escape from the pack and that the green particles remain with the black and yellow particles, so that a white color is displayed at the pixel electrode, if visible. For reasons already discussed, whether the pixel electrode surface displays a green or a white color will normally be of little practical consequence.

FIGS. 29-6 and 29-7 illustrate the manner in which the middle negative (green) particles are displayed at the viewing surface of the display shown in FIG. 28. By comparing FIGS. 29-6 and 29-7 with FIGS. 29-4 and 29-5 respectively, it will be seen that the method for displaying the middle negative (green) particles is essentially the inverse of that used to display the middle positive (blue) particles. Thus, instead of starting from the color of the low negative (white) particles, the process for displaying the green particles starts from the low positive (red) state 3(c) shown in FIG. 29-2 and repeated on the left sides of FIGS. 29-6 and 29-7. In FIG. 29-6, a medium negative voltage ($V_{M2}$, e.g., −10V) is applied to the pixel electrode (i.e., the common electrode is made moderately positive with respect to the pixel electrode). The medium negative driving voltage causes the white particles to move away from the pixel electrode and the red particles to move away from the common electrode, thereby tending to cause all six types of particles to meet and form a "pack" intermediate the common and pixel electrodes. The medium voltage applied is not sufficient to separate the high positive black from the high negative yellow particles in the pack, but (unlike the situation with the low driving voltage used in FIG. 29-2) is sufficient to cause the middle negative green particles to break away from the pack and move towards the common electrode. The low negative white particles also separate from the high positive black particles and move towards the common electrode. However, the middle negative green particles move faster than the low negative white particles and arrive adjacent the common electrode first, so that the pixel displays a green color at the viewing surface. Similarly, both the low positive red particles and the middle positive blue particles separate from the high negative yellow particles and move adjacent the pixel electrode, to produce the state illustrated at 3(f) in FIG. 29-6. The middle positive blue particles will normally move faster than the low positive red particles, so that a blue color will be displayed at the pixel electrode, if visible.

FIG. 29-7 shows an alternative method of effecting the same red-to-green transition as in FIG. 29-6. The difference between FIGS. 29-6 and 29-7 is that in the latter the medium negative driving voltage is reduced from −10 to −8V, with the result that, although the green and white particles separate from the pack in the same way as in FIG. 29-6, the electric field generated by the driving voltage of −8V is not sufficient to separate the low positive red particles or the middle positive blue particles from the high negative yellow particles, so that the black, yellow, red and blue particles remain in a pack intermediate the common and pixel electrodes. A green color is still displayed at the viewing surface but the pixel electrode surface (if visible) will display the color of a mixture of black, yellow, red and blue particles, rather than the blue state displayed at this surface in FIG. 29-6. For most practical purposes, this difference is of no consequence.

Scenarios of the type illustrated in FIGS. 3-5, 29-5 and 29-7 are possible because the magnitude of the charge on the middle negative green particles need not be the same as that on the middle positive blue particles, and the magnitude of the charge on the low negative white particles need not be the same as that on the low positive red particles. Indeed, there is a third possibility for the red-to-green transition which is not shown in either FIG. 29-6 or 29-7. Because the blue particles carry a greater charge than the red particles, it is possible to have a situation which might be regarded as intermediate those shown in FIGS. 29-6 and 29-7, in which only the red particles escape from the pack, the blue particles remaining within the pack, so that a red color is displayed at the pixel electrode.

The transitions illustrated in FIGS. 29-1 to 29-5 can be effected using appropriate ones of the waveforms illustrated in FIGS. 4-27 as previously described with reference to FIGS. 3-1 to 3-5 since the only differences between the transitions of FIGS. 3-1 to 3-5 on the one hand and FIGS. 29-1 to 29-5 on the other is the positions of the green particles, which have already been explained. Accordingly, it is now only necessary to discuss waveforms needed for the red-to-green transitions of FIGS. 29-6 and 29-7, and this will now be done with reference to FIGS. 30-33.

FIG. 30 illustrates a waveform which may be used to effect the red-to-green (low positive to middle negative) transition of FIG. 29-6 or 29-7. The waveform of FIG. 30, which is essentially an inverted version of the waveform of FIG. 24, is a "single pulse" waveform comprising a low positive driving voltage ($V_{L1}$, for example +3V) to drive the pixel to the red state shown on the left hand side of FIG. 29-6 or 29-7, followed by a medium negative driving voltage $V_{M2}$, for example −12V). The single pulse waveform shown in FIG. 30 can lead to a green color state, with proper timing. The driving time for the single green-going pulse may be in the range of about 100 to about 2,000 msec. If the pulse is applied for too long, the white particles may catch up with the green particles adjacent the viewing surface of the display, which may cause some reduction is saturation of the green state.

Figure 31:
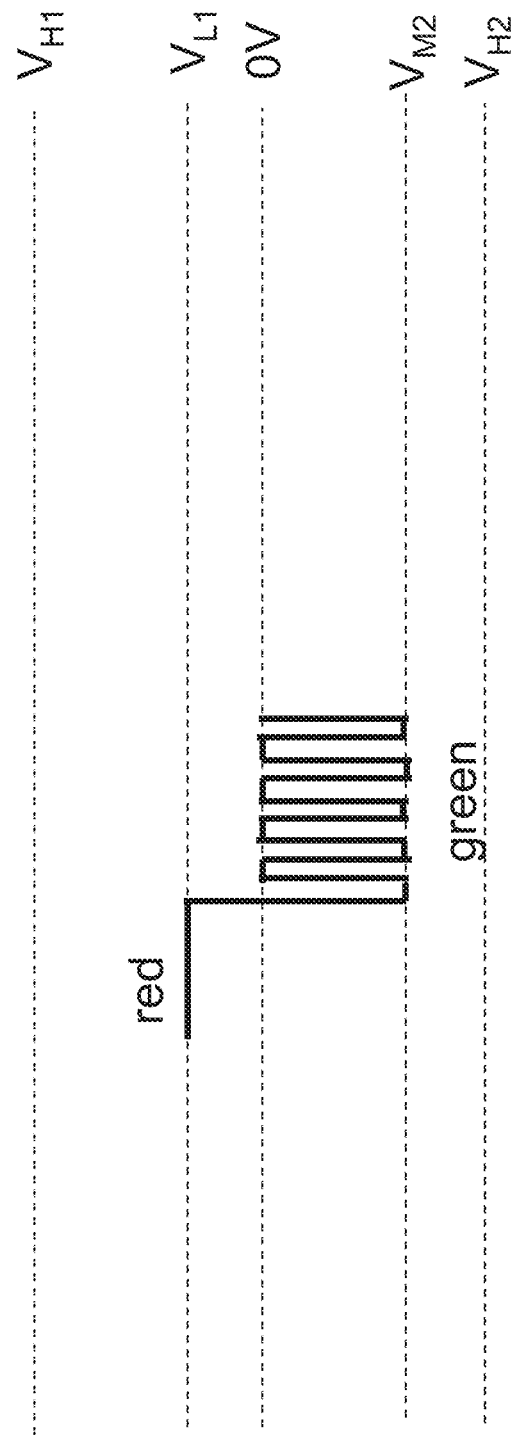

Alternatively, the red-to-green transition of FIG. 29-6 or 29-7 may be effected using a pulsing waveform as shown in FIG. 31. The waveform of FIG. 31 begins with the same red-going pulse as the waveform of FIG. 30 but instead of the single green-going pulse in the waveform of FIG. 30, the waveform of FIG. 31 has a series of short driving pulses of the medium negative driving voltage $V_{M2}$, alternating with periods of zero voltage. The medium negative driving voltage used in the waveform of FIG. 31 has a magnitude which may or may not be the same as that of the medium negative driving voltage used in the single pulse waveform of FIG. 30. In a waveform such as that of FIG. 31, there may be 10-200 cycles of pulsing. A pulsing waveform may lead to better color performance because it can prevent self-aggregation of the green particles, which usually causes reduction of the hiding power of layers of such particles.

Figure 32:
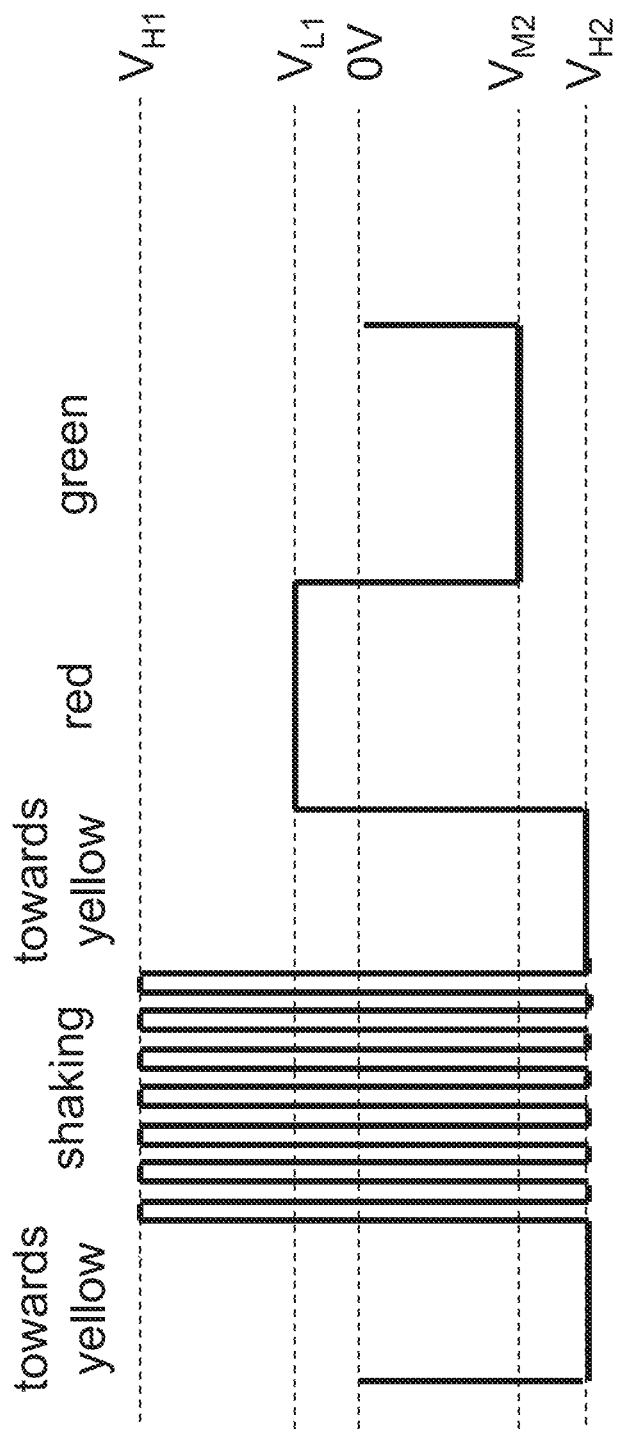
Figure 33:
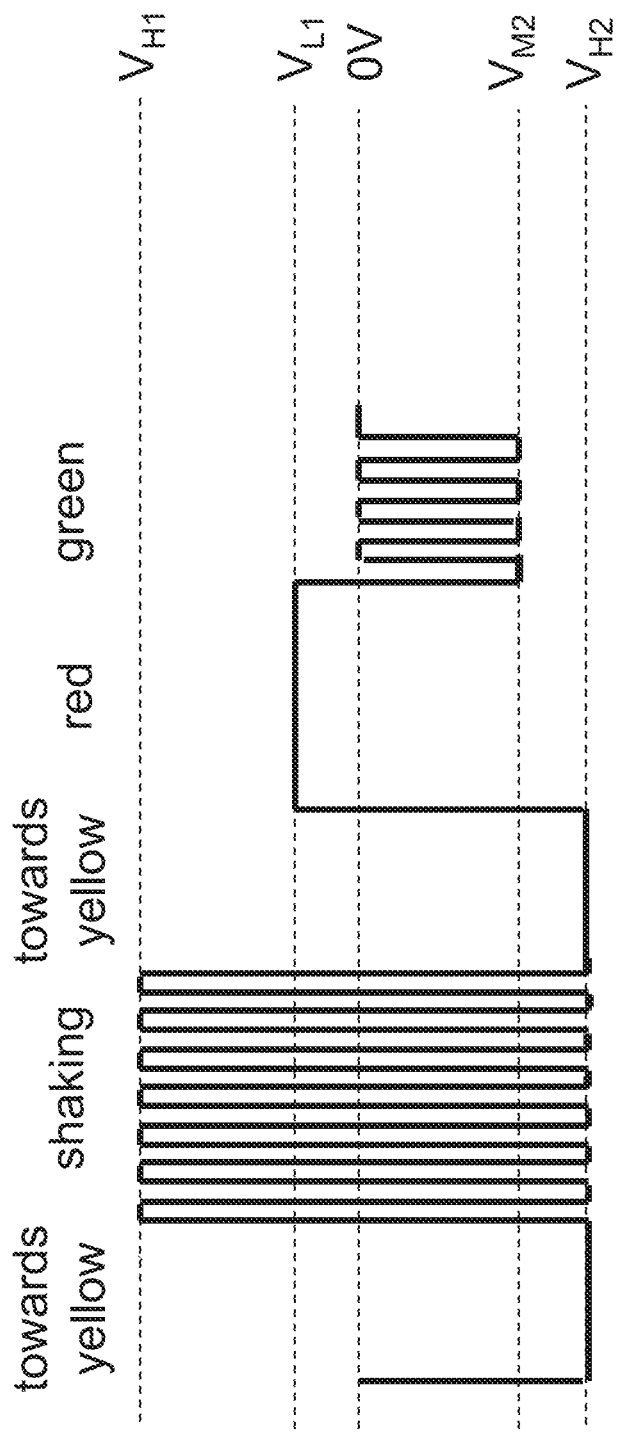

The red state needed for the red-to-green transition of FIG. 29-6 or 29-7 can be achieved by any of the methods described above, and FIGS. 32 and 33 illustrate two possible waveforms for this purpose. The waveform of FIG. 32 is in effect a combination of the waveforms of FIGS. 4 and 30, while the waveform of FIG. 33 is in effect a combination of the waveforms of FIGS. 4 and 31.

Methods for effecting transitions such as those shown in FIGS. 29-6 and 29-7 can be summarized as follows:

A driving method for an electrophoretic display comprising a first surface on the viewing side, a second surface on the non-viewing side and an electrophoretic fluid which fluid is sandwiched between a common electrode and a layer of pixel electrodes and comprises a first type of particles, a second type of particles, a third type of particles, a fourth type of particles, a fifth type of particles and a sixth type of particles, all of which are dispersed in a solvent or solvent mixture, wherein:

(a) the six types of pigment particles have optical characteristics differing from one another;
(b) the first type, the third type and the fifth type are high positive particles, mid-positive particles and low positive particles, respectively; and
(c) the second type, the fourth type and the sixth type are high negative, mid-negative and low negative particles, respectively, the method comprises applying a driving voltage or a pulsing waveform with alternating a driving voltage and no driving voltage, to a pixel of the electrophoretic display, wherein the pixel is in the color state of the fifth type of particles and the driving voltage has the same polarity as the fourth type of particles, to drive the pixel from the color state of the fifth type of particles towards the color state of the fourth type of particles to appear at the viewing side.

The relationships between the high, medium and low driving voltages, and the forms of electrophoretic layers which may be employed in the present invention have been discussed above with reference to five particle systems, and these relationships and forms apply equally to six particle systems.

In practice, it has been found that the color states produced by the display layers of the present invention are not as simple as may be implied from the foregoing discussion of FIGS. 1-33, and that there are two main issues which affect the quality of the various optical states of the display layers. The first issue is the tint of the first and second optical characteristics (for example, the black and yellow colors shown in FIG. 3-1). In the display layer shown in FIG. 3. in which positive blue and red particles are present, the yellow color may suffer from a blue or red tint, which appears to arise from the blue and red particles not separating well from the yellow particles. Although the yellow particles carry a charge of opposite polarity to the blue and red particles, a small amount of (for example) the red particles appearing on the viewing surface when the display layer is intended to display a yellow color could cause an orange tint to the yellow, which is unpleasant to the viewer.

The black optical state of the display layer may also suffer from a blue or red tint. The black, blue and red particles carry the same charge polarity but with different levels of charge intensity. The highly charged black particles are expected to move faster than the less charged blue and red particles to produce a good black state, but in practice some contamination (tinting) of the black color by the blue and/or red particles is hard to avoid.

The second major issue is the so-called "ghosting" phenomenon. As discussed for example in US 2013/0194250 (where the phenomenon is discussed only with reference to gray scale displays, but the same general principles apply to color displays) when pixels previously in different gray levels or color states are driven to the same (notional) gray level or color state, the pixels do not in practice end up in the same optical state; in the case of color displays, the pixels may differ in any one or more of L*, a* and b* (where L*, a* and b* represent to coordinates in the CIE L*a*b* color space). Differences in L*, a* and b* may hereinafter be denoted by ΔL*, Δa* and Δb* respectively. The phenomenon is referred to as "ghosting" because, for example, if an area of the display previously showing a white rectangle against a black background is redrawn to a solid black area, the differences in the final black state between the pixels which were previously white, and those previously black, cause a faint, "ghost" image of the rectangle to be visible in the final, supposedly uniformly black, image.

In one example, two groups of pixels are driven concurrently to a black state. The first group of pixels driven from a white state to the black state may show an L* of 15, while the other group of pixels driven from a black state to the final black state may show an L* of 10, thus leaving a ΔL* of 5 between the two groups of pixels.

In another example, three groups of pixels are driven concurrently to a black state. The first group of pixels are driven from red to black and may show an L* of 17 and an a* of 7 (a high a* value here, also indicative of color tinting). The second group of pixels are driven from a black state to the final black state and may show an L* of 10 and an a* of 1. The third group of pixels are driven from a white state to the black state and may show an L* of 15 and an a* of 3. In this case, the most severe ghosting resulting from a ΔL* of 7 and a Δa* of 6.

It has now been found that modification of the driving methods previously described can reduce or eliminate both the aforementioned problems; in other words, the driving methods of the present invention can reduce or eliminate not only color tinting (i.e., the a* value of the black and/or white state) but also ghosting (i.e., ΔL*, Δa* and Δb*).

Figure 34:
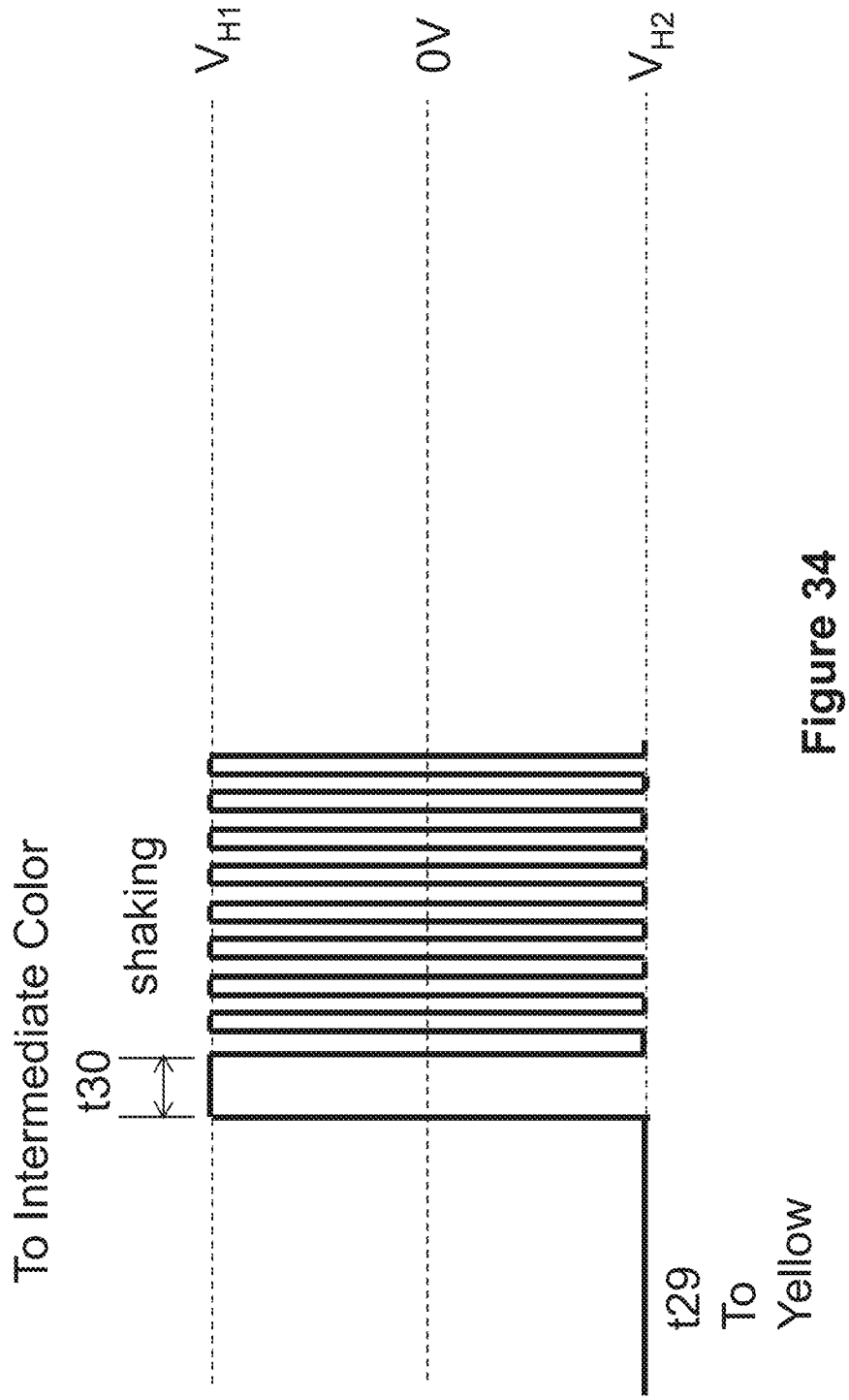
FIGS. 34 and 35 illustrate two three-part shaking waveforms which may be used to replace the single-part shaking waveform shown in Figures in any of the waveforms shown in FIGS. 4-33.
Figure 35:
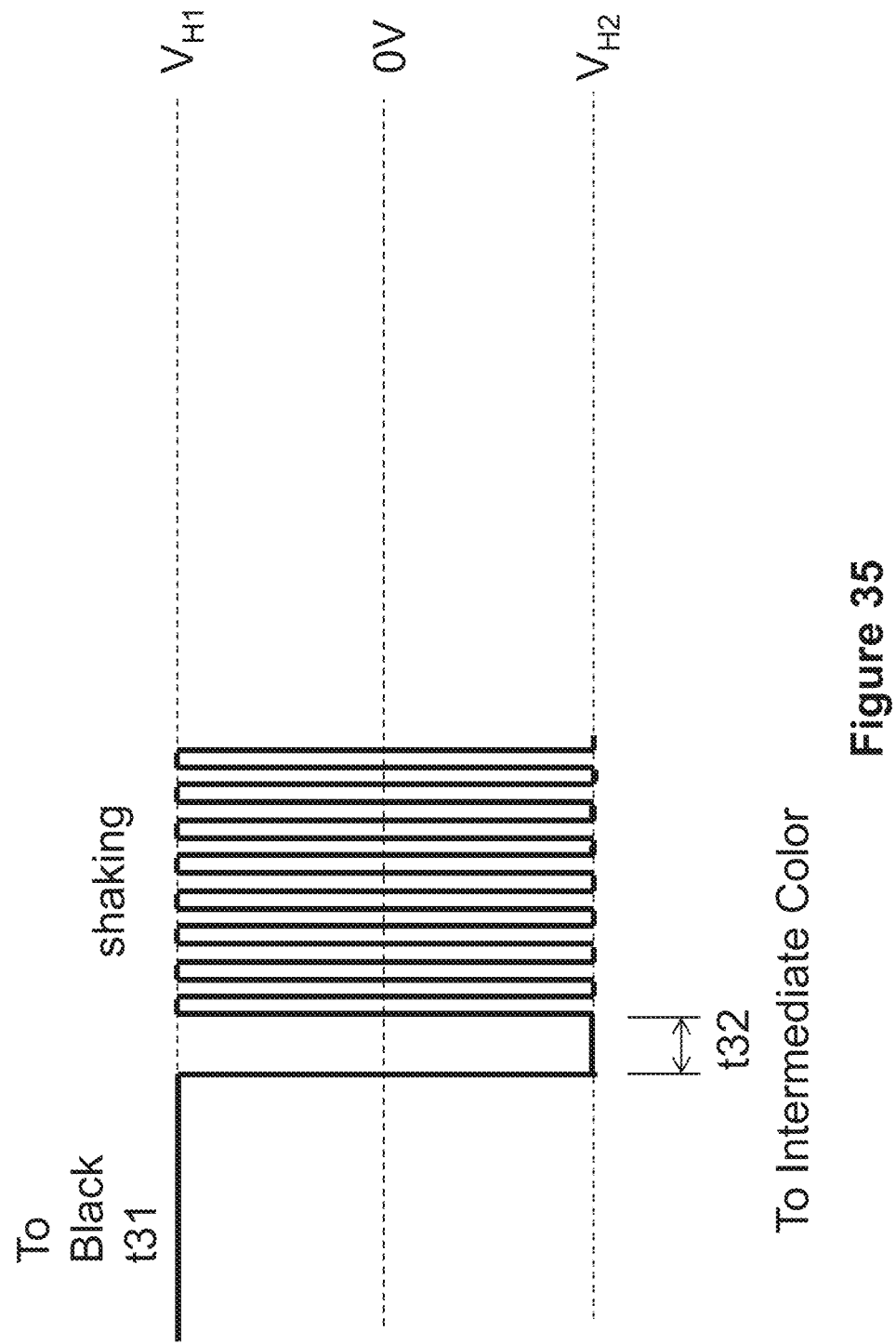

FIGS. 34 and 35 illustrate two variants of the three-part shaking waveform used in the driving methods of the present invention. These three-part shaking waveforms may be viewed as a "re-set" or "re-condition" waveform used to bring a pixel to a predictable, consistent state prior to driving the pixel to a desired color state, and thus reducing variations in the final desired color state.

The waveform shown in FIG. 34 comprises three parts, namely:

(i) applying a high negative voltage, which is preferably the same high negative voltage $V_{H2}$ used in the black-to-yellow transition shown in FIG. 29-1, for a period t29 sufficient to drive the pixel to display a yellow color at the viewing surface;
(ii) applying a high positive voltage, which is preferably the same high positive voltage $V_{H1}$ used in the yellow-to-black transition shown in FIG. 29-1, for a period t30 insufficient to drive the pixel from the yellow state to the black state, resulting in an intermediate color state (actually a mixture of yellow and black and thus a yellowish gray) at the viewing surface; and
(iii) applying a shaking waveform essentially identical to that shown in FIG. 2.

The waveform shown in FIG. 35 is essentially the inverse of that shown in FIG. 34 and comprises three parts, namely:

(i) applying a positive voltage, which is preferably the same high positive voltage $V_{H1}$ used in the yellow-to-black transition shown in FIG. 29-1, for a period t31 sufficient to drive the pixel to display a black color at the viewing surface;
(ii) applying a high negative voltage, which is preferably the same high negative voltage $V_{H2}$ used in the black-to-yellow transition shown in FIG. 29-1, for a period t32 insufficient to drive the pixel from the black state to the yellow state, resulting in an intermediate color state state (actually a mixture of yellow and black and thus a yellowish gray) at the viewing surface; and (iii) applying a shaking waveform essentially identical to that shown in FIG. 2.

The length of t30 or t32 depends not only the final color state desired (after the waveform of FIG. 34 or 35), but also the desired optical performance of the final color state (e.g., a*, b*, ΔL*, Δa* and Δb*). For example, in one specific display layer, ghosting was minimized when t30 in the waveform of FIG. 34 was 40 millisecond (msec) and pixels are driven to the red state regardless of whether they are driven from red, black or white. Similarly, ghosting was minimized when t30 was 60 msec and pixels are driven to the black state regardless of whether they are driven from red, black or white.

As noted above with reference to FIG. 2, the shaking waveform portion of the waveforms shown in FIGS. 34 and 35 consists of repeating a pair of opposite driving pulses for many cycles. For example, the shaking waveform portion may consist of a +15V pulse for 20 msec and a −15V pulse for 20 msec, with the pair of pulses being repeated 50 times, so that the total duration of the shaking waveform portion is 2000 msec.

Each of the driving pulses in the shaking waveform portion is applied for a period not exceeding half the time required to drive from the full black state to the full yellow state, or vice versa. For example, if it takes 300 msec to drive a pixel from a full black state to a full yellow state, or vice versa, the shaking waveform portion may consist of positive and negative pulses, each applied for not more than 150 msec. In practice, it is preferred that the pulses are shorter. In FIGS. 34 and 35, the shaking waveform is abbreviated (i.e., the number of pulses is fewer than the actual number).

After the shaking waveform shown in FIG. 34 or 35 is completed, the various types of particles are in a consistent mixed state in the display fluid. The pixel may then be driven to a desired color state as previously described. For example, a positive pulse may be applied to drive the pixel to black; or a negative pulse may be applied to drive the pixel to yellow. It has been found that the driving methods of the present invention incorporating the "re-set" or "pre-condition" waveform portion of FIG. 34 or 35, or similar have the advantage of shorter waveform time in achieving the same levels of optical performance (including ghosting) as compared to driving methods lacking such a waveform portion.

It will be apparent to those skilled in the art that numerous changes and modifications can be made in the specific embodiments of the invention described above without departing from the scope of the invention. Accordingly, the whole of the foregoing description is to be interpreted in an illustrative and not in a limitative sense.

The invention claimed is:

1. A display layer having a first viewing surface and a second surface on the opposed side of the display layer from the first viewing surface, the display layer further comprising an electrophoretic medium comprising a fluid and first, second, third, fourth, fifth and sixth types of particles dispersed in the fluid, the first, second, third, fourth, fifth and sixth types of particles having respectively first, second, third, fourth, fifth and sixth optical characteristics differing from one another, the first, third and fourth types of particles having charges of one polarity and the second, fifth and sixth types of particles having charges of the opposite polarity, the first type of particles having a greater zeta potential or electrophoretic mobility than the third type of particles, the third type of particles having a greater zeta potential or electrophoretic mobility than the fourth type of particles, the second type of particles having a greater zeta potential or electrophoretic mobility than the sixth type of particles, and the sixth type of particles having a greater zeta potential or electrophoretic mobility than the fifth type of particles, the display layer being characterized in that:

(i) applying a first electric field having a first magnitude and a polarity driving the first type of particles towards the first viewing surface causes the display layer to display the first optical characteristic at the first viewing surface;

(ii) when the first optical characteristic is displayed at the first viewing surface, applying a second electric field having a magnitude lower than the first electric field and a polarity opposite to that of the first electric field causes the display layer to display the fifth optical characteristic at the first viewing surface; and (iii) when the fifth optical characteristic is displayed at the first viewing surface, applying a third electric field having a magnitude intermediate that of the first and second electric fields and the same polarity as the first electric field causes the display layer to display the third optical characteristic at the first viewing surface;

(iv) applying a fourth electric field having a fourth magnitude and a polarity driving the second type of particles towards the first viewing surface causes the display layer to display the second optical characteristic at the first viewing surface;

(v) when the second optical characteristic is displayed at the first viewing surface, applying a fifth electric field having a magnitude lower than the fourth electric field and a polarity opposite to that of the fourth electric field causes the display layer to display the fourth optical characteristic at the first viewing surface; and (vi) when the fourth optical characteristic is displayed at the first viewing surface, applying a sixth electric field having a magnitude intermediate that of the fourth and fifth electric fields and the same polarity as the fourth electric field causes the display layer to display the sixth optical characteristic at the first viewing surface.

2. The display layer of claim 1 wherein the electrophoretic medium further comprises substantially uncharged neutral buoyancy particles.

3. The display layer of claim 2 wherein the neutral buoyancy particles are uncharged.

4. The display layer of claim 2 wherein the neutral buoyancy particles are present in the display fluid in the range of from about 0.01 to 10 percent by volume.

5. The display layer of claim 4 wherein the neutral buoyancy particles are present in the display fluid in the range of from about 0.02 to about 1 percent by volume.

* * * * *